United States Patent [19]
Ishizuka et al.

[11] Patent Number: 5,381,183
[45] Date of Patent: Jan. 10, 1995

[54] MOTION-ADAPTIVE SCANNING-LINE CONVERSION CIRCUIT

[75] Inventors: Mitsuru Ishizuka; Noriyuki Yamaguchi; Hitoshi Hasegawa; Masaharu Yao; Hiroshi Ohnishi; Yuuzi Yamamoto; Masayuki Tuzi, all of Nagaokakyo, Japan

[73] Assignee: Mitsubishi Denki Kabushiki Kaisha, Tokyo, Japan

[21] Appl. No.: 79,509

[22] Filed: Jun. 21, 1993

[30] Foreign Application Priority Data

| Jul. 3, 1992 | [JP] | Japan | 4-176902 |
| Jul. 3, 1992 | [JP] | Japan | 4-176903 |
| Feb. 25, 1993 | [JP] | Japan | 5-036686 |
| Feb. 25, 1993 | [JP] | Japan | 5-036687 |
| Feb. 25, 1993 | [JP] | Japan | 5-036688 |

[51] Int. Cl.$^6$ .............................................. H04N 7/02
[52] U.S. Cl. ...................................... 348/458; 348/441
[58] Field of Search ............... 358/140, 11, 183, 160, 358/166; H04N 7/01; 348/443, 458, 452, 441, 427

[56] References Cited

U.S. PATENT DOCUMENTS

| 4,947,251 | 8/1990 | Hentschel | 358/140 |
| 4,984,077 | 1/1991 | Uchida | 358/140 |
| 5,032,899 | 7/1991 | Sato | 358/140 X |
| 5,179,443 | 1/1993 | Sugimori et al. | 348/913 X |
| 5,227,866 | 7/1993 | Sarugaku et al. | 358/140 X |
| 5,243,433 | 9/1993 | Owashi et al. | 358/140 |

OTHER PUBLICATIONS

"A Motion-Adaptive High-Definition Converter for NTSC Color TV Signals" by Achiha, et al., SMPTE Journal, May 1984, Presented at the 13th Intl. TV Symposium in Switzerland on May 30, 1983, pp. 470–476.

"Experiment with Second Generation EDTV System", by Takayama, et al. SMPTE Preprint No. 131-09, Oct. 1989, Presented at the 131st SMPTE Conference in Los Angeles, Society of Motion Picture and Television Engineers, pp. 1–18.

"A Decoder for a Letter-Box-Type Wide-Aspect EDTV System", by H. Ito et al., SMPTE Journal, Nov. 1992. Presented at the 133rd SMPTE Technical Conference in Los Angeles (paper No. 133-67) on Oct. 28, 1991, pp. 790–796.

Primary Examiner—Victor R. Kostak

[57] ABSTRACT

A motion-adaptive scanning-line conversion circuit which converts part or the entirety of a first video signal into a second video signal. The circuit includes a data reducing circuit, such as a low pass filter and a decimator, which lowers the sampling frequency of the first video signal to reduce the amount of data in the first video signal. The conversion circuit can also include a detection circuit which detects the vertical edge of a stationary part of a picture represented by the reduced first video signal, and a motion detection circuit which determines the amount of motion of the pixels in the reduced first video signal. Based upon the detection of a vertical edge, a selection circuit selects between an output of an inter-field scanning-line conversion circuit and an intra-field scanning-line conversion circuit operating on the reduced first video signal and the first video signal, respectively.

64 Claims, 40 Drawing Sheets

FIG. 14
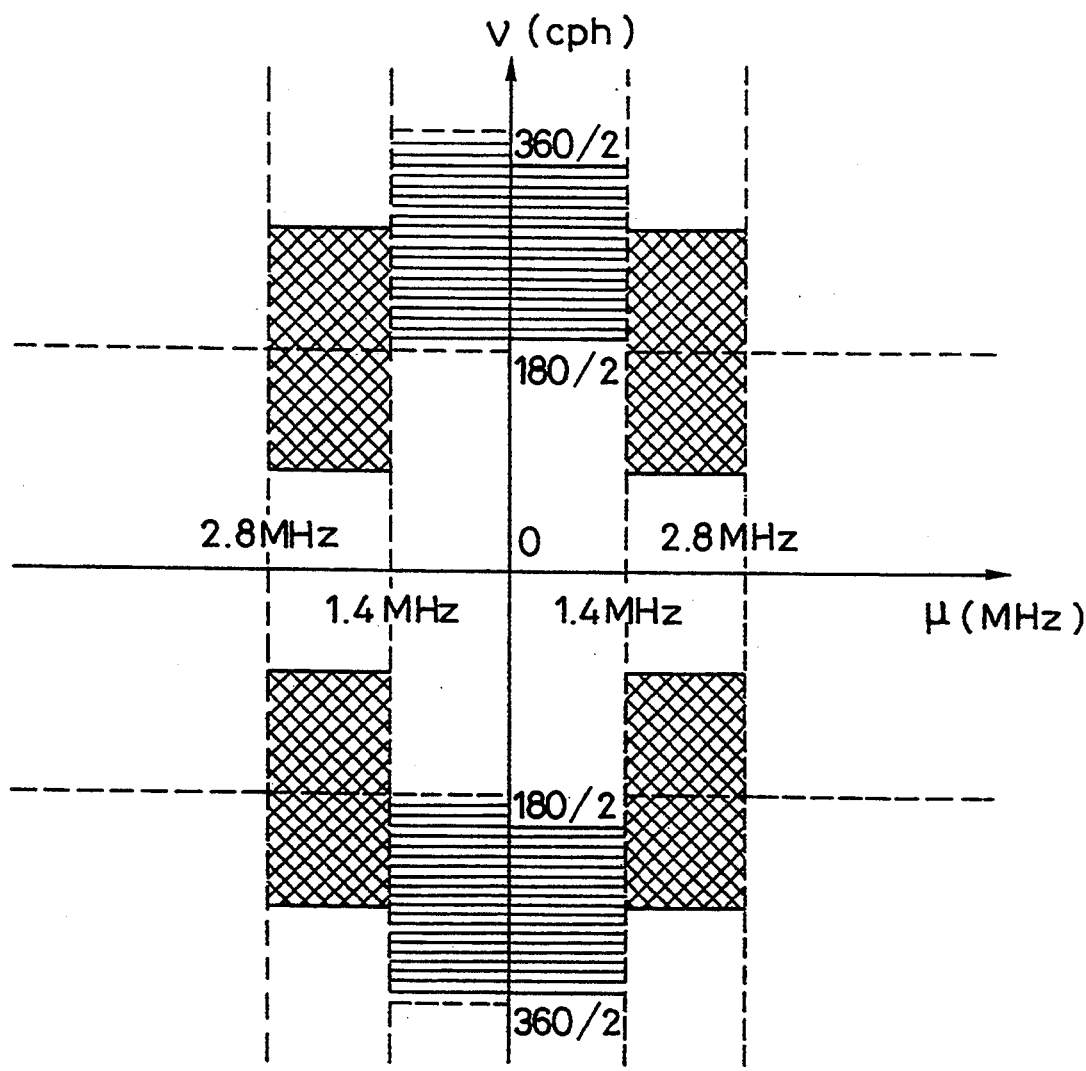
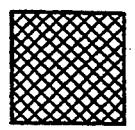 REGION FOR WHICH OUTPUT OF INTER-FIELD CONVERSION FILTER IS SELECTED
 HIGH-PRECISION INFORMATION OF MOVING PICTURE
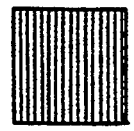 HIGH-PRECISION INFORMATION OF STATIONARY PICTURE

360 LINES 480 LINES

MOTION-ADAPTIVE SCANNING-LINE CONVERSION CIRCUIT

BACKGROUND OF THE INVENTION

The present invention relates to a motion-adaptive scanning-line conversion circuit for converting at least part (M) of a first video signal having a first number (N) of scanning lines into a second video signal having a second number (L) of scanning lines. The video signal may be a television signal.

The conversion may be from part only (M<N) of the first number of the scanning lines to the second number (L), and the second number (L) may be larger than the first number (N). For instance, N=480, M=360 and L=720 or 1080. This may be the case where the letter-box type NTSC signals having 480 effective scanning lines of which 360 lines are in the main part and 120 lines are in the upper and lower mask parts are converted for display on a wide vision receiver having 720 scanning lines or HDTV receiver having 1035 effective scanning lines.

The conversion may be from part only (M<N) of the first number of the scanning lines to the second number (L), and the second number (L) may be equal to the first number (N). For instance, N=L=480, and M=360. This may be the case where the letter-box type NTSC signals having 480 effective scanning lines of which 360 lines are in the main part and 120 lines are in the upper and lower mask parts are converted for display on a wide vision receiver having 480 effective scanning lines.

The conversion may be from the entirety (M=N) of the first number of the scanning lines to the second number (L), and the second number (L) may be larger than the first number (N). For instance, N=N=480, and L=960. This may be the case where the full-mode NTSC signals having 480 effective scanning lines are converted for display on a wide vision receiver having 960 scanning lines.

Where the video signals are of the letter-box type, with high-precision information added in the upper and lower mask parts, a high-precision information conversion filter may be additionally provided to demodulate the high-precision information and add it to the video signals transmitted in the main part of the letter-box type signals.

In this case, the conversion is from part only (M<N) of the first number of the scanning lines to the second number (L), and the second number (L) may be larger than the first number (N), or may alternatively be equal to the first number (N). In an example of the former case, N=480, M=360 and L=720 or 1080. In an example of the latter case, N=L=480 and M=360.

FIG. 35A and FIG. 35B show an example of conventional scanning-line conversion. FIG. 35A shows an example of input signal, which has an aspect ratio of 4 to 3 and has 525 scanning lines per frame, like a television signal of the NTSC system. Of the 525 scanning lines, 480 scanning lines are effective scanning lines, and 360 scanning lines are used for expressing a picture actually displayed on the screen. FIG. 35B shows an example of output signal having an aspect ratio of 16 to 9. In the conventional scanning-line conversion, the vertical deflection is controlled such that the number of the scanning lines of the display is 360, as illustrated in FIG. 35B.

FIG. 36 shows a circuit for the vertical deflection used for the conversion of the scanning lines shown in FIG. 35B. In the example shown in FIG. 36, a CRT is used for display. A vertical deflection circuit 431 generates a deflection current of the saw-tooth waveform, shown in FIG. 37B, in which the horizontal axis represents the time and the vertical axis represents the magnitude of the current. A deflection coil 432 is excited by the current from the vertical deflection circuit 431, and generate a magnetic field which deflects the electron beam in the CRT 433.

For performing the display shown in FIG. 35B, the electron beam is deflected over the entire height of the screen while it is horizontally scanned for 180 lines, so that interlaced scanning with 360 lines per frame is achieved.

By comparing FIG. 37B with FIG. 37A, which shows the saw-tooth waveform used for deflecting the electron beam over the entire height of the screen while the electron beam is horizontally scanned for 240 lines (with the number of the effective scanning lines being 480), it will be observed that the amplitude of the saw-tooth wave is larger In FIG. 37B: That is, during the raster scanning, it starts with a higher level and falls with a steeper gradient, to a lower level. During the flyback period, it rises from the lower level to the higher level.

The width or amplitude of the vertical deflection during each field is therefore larger, and the number off scanning lines formed within-the screen (used for display of the picture) is less. A result is-that the coarseness of the scanning lines is prominent.

Another problem associated with the conventional motion-adaptive processing in which stationary picture processing and moving picture processing are motion-adaptively, after having converting the video signal of the interlaced scanning into the video signal of the progressive scanning, is that the difference in the quality of the picture obtained by the stationary picture processing and the picture obtained by the moving picture processing, and the degradation in the picture quality during the moving picture processing is prominent. Moreover, the memory used for the inter-frame or inter-field processing must have a large capacity, so the device is expensive.

Another example of a conventional scanning-line conversion is shown in FIG. 38A, FIG. 38B, FIG. 39, and FIG. 40. FIG. 38A shows an example of input signal of the letter box type. In the television signal of the NTSC system, the wide aspect ratio (e.g., 16 to 9) is compressed in the vertical direction, and is disposed in the central part of the screen with the aspect ratio of 4 to 3. The upper and lower mask parts of the screen is used to transmit enhancing signals such as vertical high-frequency component. The effective scanning lines per frame (which has 525 scanning lines) is 480, of which the video signal is expressed in 360 scanning lines. The enhancing signals may comprise a vertical frequency component of 180/2 to 360/2 cph with the horizontal frequency of not higher than about 1.4 MHz. FIG. 38A shows an example of output signal. It shows how the image signal of FIG. 38A is displayed on the display of the aspect ratio of 16 to 9. In the conventional scanning-line conversion, the enhancing signals in the upper and lower mask parts are demodulated, and used for the scanning-line conversion to produce 480 display scanning lines as shown in FIG. 38B.

FIG. 39 shows an example of conventional scanning-line conversion circuit. It comprises input terminals 461 and 462, an output terminal 463, time-base conversion memories 464, 471 and 472 for performing time-base conversion, a high-precision information demodulating circuit 465 For demodulating the high-precision information multiplexed in the upper and lower mask parts, an intra-field scanning-line interpolating circuit 466 for producing interpolated scanning line by intra-field arithmetic operation, an inter-field scanning-line interpolating circuit 467 for producing interpolated scanning line by inter-field arithmetic operation, a motion detecting circuit 468 for detecting motion by calculating the inter-frame difference, an adder 469, a mixer 470 for mixing the two input signals with a mixing ratio dependent on the control signal, and an intra-field conversion filter 473 for performing the scanning-line conversion by vertical filtering of the pixels within the same field.

The operation will next be described. Digital video signals are input to the input terminals 461 and 462. The video signal input to the input terminal 461 is written into the time-base conversion memory 464, and the high-precision information multiplexed in the upper and lower mask parts is read and is subjected to time-base conversion. The high-precision information in the upper and lower mask parts is also rearranged into the required number of the scanning lines. The video signal input to the input terminal 462 is input to the high-precision information demodulating circuit 465, the intra-field scanning-line interpolating circuit 466, the inter-field scanning-line interpolating circuit 467, the motion detecting circuit 468 and the time-base conversion memory 471.

The output of the memory 464 having been time-base converted, is input to the high-precision information demodulating circuit 465. In the high-precision information demodulating circuit 465, the high-precision information multiplexed in the upper and lower mask parts is demodulated by calculation on the output of the time-base conversion memory 464 and the signal input to the input terminal 462, into a component having a vertical frequency of about 180/2 to 360/2 cph and having a frequency not higher than about 1.4 MHz. The output of the high-precision information demodulating circuit 465 is supplied to the adder 169.

The intra-field scanning-line interpolating circuit 466 generates interpolated scanning lines by calculation on the pixels with the same field. The inter-field scanning-line interpolating circuit 467 generates interpolated scanning lines by calculation on pixels separated by one field. The output of the intra-field scanning-line interpolating circuit 466 is supplied to the adder 469. The output of the inter-field scanning-line interpolating circuit 467 is supplied to the mixer 470. The motion detecting circuit 468 detects motion of the image on the basis of the inter-frame difference.

The adder 469 adds the output of the high-precision information demodulating circuit 465 and the output of the intra-field scanning-line interpolating circuit 466. The output of the high-precision information demodulating circuit 465 is the vertical high-frequency component obtained by demodulating the high-precision information that was multiplexed in the upper and lower mask parts, and has a vertical frequency of 360/2 to 180/2 cph and a horizontal frequency of not higher than about 1.4 MHz. By adding this output of the high-precision information demodulating circuit 465 and the output of the intra-field scanning-line interpolating circuit 466, which is not higher than 180/2 cph, the vertical frequency band of the interpolated scanning line is expanded to 360/2 cph.

The motion detection circuit 468 detects the motion of the image. More specifically, it determines, for each pixel, whether the pixel is in a moving part of the picture on the basis of the video signals separated by one frame. The output of the motion detecting circuit 468 is input to the mixer 470. The mixer 470 mixes the output of the adder 469 and the output of the inter-field scanning-line interpolating circuit 467 in accordance with the result of the motion detection from the motion detection circuit 468. When the motion detection circuit 468 finds that the pixel is in a moving part of the picture, the output of the intra-field scanning-line interpolating circuit 466 is selected, while when the pixel is found to be in a stationary part of the picture, the output of the inter-field scanning-line interpolating circuit 467 is selected. The output of the mixer 470 is input to the time-base conversion memory 472.

The time-base conversion memory 471 is for performing time-base conversion of the real scanning lines. The time-base conversion memory 472 is for performing time-base conversion of the interpolated scanning lines. The time-base conversion memories 471 and 472 read the signals of the 360 scanning lines of the main image part for a period of 480 scanning lines. The output of the time-base conversion memories 471 and 472 are input to the intra-field conversion filter 473. The intra-field conversion circuit 473 converts the number of the scanning line by vertical filtering of the pixels in the same field. The output of the intra-field conversion filter 473 is output via the output terminal 463.

FIG. 40 shows the manner of scanning line conversion in which 480 scanning lines are generated from 360 scanning lines. For this to be achieved, four scanning lines are generated from every three scanning lines. Each of the four scanning lines are formed by weighted average of straight-line interpolation of the original three lines.

In the above arrangement, the interlaced scanning is converted to the progressive scanning and the scanning-line conversion is then performed by the motion adaptive processing. The system is associated with tile same problems that were described in connection with the first-mentioned prior art. That is, the difference in picture quality between moving picture processing and stationary picture processing is prominent. Although the use of the high-precision information alleviates the problem to some extent, it does not completely solve the problem. This is particularly true where the bandwidth of the high-precision information is not sufficient. In addition, there is an additional problem that the volume of the circuit is large.

SUMMARY OF THE INVENTION

An object of the invention is reduce the difference in the picture quality between the picture obtained by the stationary picture processing and the picture obtained by the moving picture processing.

Another object of the invention is reduce the size of the memory used for inter-frame and inter-field processing.

A motion-adaptive scanning-line conversion circuit according to the invention is for converting at least part (M) of a first video signal having a first number (N) of scanning lines into a second video signal having a second number (L) of scanning lines, said video signal being in the form a sequence of samples; and comprises:

a data reducing circuit for reducing the amount of data of said first video signal;

a first field delay circuit for delaying the video signal (output of the first circuit) by one field;

a second second field delay circuit for delaying the video signal (output of the first field delay circuit) by one field;

a motion detecting circuit for locally detecting motion of the image on the basis of the correlation between the adjacent frames as obtained by the first and second field delay circuits;

an inter-field scanning-line conversion circuit for performing inter-field scanning-line conversion using the signal obtained by one of the field delay circuits;

an intra-field scanning-line conversion circuit for performing intra-field scanning-line conversion; and a mixer mixing the output of the inter-field scanning-line conversion circuit and the output of the intra-field scanning-line conversion circuit with a mixing ratio determined on the basis of the result of the motion detection.

The motion-adaptive scanning-line conversion circuit may additionally be provided with:

an edge detection circuit for locally detecting an edge in the image on the basis of the correlation within a field; and a judgement circuit for detecting the motion of the image and the edge in the image on the basis of the output of the motion detecting circuit and the output of the edge detecting circuit;

The mixer then mixes the output of the inter-field scanning-line conversion circuit and the output of the intra-field scanning-line conversion circuit with a mixing ratio determined in accordance with the output of the judgement circuit.

The video signal may be of a letter-box type containing a main part and an upper and lower mask parts containing high-precision information.

Then it is advantageous if the motion-adaptive scanning-line conversion circuit is further provided with a demodulating circuit for performing demodulation and scanning-line conversion on the high-precision information multiplexed in the upper and lower mask parts.

BRIEF DESCRIPTION OF THE DRAWINGS

FIG. 14 is a diagram showing, in two-dimensional representation, the spectrum of the image realized by the motion-adaptive scanning-line conversion circuit according to the embodiment of FIG. 13.

DETAILED DESCRIPTION OF THE PREFERRED EMBODIMENTS

Figure 1:
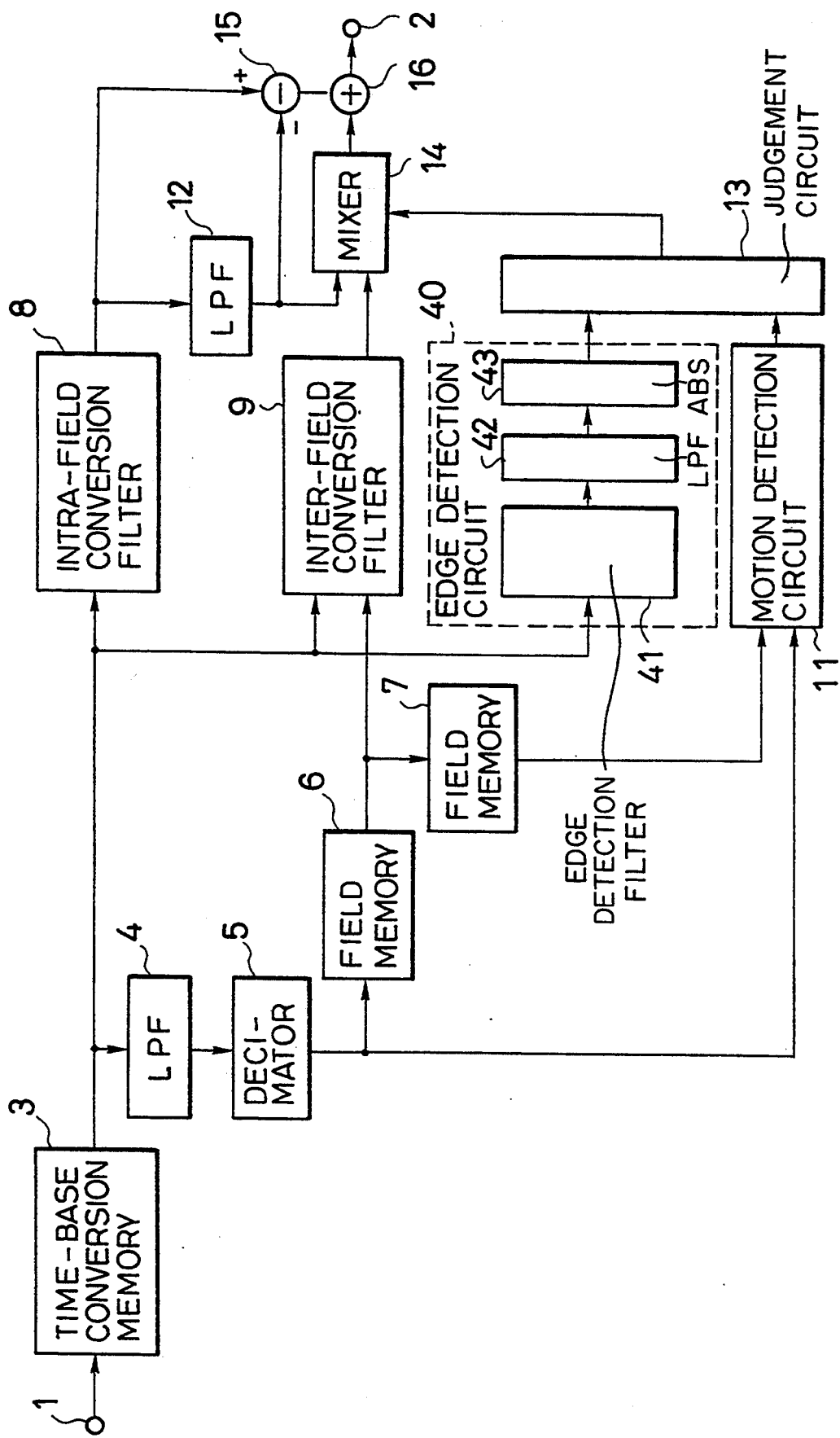
FIG. 1 is a block diagram showing a motion-adaptive scanning-line conversion circuit according to an embodiment of the invention.

The motion-adaptive scanning-line conversion circuit of the embodiments described are incorporated in a television receiver for performing scanning-line conversion, from the effective scanning lines in the input television signals to the scanning lines of the display device of the television receiver. The signal input to the motion-adaptive scanning-line conversion circuit may be a transmitted (broadcasted) television signal, or a signal played back from a video recorder (video tape recorder or a video disk recorder). The signal input to the motion adaptive scanning line conversion circuit may be called an input or original video (or luminance, or chrominance) signal, while the signal produced at the output of the motion-adaptive scanning-line conversion circuit may be called an output or display video (or luminance, or chrominance) signal.

In all the embodiments (Embodiment 1 to Embodiment 14 described, the conversion is from part (M) only of the first number (N>M) of the scanning lines to the second number (L), not smaller than the first number (N).

In all the embodiments described (Embodiment 1 to Embodiment 14), N=480, M=360, L=480, 720 or 1080. This may be the case where the letter-box type NTSC signals having 480 effective scanning lines, of which 360 scanning lines are in the main part and 120 scanning lines are in the upper and lower mask parts, are converted for display on a wide vision receiver having 480, 720 or 1080 effective scanning lines or a HDTV receiver having 1035 effective scanning lines.

However, the invention is also applicable to a situation where the conversion is from the entirety (M=N) of the first number of the scanning lines to the second number (L), which may be larger than the first number. For instance, N=M=480, and L=960. This may be the case where the full-mode NTSC signals having 480 effective scanning lines are converted for display on a wide vision receiver having 960 scanning lines.

In all the embodiments except Embodiment 6 described, the frame frequencies before and after the scanning-line conversion are identical with each other, and assumed to be 30 frames per second. Various features of the invention are however also applicable to situations where the frame frequency before the conversion and the frame frequency after the conversion are different, and the frame frequency is other than 30.

In Embodiment 6, the frame frequency before the scanning-line conversion is either identical to or twice that of the frame frequency after the scanning-line conversion depending on the type of the video signal that is supplied.

In all the embodiments described, except Embodiment 6, the video signal is of an interlaced scanning type both before and after the scanning-line conversion. The various features of the invention are however applicable to situations where one or both of the video signals before and after the conversion is of a progressive scanning type.

In Embodiment 6, the input video signal may be either of an interlaced scanning type or of a progressive scanning type.

In Embodiment 7 to Embodiment 15, high-precision information is multiplexed in the upper and lower mask parts, comprising for example 120 scanning lines, and is scanning-line converted, and added to the video signal in the main part, comprising for example 360 scanning lines, of the signal for improving the picture quality.

Embodiment 1

Overview

FIG. 1 is a block diagram showing a motion-adaptive scanning-line conversion circuit according to an embodiment of the invention. It comprises an input terminal 1 to which a digital video signal, for example a luminance signal or a chrominance signal, is applied. The digital video signal consists of a sequence of samples, each representing sample values. The digital video signal that is applied to the input terminal 1 is time-base converted and rearranged. The output of the time-base conversion memory 3 is passed via a low-pass filter (LPF) 4 to a decimator 5. The output of the time-base conversion memory 3 is also applied to an intra-field conversion filter 8, an inter-field conversion filter 9 and an edge detection circuit 40.

The output of the decimator 5 is applied to a field memory 6 and a motion detection circuit 11. The output of the field memory 6 is input to another field memory 7 and the inter-field conversion filter 9. Each of the field memories 6 and 7 delays its input by one field. The motion detection circuit 11 detects motion by calculating an inter-frame difference on the basis of the samples of the video signal from the decimator 5 and the samples of the video signal from the field memory 7 which are separated by one frame.

The inter-field conversion filter 9 performs scanning-line conversion by inter-field calculation, i.e., processing on the samples of the video signal from the time-base conversion memory 3 and the samples of the video signal from the field memory 6 which are separated by one field. The intra-field conversion filter 8 performs scanning-line conversion by intra-field calculation on the samples of the video signal from the time-base conversion memory 3, i.e., the samples of the video signal within the same field. In this specification, the scanning-line conversion by intra-field calculation is referred to as intra-field conversion, and the scanning-line conversion by inter-field calculation is referred to as inter-field conversion.

The output of the inter-field conversion filter 9 is input to a mixer 14. The output of the intra-field conversion filter 8 is passed through a low-pass filter (LPF) 12 and input to the mixer 14 and to a subtractor 15. The output of the intra-field conversion filter 8 is also applied directly to the subtractor 15. The output of the subtractor 15 is the difference obtained by subtracting the output of the LPF 12 from the output of the intra-field conversion filter 8.

The edge detection circuit 40 detects vertical edge information by extracting vertical high-frequency components from the video signal from the time-base conversion memory 3. The output of the edge detection circuit 40 and the output of the motion detection circuit 11 are applied to a judgement circuit 13, which, responsive thereto, produces a mixing control signal, which is applied to the mixer 14.

The mixer 14 mixes the output of the LPF 12 and the output of the inter-field conversion filter 9 with a proportion or mixing ratio determined in accordance with the mixing control signal.

The output of the mixer 14 and the output of the subtractor 15 are added at an adder 16, and the sum is output via an output terminal 2, as the output of the motion-adaptive scanning-line conversion circuit of this embodiment.

Vertical Frequency

In the standard NTSC television signal, the number of effective scanning lines in one frame is 480, and the maximum vertical frequency of the image signal that can be expressed without aliasing is 480/2 cph (cycles per picture height). Where the image is expressed in 360 scanning lines, for display of a picture of wide aspect ratio of 16:9, realized by the use of letter-box type video signals for example, the maximum vertical frequency of the television signals that are broadcasted is 360/2 cph. However, with regard to moving part of the picture, since the scanning lines are interlaced, the maximum vertical frequency is 180/2 cph.

Problems of Conventional Motion Adaptive Processing

It is often required that the scanning-line conversion be performed motion-adaptively. This is particularly true when the image signal of a first number (M) of effective scanning lines is converted to another image signal of a second number (L) of effective scanning lines greater than the first number (M) of effective scanning lines.

For instance, there are situations where the image signal of 360 scanning lines is converted into an image signal of 480 scanning lines, 720 scanning lines, or 1,080 scanning lines, for a display with such a greater number of scanning lines.

In a motion adaptive processing in which the stationary picture processing and moving picture processing are selectively performed. In actual circuitry this may be implemented by providing an intra-field conversion filter and an inter-field conversion filter which respectively perform intra-field conversion and inter-field conversion, and selecting either of the outputs of the two conversion filters. The selection or switching between the the outputs off the intra-field and inter-field conversion filters may and often does take the form of mixing with a variable mixing ratio. The mixing ratio can be a selected one of a plurality of discrete values, e.g., 16 values including 15:0 and 0:15. For the sake of simplicity of explanation, however, the term "selection" may be used to mean mixing with variable mixing ratio. The output of the inter-field conversion filter is said to be "selected" when it is mixed with a greater proportion than the output of the intra-field conversion filter. Similarly, the output of the intra-field conversion filter is said to be "selected" when it is mixed with a greater proportion than the output of the inter-field conversion filter. The selection is made in accordance with the result of the motion detection, or motion-adaptively. The detection of motion and selection between the intra-field and inter-field conversion is made for each pixel.

In a conventional motion-adaptive scanning-line conversion, the output of the inter-field conversion filter is selected when the pixel in question is in a stationary part of the picture, and the output of the intra-field conversion is selected when it is found that the pixel is in a moving part of the picture.

When the output of the inter-field conversion is utilized the maximum vertical frequency that can be expressed is 360/2 cph, while when the output of the intra-field conversion is utilized, the maximum vertical frequency is 180/2 cph.

A problem with the conventional method is that difference in picture quality is considerable and prominent between an area of the picture where the output of the inter-field conversion is utilized and an area of the picture where the output of the intra-field conversion is utilized.

Motion Adaptive Processing in the Invention

In the motion adaptive scanning-line conversion according to the invention, the selection between the outputs of the inter-field and intra-field conversion filters is made in accordance with the result of detection of vertical edges, as well as the result of detection of motion. That is, only when the pixel is found to be in a vertical edge in a stationary part of the picture, the output of the inter-field conversion is used, and the output of the intra-field conversion is selected for all other pixels, including the pixels in the moving part of the picture and the stationary part of the picture other than the edges.

The pixel is found to be in an edge if the vertical frequency is at about 180/2 cph, i.e., the maximum vertical frequency expressed by the original television signal. In an actual circuit, the pixel is found to be in an edge if the vertical frequency is found to be within the range of (180/2±90/2) cph, and the horizontal frequency is not higher than about 2.0 MHz. Finding or detecting that a pixel is in an edge is also referred to as "finding or detecting an edge". Such edge detection is made by the edge detection circuit 40.

By selecting the output of the inter-field conversion, it is possible to provide the maximum vertical resolution at edges in stationary parts of the picture (where the maximum vertical resolution is required). At the same time, switching between the output of the intra-field conversion and the output of the inter-field conversion is reduced. The difference in resolution between the areas for which the output of the inter-field conversion is utilized and the areas for which the output of the intra-field conversion is utilized is less prominent.

Spectrum

Figure 2:
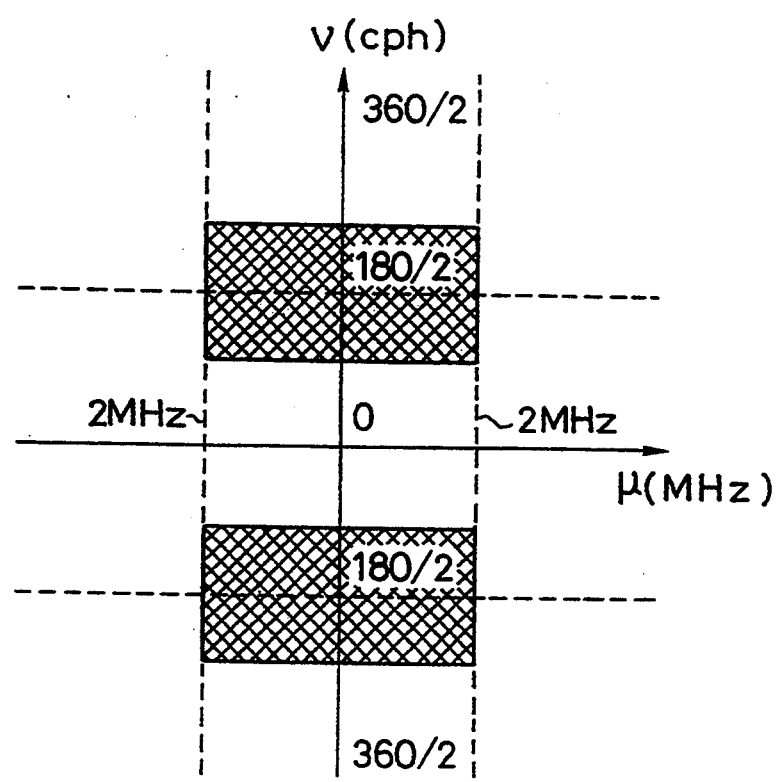
FIG. 2 is a diagram showing, in two-dimensional representation, the frequency spectrum of the image realized by the motion-adaptive scanning-line conversion circuit according to the embodiment of FIG. 1.

FIG. 2 shows, in two-dimensional representation, the frequency spectrum of the image realized by the motion-adaptive scanning-line conversion circuit according to the present embodiment. The frequency in the horizontal direction on the screen is shown on $\mu$ axis, while the frequency in the vertical direction on the screen is shown on $\nu$ axis. This applies to all other diagrams showing the frequency spectrum, namely, FIGS. 11, 14, 18, 19, 22, 25, 29, 31, 32 and 34. In these figures, the frequency values such as "2.0 MHz", "1.4 MHz" and "2.8 MHz" are approximate values.

In FIG. 2, the cross-hatching indicates the region where the output of the inter-field conversion is selected.

Details of Respective Components

Details of the respective circuits or components of the motion-adaptive scanning-line conversion circuit will now be described in turn.

Time-Base Conversion Memory 3

The digital video signal that are applied to the input terminal 1 is written into the time-base conversion memory 3, and is read out in synchronism with a clock frequency phase-locked by the horizontal scanning frequency of the display device, not illustrated, used for display of the picture.

If a frame of an image of N scanning lines is converted into a frame of image of K scanning lines, and the frame frequencies before and after the scanning-line conversion are equal, the time for reading one scanning line must be N/K of the time for writing one scanning line. The rate at which the samples of video signals are read and subjected to subsequent processing must be K/N times the rate at which the samples of the video signals are input and written. Thus, time-base is converted.

In addition, the data of the scanning lines must be rearranged. For instance, assume that the image having 480 scanning lines, including 360 effective scanning lines, is converted to the image of 720 effective scanning lines. The original video signal is written in the time-base conversion memory 3 at a rate of 480 scanning lines per frame. The data required for producing an image having 720 scanning lines must contain 720 lines per frame. To produce 720 lines from the 360 lines in the original video signal, one line (padding line) without significant information is inserted between successive lines of the original video signal. In other words, the 720 lines in the output of the memory 3 contain every other line from the original video signal and the intervening lines are padding lines (containing no significant information).

If the conversion is from 360 lines to 1080 lines, two padding lines (containing no significant information) are inserted between successive lines of the original video signal. If the conversion is from 360 lines to 480 lines, one padding line (containing no significant information) is inserted after every third line of the original video signal.

Such insertion of padding lines is called "rearrangement." In this way, the time-base conversion and rearrangement are achieved. Such rearrangement may however sometimes be considered as part of the "time-base conversion" in its broader sense.

LPF 4, Decimator 5

The decimator 5 decimates the data by sub-sampling. That is, it lowers the sampling frequency of the video signal. The decimation factor is 2, for example. In other words, the sampling frequency is lowered to one half. As a result, the amount of data for one field used in the subsequent processing is reduced, and the capacity of the field memories 6 and 7 can be reduced.

The LPF 4 provided in front of the decimator 5 band-limits the horizontal frequency to 2.0 MHz, so that no aliasing interferences are introduced by the decimation at the decimator 5.

The insertion of the LPF 4 is also useful from a viewpoint of reducing the possibility of erroneous detection of motion: recognition of motion where in fact no motion is to be recognized.

Field Memories 6, 7

Each of the field memories 6 and 7 stores the samples of the video signal input to it, and outputs the samples of the video signal one field later. It has a capacity of one field of video signal. Because the samples of the video signal have been decimated by the decimator 5, the storage capacity required of each of the field memories 6 and 7 is reduced by a factor equal to the decimation factor. i.e., reduced to half, in the example under consideration.

Intra-Field Conversion Filter 8

The intra-field conversion filter 8 performs vertical filtering of the pixels in the same field using the samples of the video signal supplied from the time-base conversion memory 3, to thereby perform intra-field conversion.

Figure 3:
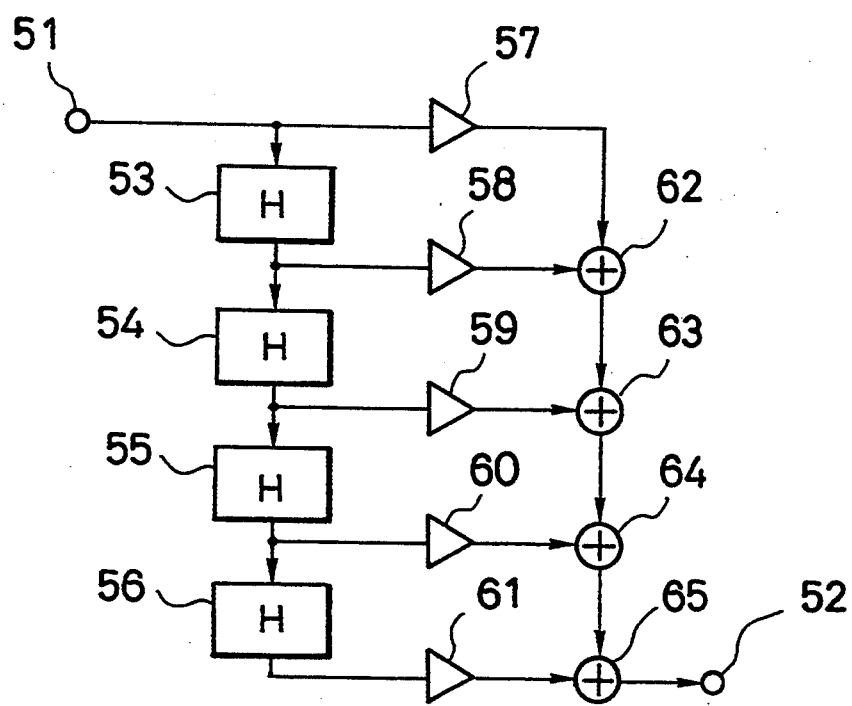
FIG. 3 is a block diagram showing an example of the intra-field conversion filter used in the embodiment of FIG. 1.

FIG. 3 shows details of an example of the intra-field conversion filter 8 of FIG. 1. It comprises an input terminal 51 connected;to receive the video signal from the time-base conversion memory 3, and an output terminal 52, line memories 53 to 56 for delaying the video signal by one scanning line of the display device used for the display, multipliers 57 to 61, and adders 62 to 65.

The filter coefficients are altered or determined for each line. For this purpose, a control circuit, not illustrated, is connected to the multipliers 57 to 61 for varying the coefficients for each line.

The manner of determining the filter coefficients for each line for the purpose of scanning-line conversion is well known, and is described for example in an article titled "A Decoder for a Letter-Box-Type Wide-Aspect EDTV System", by Ito, et al, in SMPTE Journal, November 1992, pages 790 to 796, which is incorporated herein by reference.

The number of the line memories, the number of multipliers, and the number of the adders can be altered by the number of taps of the filter. It is also possible to use two or more sets of the configurations shown in FIG. 3 and causing them to operate in turn and multiplex their outputs. With such an arrangement, the operating speed of each set can be lowered, while the operating speed of the entire arrangement is unchanged.

Inter-Field Conversion

The inter-field conversion filter 9 performs vertical filtering through calculation of pixels separated by one field, using the output of the time-base conversion memory 3 and the output of the field memory 6, to thereby perform the scanning-line conversion. The inter-field conversion filter 9 produces only the horizontal low-frequency components by the action of built-in LPFs 94 and 95 to be described next with reference to FIG. 4A.

Figure 4A:
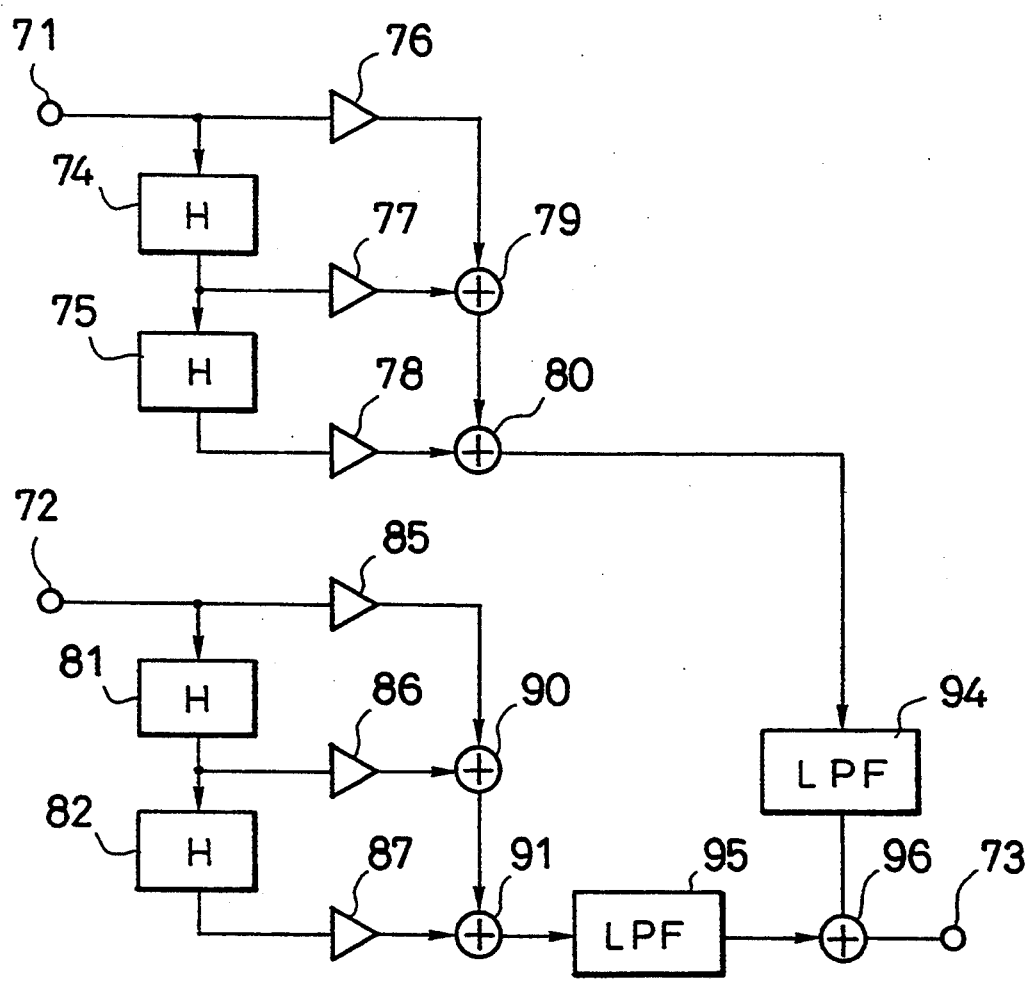
FIG. 4A is a block diagram showing an example of inter-field conversion filter used in the embodiment of FIG. 1.

FIG. 4A shows details of an example of inter-field conversion filter 9 of FIG. 1. It comprises an input terminal 71 connected to receive the video signal (having been delayed by one-field) from the field memory 6 and the video signal from the time-base conversion memory 3, an output terminal 73, line memories 74, 75, and 81 and 82 for delaying the signal by one scanning line of the display device used for the display, multipliers 76 to 78 and 85 to 87, adders 79, 80, 90, 91 and 96, a low-pass filter (LPF) 95 for outputting a horizontal low-frequency component, and an interpolation LPF 94 for interpolating the horizontal low-frequency component.

The video signal applied to the input terminal 71 is delayed by one line at the line memories 74 and 75, and the signal at the input terminal 71 and the delayed signals are respectively multiplied with filter coefficients at the multipliers 76 to 78. The outputs of the multipliers 76 to 78 are sequentially added at the adders 79 and 80.

The video signal input to the input terminal 72 is delayed by line memories 81 and 82 by one line, and the signal at the input terminal 72 and the delayed signals are multiplied at the multipliers 85 to 87 with respective filter coefficients. The outputs of the multipliers 85 to 87 are sequentially added at the adders 90 and 91.

The output of the adder 80 is input to the interpolation LPF 94, which performs interpolation by recovering the samples having been removed by the decimation at the decimator 5, to thereby restore the sample frequency of the signal at the output of the time-base conversion memory 3. The output of the adder 91 is applied to the LPF 95, where the horizontal low-frequency component is extracted. The frequency characteristics of the interpolation LPF 94 and the LPF 95 are either identical with or similar to the frequency characteristic of the LPF 4 in FIG. 1. The output of the interpolation LPF 94 and the output of the LPF 95 are added at the adder 96, and the output of the adder 96 is output through the output terminal 73.

A control circuit, not shown, is connected to the multipliers 76 to 78 and 85 to 87 to alter or determine the filter coefficients for each line. The number of the line memories, the number of the multipliers and the number of the adders can be altered in accordance with the number of taps.

Like the intra-field conversion filter, the inter-field conversion filter itself is known, and is described in the above-mentioned publication "A Decoder for a Letter-Box-Type Wide-Aspect EDTV System", which is herein incorporated by reference.

Figure 4B:
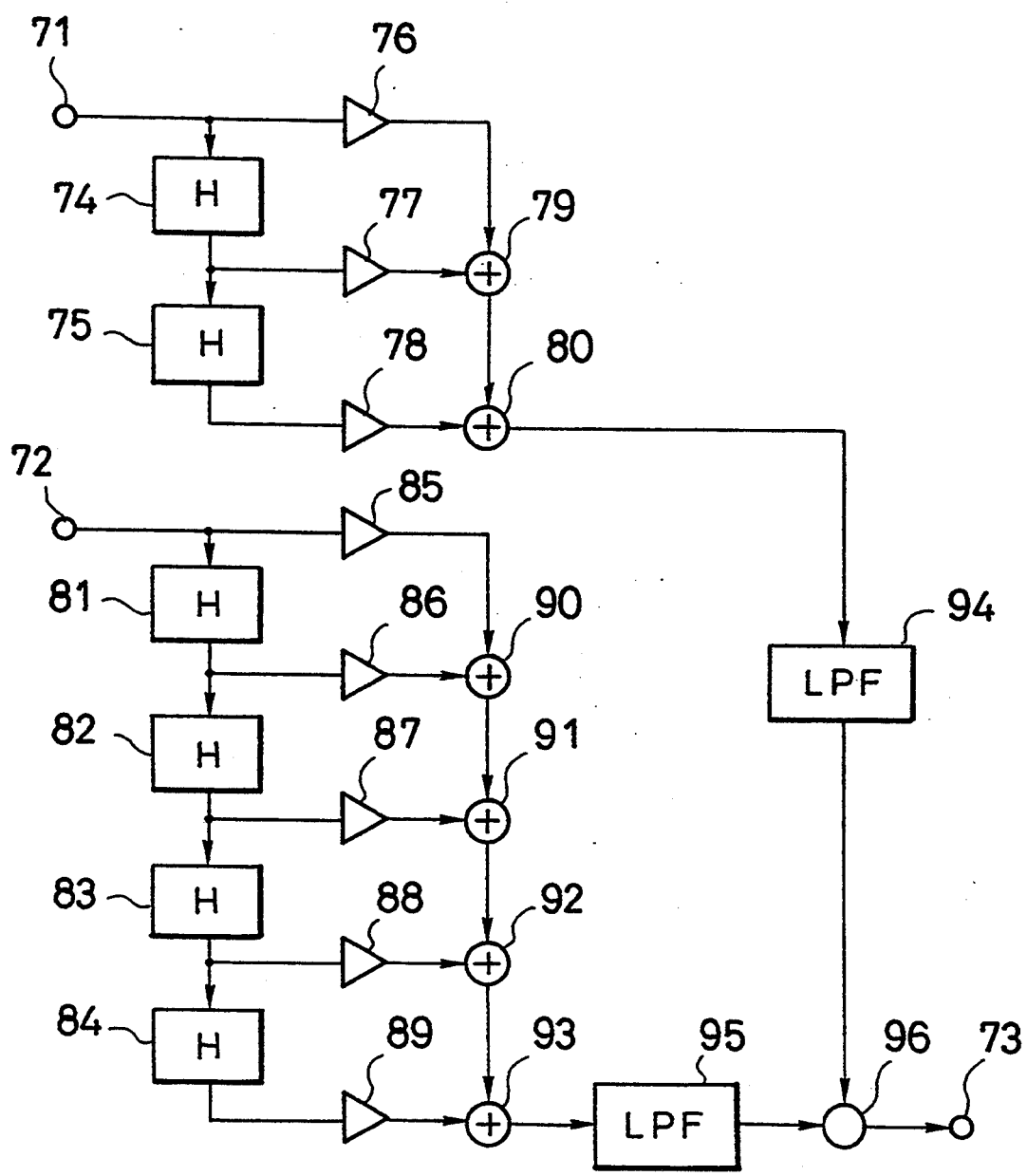
FIG. 4B is a block diagram showing a modification of inter-field conversion filter which can be used in place of the inter-field conversion filter of FIG. 4A.

FIG. 4B shows a modification of inter-field conversion filter which can be used in place of the inter-field conversion filter of FIG. 4A. As illustrated, it has more steps of line memories 83 and 84, multipliers 88 and 89, and adders 92 and 93. The configuration of the inter-field conversion filter of FIG. 4B is advantageous in that the lower part (81 to 93) can also be used for the intra-field conversion filter. That is, the same circuit components can be shared by both the inter-field conversion filter and the intra-field conversion filter, by use of a suitable switching means, not shown.

Edge Detection

The edge detection circuit 40 receives the video signal from the time-base conversion memory 3 and determines whether each pixel is in an edge by subjecting the video signal to edge-detection filtering. Specifically, it determines whether the vertical frequency of the video signal is (180/2+90/2) cph and at the same time the horizontal frequency component is not higher than about 2 MHz, and produces a signal indicating the result of the determination. The edge detection circuit 40 comprises an edge detection filter 41, and an LPF 42 having a passband of 0 to 2 MHz and an absolute value circuit (ABS) 43 producing an absolute value of its input. The output of the absolute value circuit 43 is supplied to the judging circuit 13.

In strict terms, the detection of whether each pixel is in an edge is not a simple question of presence or absence of an edge, but is a detection of the degree of sharpness of an edge or degree of change of the video signal along the vertical direction. Such detection is achieved by extracting the specific vertical frequency component, which is (180/2±90/2) cph, and the result of detection is expressed by a signal having, at any given instance, one of a plurality of discrete values, e.g., 16 possible values.

Figure 5:
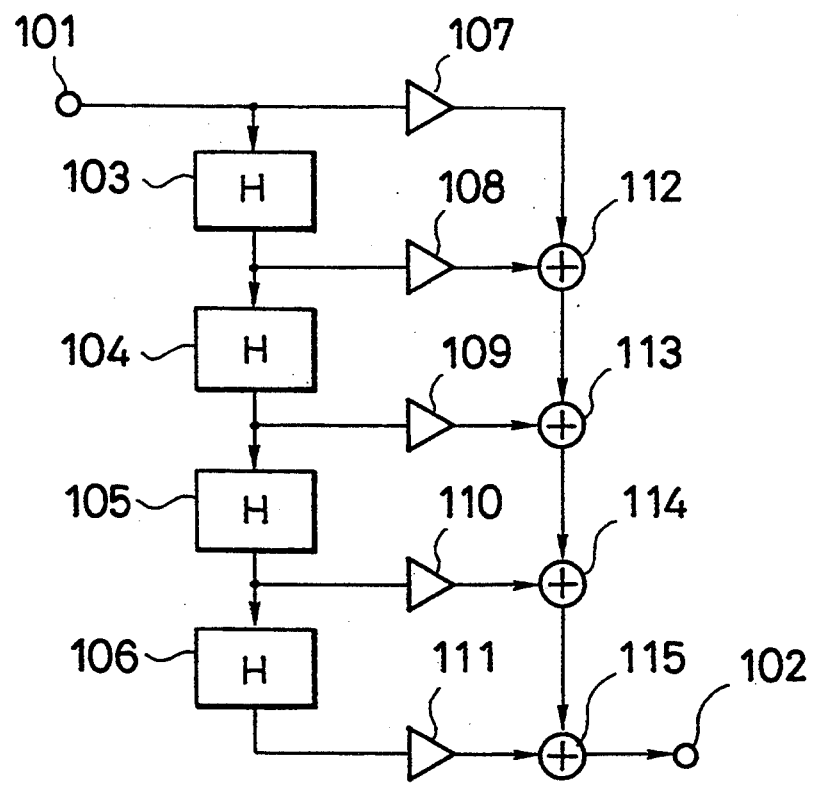
FIG. 5 is a block diagram showing an example of edge detection filter used in the embodiment of FIG. 1.

FIG. 5 shows an example of edge detection filter 41 of FIG. 1. It comprises an input terminal 101 connected to receive the output of the time-base conversion memory 3, an output terminal 102, line memories 103 to 106 for delaying the signal by one scanning line of the display device used for the display, multipliers 107 to 111, and adders 112 to 115.

The video signal applied to the input terminal 101 is delayed by the line memories 103 to 106 by one line, and the signal at the input terminal 101 and the delayed signals are respectively multiplied at the multipliers 107 to 111 with filter coefficients.

The outputs of the multipliers 107 to 111 are sequentially added at the adders 112 to 115. The output of the adder 115 is output through the output terminal 102.

In a situation where the original video signal has 360 effective lines, the edge detection filter has a frequency characteristics of-extracting the components centered at 180/2 cph, e.g., of the range of (180/2±90/2) cph.

The number of line memories, the number of multipliers and the number of adders can be altered in accordance with the number of taps. A control circuit, not shown, is connected to the multipliers 107 to 111 to alter or determine the filter coefficients for each line.

Motion Detection

The motion detection circuit 11 receives the output of the decimator 5 and the output of the field memory 7, and and detects motion of the image by calculating the differences between the samples of the video signal separated by one frame, in accordance with the outputs of the decimator 5 and the field memory 7.

In strict terms, the detection of motion is not a simple question of presence or absence of motion, but is a detection of the degree of motion or the degree of change of the video signal with time. Such detection is achieved by determining the difference between the frames, and the result of detection is expressed by a signal having, at any given instance, one of a plurality of discrete values, e.g., 16 possible values.

Figure 6:
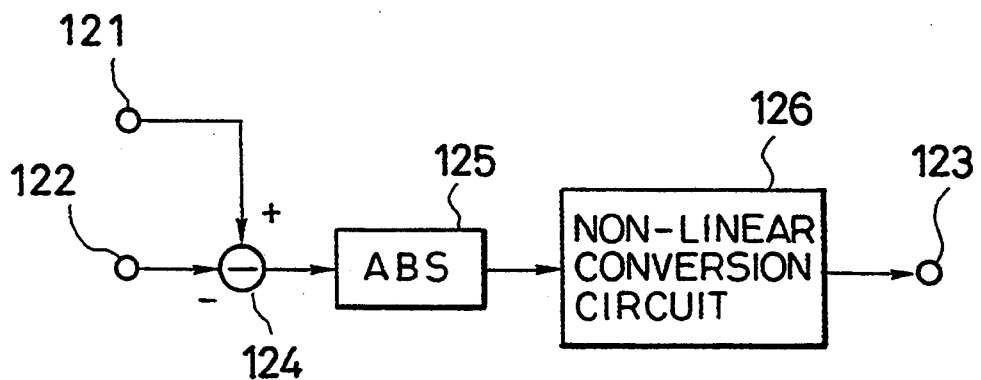
FIG. 6 is a block diagram showing an example of motion detection circuit used in the embodiment of FIG. 1.

FIG. 6 shows details of an example of motion detection circuit 11. It comprises an input terminal 121 connected to receive the video signal from the decimator 5 (having been band-limited and decimated), another input terminal 122 connected to receive the field memory 7 (having been band-limited, decimated, and delayed by one frame), an output terminal 123 for producing the result of the motion detection, a subtractor 124, an absolute value circuit 125 for producing an absolute value of its input, and a non-linear conversion circuit 126.

The video signal applied to the input terminal 121 and the video signal applied to the input terminal 122 are applied to the subtractor 124, where their difference is determined. The output of the subtractor 124 is a horizontal low-frequency component of the difference between the samples of the video signal of the adjacent frames. (The output of the subtractor 124 consists of the low-frequency component because the signals applied to the input terminals 121 and 122 have been band-limited by the LPF 4.) The output of the subtractor 124 is applied to the absolute value circuit 125, where its absolute value is determined. The absolute value is subjected to non-linear conversion at the non-linear converter 126. The non-linear conversion is such that an input below a certain level produces a zero output, while an input above a certain level produces a maximum value. The output of the non-linear converter 126 is produced, as the result of motion detection, through the output terminal 123.

Judgement Circuit

On the basis of the outputs of the edge detection circuit 40 and the motion detection circuit 11, the judgement circuit 13, which determines whether the pixel in question is in a vertical edge in a stationary part of the picture. As stated above, the result of the edge detection and the result of the motion detection are matter of degree and are both represented by signals having one of a plurality of discrete values, e.g., 16 possible values. On the basis of these signals, the judgement circuit 13 produces a mixing control signal, which is also a signal having, at any given instance, one of 16 possible values. It determines the mixing ratio to be one of 16 possible values, 15:0, 14:1, 13:2, 12:2, . . . 1:14, and 0:15.

Mixer

The mixer 14 mixes the output of the LPF 12 and the output of the inter-field conversion filter 9 in accordance with the mixing control signal, and produces the result of mixing. The output of the LPF 12 is the low horizontal frequency component of the video signal obtained by intra-field conversion. The output of the inter-field conversion filter 9 is a horizontal low-frequency component of the video signal obtained by inter-field conversion. The mixer 14 mixes the two signals. The output of the mixing circuit 14 is input to the adder 16.

LPF 12, Subtractor 15, Adder 16

The LPF 12 has the same frequency characteristic as the LPF 4. The LPF 12 therefore extracts the low horizontal frequency components of not higher than about 2.0 MHz of the video signal produced as a result of the intra-field conversion.

The subtractor 15 subtracts the output of the LPF 12 from the output of the intra-field conversion filter 8, and extracts the horizontal high frequency component obtained as a result of the intra-field conversion, and supplies the extracted horizontal high-frequency component to the adder 16. The adder 16 adds the output of the subtractor 15 and the output of the mixer 14. The output of the subtractor 15 is a horizontal high-frequency component obtained as a result of the intra-field conversion. The output of the mixer 14 is a horizontal low-frequency component of the video image obtained by scanning line conversion of adaptive processing responsive to the vertical edges of the stationary picture. The adder 16 adds these signals and its output is applied to the output terminal 2.

Embodiment 2

Figure 7:
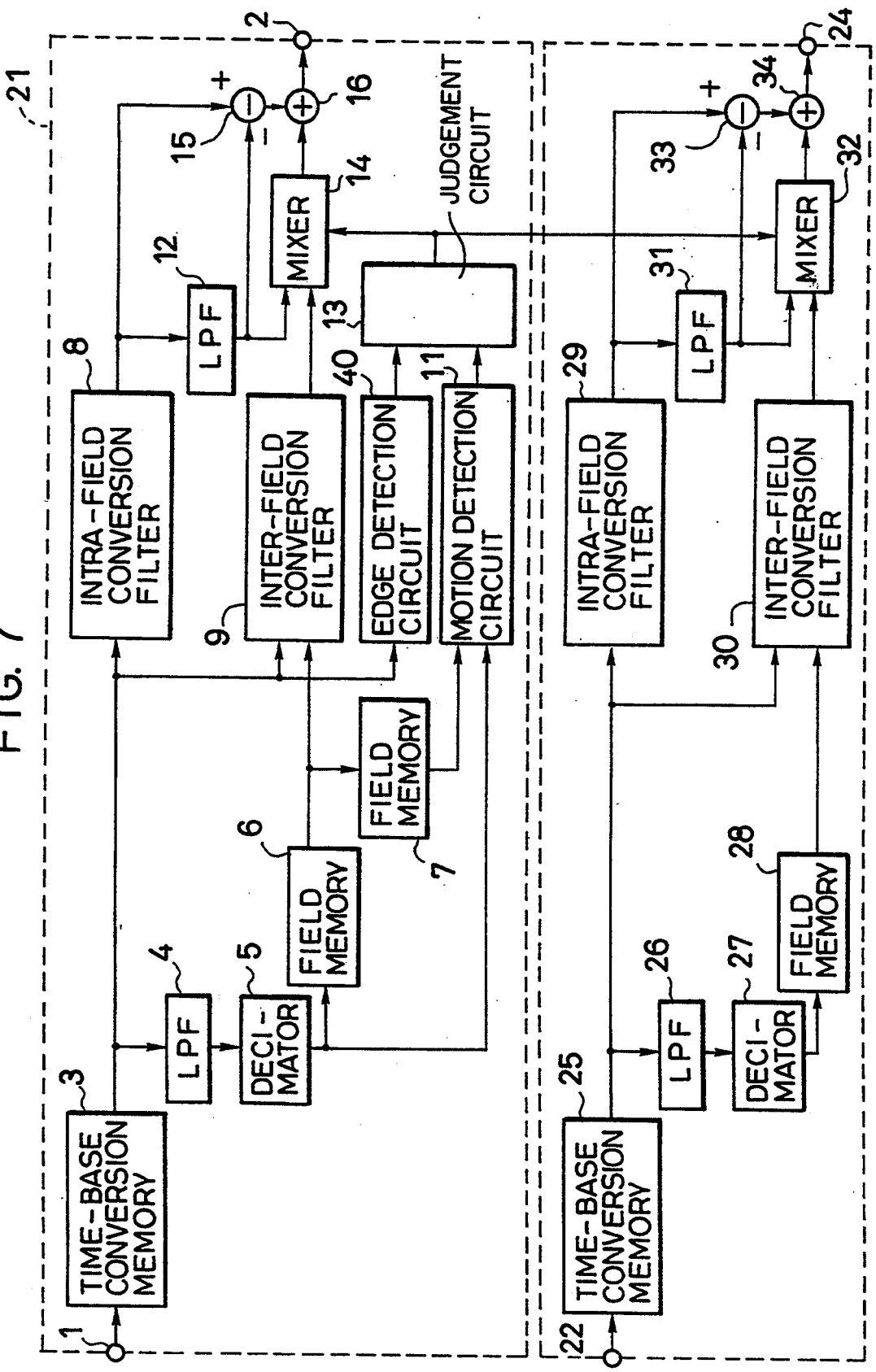
FIG. 7 is a block diagram showing another embodiment off motion-adaptive scanning-line conversion circuit according to the invention.

FIG. 7 shows another embodiment of motion-adaptive scanning-line conversion circuit according to the invention. In FIG. 7, circuits identical or similar to those in FIG. 1 are denoted by identical reference numerals. In addition to the input terminal 1 of FIG. 1, a second input terminal 22 is provided, and in addition to the output terminal 2 of FIG. 7, a second output terminal 24 is provided. The input terminal 1 is used for receiving a luminance signal, which consists of a sequence of samples representing sample values, and the input terminal 22 is for receiving a chrominance signal, which consists of a sequence of samples representing sample values. The output terminal 2 is used for outputting a scanning-line converted luminance signal. The output terminal 24 is for outputting a scanning-line converted chrominance signal. A luminance signal processing circuit 21 comprising the circuits 3 to 16 for processing the luminance signal is identical to the circuits shown in FIG. 1 for processing the video signal.

In addition, a chrominance signal processing circuit 23 for processing the chrominance signal is provided. The chrominance signal processing circuit 23 includes a time-base conversion memory 25 for performing a time-base conversion, an LPF 26 for band-limiting the horizontal frequency of the output of the time-base conversion memory 25 to 0 to about 2 MHz, a decimator 27 for decimating the data by subsampling, a field memory 28 for delaying the output of the decimator 27 by one field, an intra-field conversion filter 29 for performing intra-field conversion, an LPF 31 for band-limiting the horizontal frequency of the output of the intra-field conversion filter 29 to 0 to about 2 MHz, an inter-field conversion filter 30 for performing inter-field conversion, a mixer 32 for mixing the output of the LPF 31 and the output of the inter-field conversion filter 30 with a mixing ration according to the mixing control signal from -the judgement circuit 13, a subtractor 33 subtracting the output of the LPF 31 from the outpour of the intra-field conversion filter 29, and an adder 34 for adding the output of the subtractor 33 and the output of the mixer 32.

The chrominance signal processing circuit 23 motion-adaptively processes the chrominance signal. That is, not only the mixing of the luminance signal at the mixer 13, but also the mixing of the chrominance at the mixer 32 is controlled in accordance with the result of the detection of edges in the luminance signal and the detection of motion in the luminance signal at the edge detection circuit 40 and the motion detection circuit 11.

More specifically, the chrominance signal input to the input terminal 22 is written in the time-base conversion memory 25, and is read out in time with a clock frequency phase-locked with the horizontal scanning frequency of the display device used for the display. In this way, the time-base conversion is performed.

The output of the time-base conversion memory 25 is input to the LPF 26, the intra-field conversion filter 29 and the inter-field conversion filter 30. The LPF 26 band-limits the horizontal frequency such as to avoid aliasing when the signal is later decimated at the decimator 27. The decimation factor is 2, for example. By virtue of the decimation, the sample frequency is lowered and the amount of data per field is reduced.

The output of the decimator 27 is input to the field memory 28, which delays the signal by one field. Because the amount of data per field is reduced, the capacity of the field memory 28 is reduced.

The output of the field memory 28 is input to the inter-field conversion filter 30, which performs inter-field conversion by vertical filtering through calculation on pixels separated by one field.

The intra-field conversion filter 29 performs the intra-field conversion by vertical filtering of pixels in the same field. The output of the intra-field conversion filter 29 is input to the LPF 31 and the subtractor 33. The LPF 31 band-limits its input signal with a frequency characteristic similar to that of the LPF 26. The LPF 31 thereby extracts the horizontal low-frequency component of the result of intra-field conversion, and the extracted low-frequency component is input to the mixer 32.

The output of the inter-field conversion filter 30 is input to the mixer 32. The mixer 32 mixes the output of the LPF 31 and the output of the inter-field conversion filter 30, with a mixing ratio in accordance with the mixing control signal from the judgement circuit 13. The output of the mixer 32 is input to the adder 34.

The subtractor 33 subtracts the output of the LPF 31 from the output of the intra-field conversion filter 29, to thereby extracts the high-frequency component of the output of the intra-field conversion filter 29. The output of the subtractor 33 is input to-the adder 34, where it is added to the output of the mixer 32. The sum obtained by the adder 34 is output through -the output terminal 24.

The intra-field conversion filter 29 and the inter-field conversion filter 30 may be identical to those of the intra-field conversion filter 8 and the inter-field conversion filter 9 shown in FIG. 3 and FIG. 4.

Embodiment 3

Figure 8:
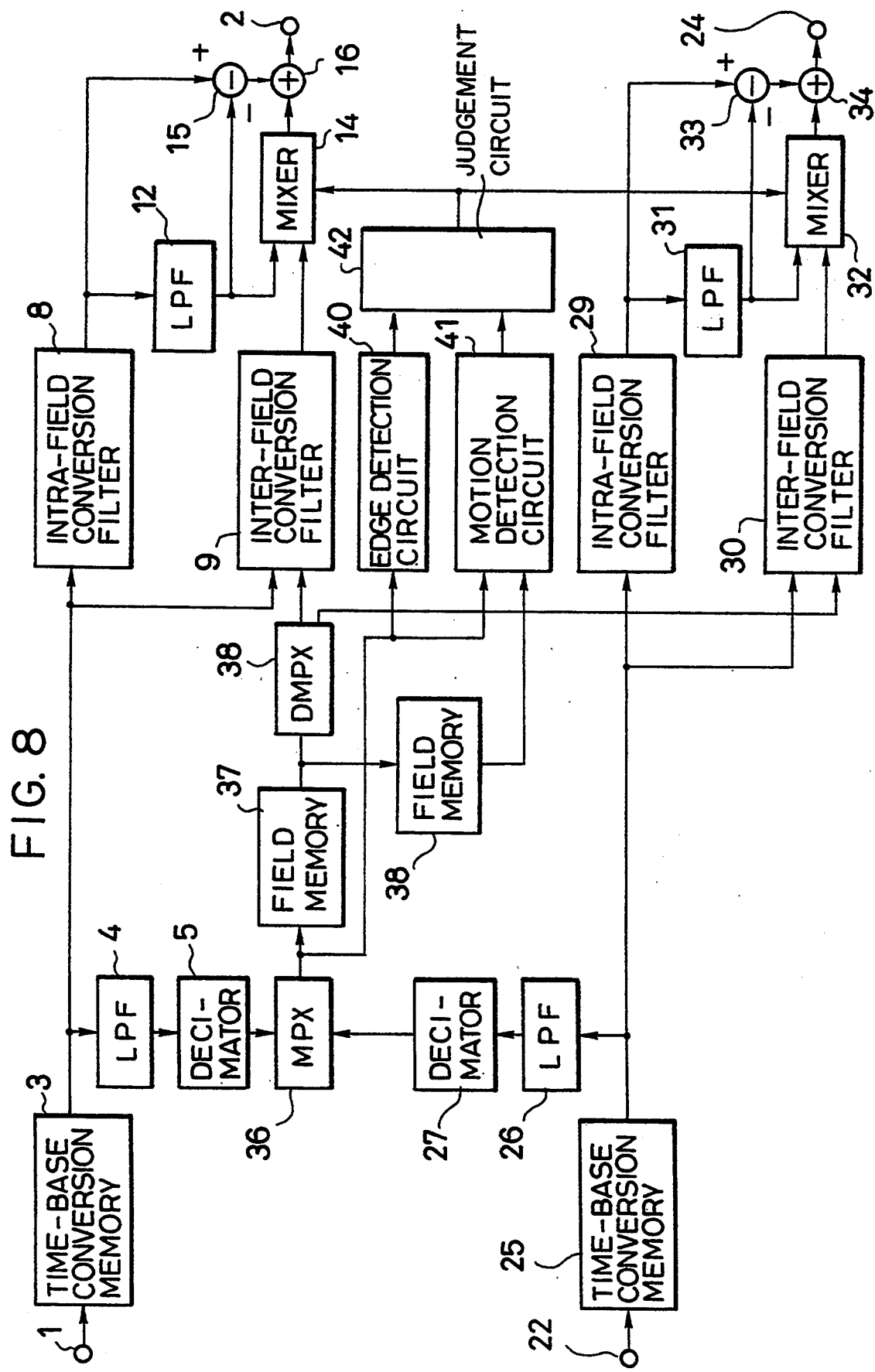
FIG. 8 is a block diagram showing another embodiment of motion-adaptive scanning-line conversion circuit according to the invention.

FIG. 8 shows another embodiment of motion-adaptive scanning-line conversion circuit according to the invention. In FIG. 8, circuits identical or similar to those shown in FIG. 1 or FIG. 7 are denoted by identical reference numerals. The overall configuration is similar to that of FIG. 7. But, the LPF 26, the decimator 27 and the field memory 28 in FIG. 7 are omitted, and instead a multiplexer 36 and a demultiplexer 39 are provided.

The multiplexer 36 time-division multiplexes the outputs of the decimators 5 and 27. The field memories 6 and 7 receive the time-division multiplexed luminance and chrominance signals. The edge detection circuit 40 receives the output of the multiplexer 36 and detects a vertical edge (i.e., detects that a pixel is in an edge) on the basis of the time-division multiplexed luminance and chrominance signals. The motion detecting circuit 11 receives the output of the multiplexer 36 and the output of the field memory 7 and detects motion in the image based on difference between time-division multiplexed luminance and chrominance signals separated by one frame. The demultiplexer 39 demultiplexes the time-division multiplexed luminance and chrominance signals output from the field memory 6 into the luminance signal and the chrominance signal. The luminance signal output from the demultiplexer 39 is supplied to the inter-field conversion filter 9, while the chrominance signal output from the demultiplexer 39 is supplied to the inter-field conversion filter 30.

Embodiment 4

Figure 9:
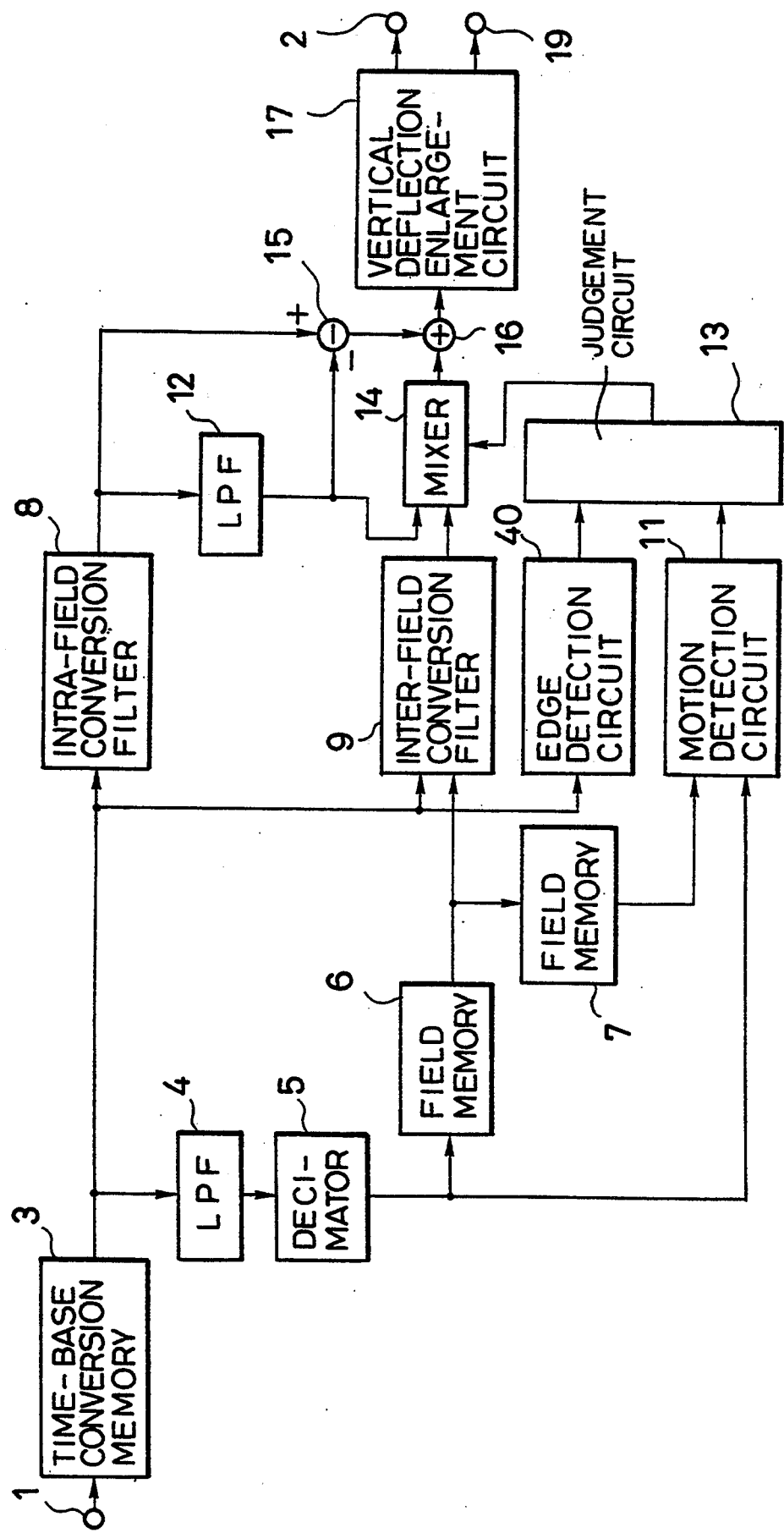
FIG. 9 is a block diagram showing another embodiment of a motion-adaptive scanning-line conversion circuit according to the invention.

FIG. 9 shows another embodiment of a motion-adaptive scanning-line conversion circuit according to the invention. In FIG. 9, circuits identical or similar to those in FIG. 1 are denoted by identical reference numerals. The configuration of FIG. 9 is similar to that of FIG. 1. It is however additionally provided with a vertical deflection enlargement circuit 17 connected to the output of the adder 16. The deflection enlargement circuit 17 produces, at the output terminal 2, a video signal that is displayed on the display tube, and, at an output terminal 19, a control signal for causing enlargement of the vertical deflection at the display tube.

When the number of the scanning lines in the output of the adder 16 is smaller than the number of the scanning lines normally used for the display (the number of the scanning lines with which the display device is basically designed to operate), the vertical deflection needs to be enlarged such that the picture height (height of the valid or effective portion of the picture displayed) corresponds to the height of the screen of the display device.

For instance, if the input signal is a television signal having 360 effective scanning lines, and is scanning-line converted into a video signal having 720 scanning lines, and the display has a 1035 effective scanning lines, the vertical deflection is enlarged so that the picture formed by the video signal of 720 scanning lines covers the entire height of the screen. The extra scanning lines (1035 minus 720) will be outside the height of the screen of the display.

Embodiment 5

Figure 10:
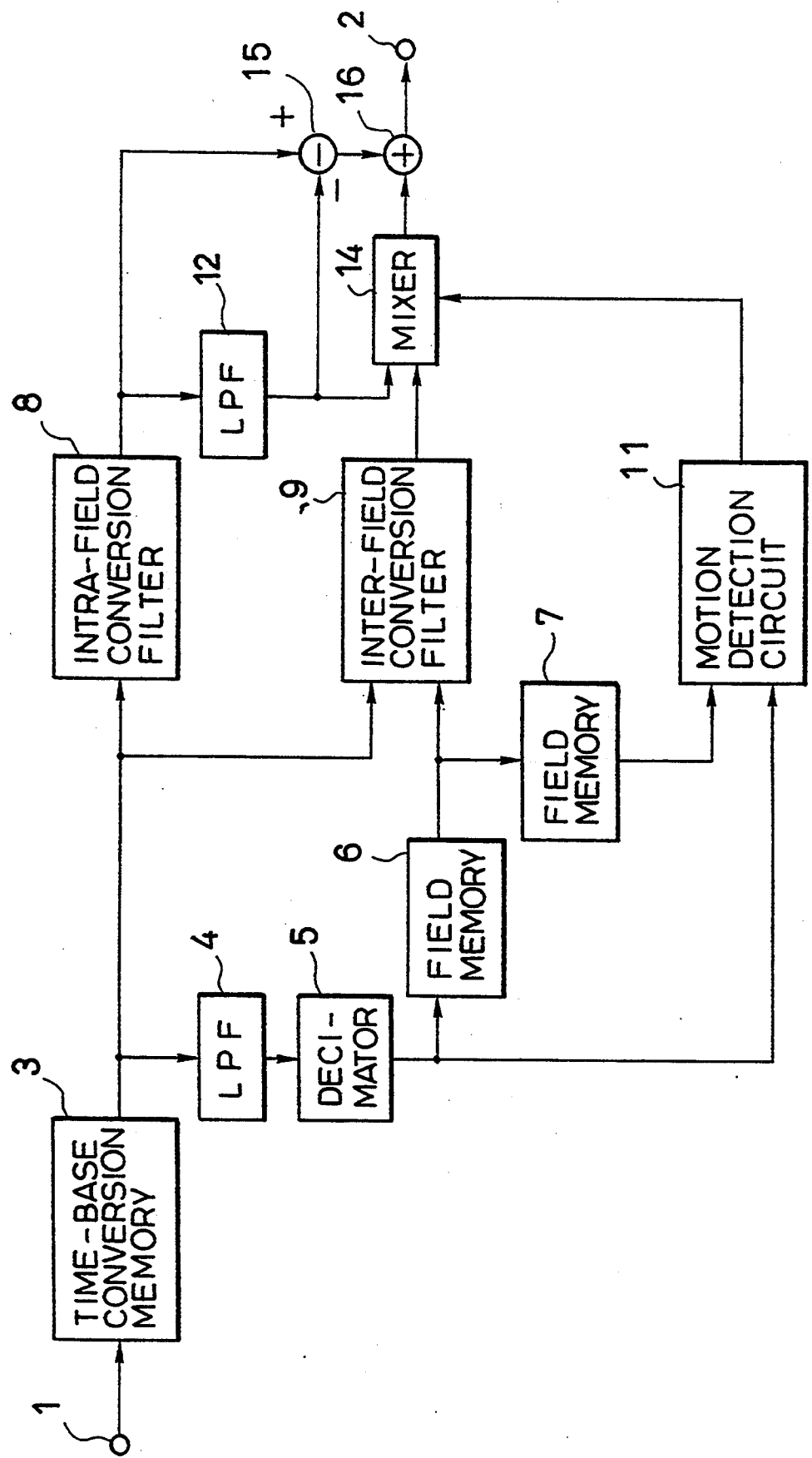
FIG. 10 is a block diagram showing another embodiment of motion-adaptive scanning-line conversion circuit according to the invention.

FIG. 10 is another embodiment of motion-adaptive scanning-line conversion circuit according to the invention. In FIG. 10, circuits identical or similar to those in FIG. 1 are denoted by identical reference numerals.

The difference of the embodiment of FIG. 10 from the embodiment of FIG. 1 is that the edge detection circuit 40 in FIG. 1 and the judgement circuit 13 are omitted, and the mixer 14 is controlled solely by the output of the motion detection circuit 11. That is, the mixer 14 mixes the output of the LPF 12 and the output of the inter-field conversion filter 9 in accordance with the control signal (which, in this embodiment, serves as a mixing control signal) output from the motion detection circuit 11. When the pixel in question is in a stationary part, the output of the inter-field conversion filter 9 is selected. However, the output of the inter-field conversion filter 9 is output (by virtue of the LPF in the inter-field conversion filter 9) only for the horizontal low-frequency component of not higher than about 2 MHz. The output of LPF 12 is selected for other horizontal frequency components, and when the pixel is found to be in a moving part of the picture. Higher frequency components of the output of the intra-field conversion filter 8 is always passed through the subtractor 15 and the adder 16 to the output terminal 2, as in the Embodiment 1.

Figure 11:
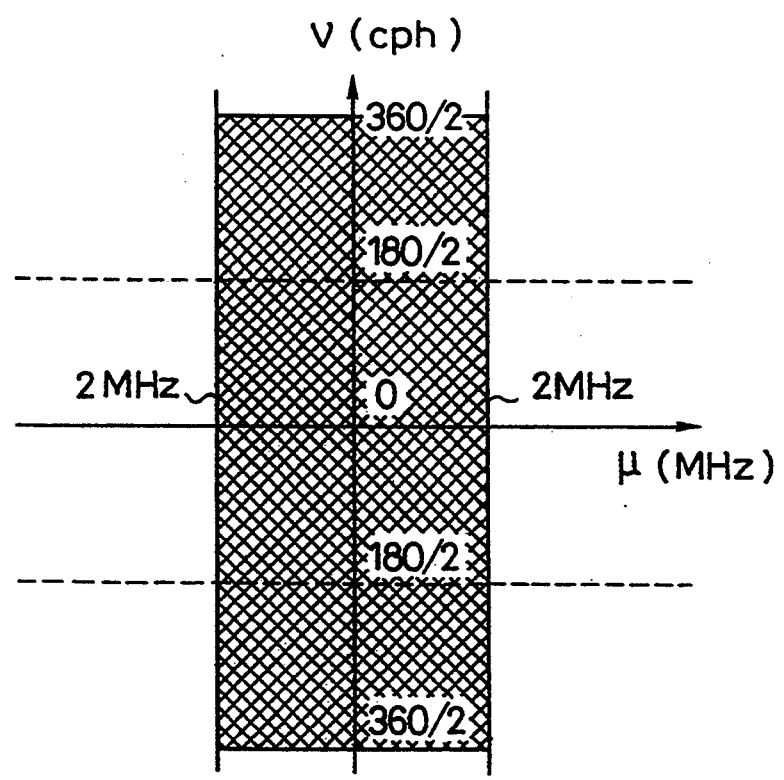
FIG. 11 is a diagram showing, in two-dimensional representation, the spectrum of the image realized by the embodiment of FIG. 10.

FIG. 11 shows, in two-dimensional representation, the spectrum of the image realized by Embodiment 5 of FIG. 10. The region for which the output of the inter-field conversion is selected is cross-hatched.

As illustrated, for the horizontal low-frequency component of not higher than about 2 MHz, the output of the inter-field conversion filter 9 is selected for the stationary part of the picture to thereby reduce the degradation of the vertical resolution, while the area for which the motion-adaptive processing is performed is reduced and the switching operations between inter-field conversion and intra-field conversion are reduced.

Embodiment 6

Figure 12:
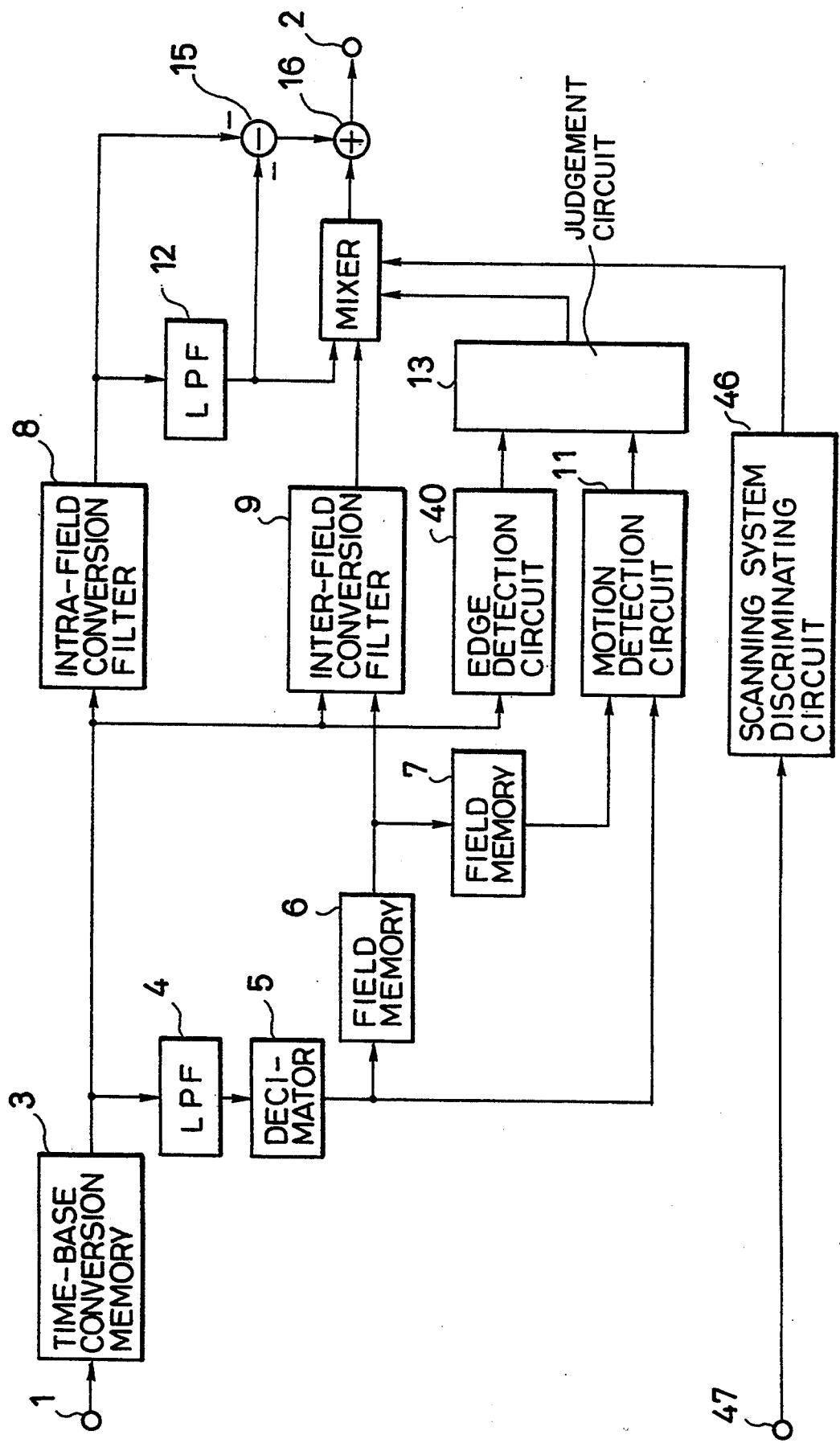
FIG. 12 is a block diagram showing another embodiment of motion-adaptive scanning-line conversion circuit according to the invention.

FIG. 12 shows another embodiment of motion-adaptive scanning-line conversion circuit according to the invention. In FIG. 12, circuits identical or similar to those in FIG. 1 are denoted by identical reference numerals. The circuit of FIG. 12 is similar to that of FIG. 1, but is additionally provided with another input terminal 47 and a scanning system discriminating circuit 46.

In the embodiments described so far, it is assumed that the input signal is of an interlaced scanning, and is converted to a signal of an interlaced scanning. The circuit of the present embodiment can handle both the input video signal of a progressive scanning, and the input video signal of an interlaced scanning. Whichever of the input video signal is applied, the circuit of the resent embodiment converts it into a video signal of an interlaced scanning and of a different number of scanning lines.

The input terminal 47 is for receiving the synchronous signal, and the scanning system discriminating circuit 46 discriminates between the interlaced scanning system and the progressive scanning system on the basis of the received synchronous signal. The result of the discrimination is used for control over the mixer 14. That is, if the input video signal is found to be of a progressive scanning, the mixer keeps selecting the output the intra-field conversion filter 8. If the input video is found to be of an interlaced scanning, the operation (selection) similar to that described with reference to the Embodiment 1 is performed.

For instance, if the input signal is of a progressive scanning, as in a case where the input signal is one for a TV game supplied from a TV game adapter, such an input signal can be scanning-line converted into a signal of interlaced scanning for display in an HDTV display device.

Embodiment 7

Figure 13:
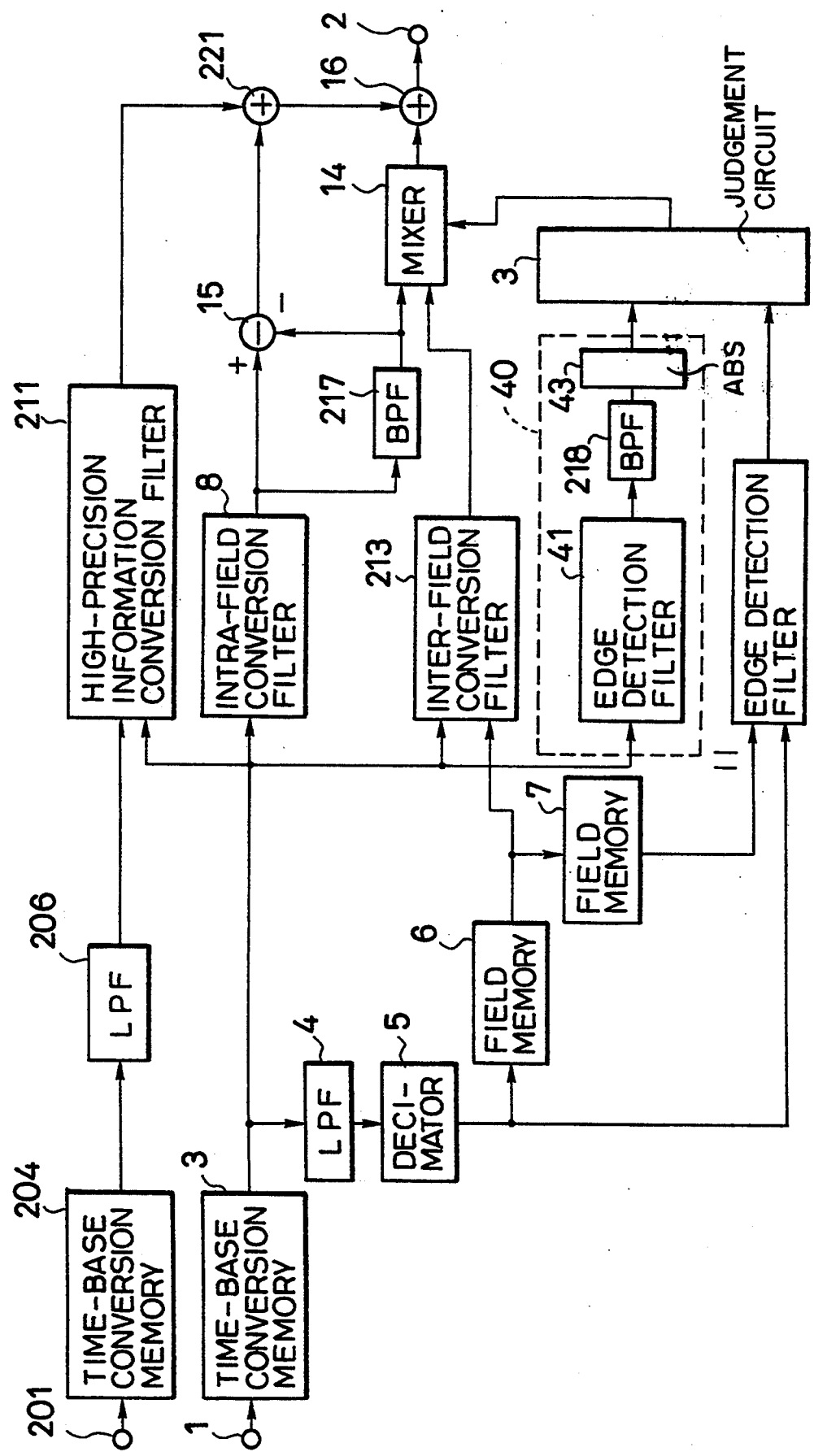
FIG. 13 is a block diagram showing a motion-adaptive scanning-line conversion circuit according to another embodiment of the invention.

FIG. 13 is a block diagram showing a motion-adaptive scanning-line conversion circuit according to another embodiment of the invention. This embodiment as well as Embodiment 8 to Embodiment 14 are for processing an EDTV signal of a letter-box type having high-precision information multiplexed in the upper and lower mask parts of the image signal. It is assumed that the main part of the video image consists of 360 scanning lines, and the upper and lower mask parts consist of 120 scanning lines.

The circuit of Embodiment 7 of FIG. 13 is similar to the circuit of FIG. 1. But instead of the LPF 12, a band-pass filter (BPF) 217 is provided. Further provided are an additional input terminal 201, an additional time-base conversion memory 204, an LPF 206, a high-precision information conversion filter 211, and an adder 221. The edge detection circuit 40 of this embodiment is similar to the edge filter 40 of FIG. 1, but it comprises a BPF 218 instead of the LPF 42 in FIG. 1.

The band-pass filters 217 and 218 band-limit the horizontal components to the range of about 1.4 to 2.8 MHz. The time-base conversion memory 204 performs the time-base conversion. The LPF 206 band-limits the horizontal component of not higher than about 1.4 MHz. The high-precision information conversion filter 211 receives the high precision information multiplexed in the upper and lower mask parts, and performs scanning line conversion. The adder 221 adds the output of the subtractor 15 and the output of the high-precision information conversion filter 211. The output of the adder 221 is added to the out, put of the mixer at the adder 16.

FIG. 14 shows, in two-dimensional representation, the spectrum of the image realized by the motion-adaptive scanning-line conversion circuit according to the present embodiment.

In FIG. 14, the region for which the demodulated high-precision information is added is hatched by horizontal lines, while the region for which the output of the inter-field conversion is selected is cross-hatched.

In the motion adaptive scanning-line conversion circuit according to the present embodiment, for the frequency component of up to about 1.4 MHz, the output of the inter-field conversion is not selected, while the vertical high-frequency component multiplexed in the upper and lower mask parts are demodulated, and the demodulated signals are used for scanning line conversion, to thereby realize the vertical frequency band of up to 360/2 cph.

For the frequency component of about 1.4 MHz to 2.8 MHz of stationary pictures, the selection between the output of the inter-field conversion filter and the output of the intra-field conversion filter is made in accordance with the result of detection of an edge and the result of detection of motion. That is, the output of the inter-field conversion filter is selected if the pixel is found to be in a vertical edge in a stationary part of the picture.

For the frequency component of not lower than about 2.8 MHz, the output of the intra-field conversion filter is kept selected. That is, the output of the inter-field conversion filter is not selected even if the pixel is in a vertical edge in a stationary part of-the picture.

The edge detection circuit 40 including the band-pass filter 218 determines, for each pixel, whether the pixel in question is in a vertical edge in an area where the horizontal frequency is within the range of about 1.4 to 2.8 MHz, by detecting a component whose vertical frequency is $(180/2 \pm 90/2)$ cph and whose horizontal frequency is about 1.4 to 2.8 MHz. The result of the edge detection is applied to the judgement circuit 13.

The judgement circuit 13 also receives the result of motion detection from the motion detection circuit 11, and therefore detects a vertical edge in a stationary part of the picture picture and in an area where the horizontal frequency is within -the range of about 1.4 to 2.8 MHz, and provides the mixer 14 with a mixing control signal, which specifies the mixing ratio with which the mixer 14 mixes the output of the BPF 217 and the output of the inter-field conversion filter 213.

The digital video signal applied to the input terminal 201 is written in the time-base conversion memory 204. The high-precision information multiplexed in the upper and lower mask parts is read in synchronism with a clock frequency phase-locked by the horizontal scanning frequency of the display device used for display of the picture. In this way, the time-base conversion is achieved. At the same time, the high-frequency information in the upper and lower mask parts are rearranged into the required number of scanning lines.

That is, the high-precision information for 360 lines in the original image is contained in 120 lines in the upper and lower mask parts. This means that high-precision information for each line is compressed in one third of a line. By the rearrangement performed when reading the data from the time-base conversion memory 204, the high-precision information for each line and contained in one third of a line is developed into a full line. For this purpose, well known technique such as interpolation is employed.

The output of the memory 204 is applied to the LPF 206, which band-limits the frequency of the signal to the components of not higher than about 1.4 MHz. The output of the LPF 206 is applied to the high-precision information conversion filter 211. The output of the time-base conversion memory 3 is also input to the high-precision information conversion filter 211.

The high-precision information conversion filter 211 demodulates the high-precision information on the basis of the output of the time-base conversion memory 3 and the output of the LPF 206. It performs the scanning-line conversion of the high-precision information of the horizontal low-frequency component of not higher than about 1.4 MHz, and converts it into signals of a frequency component of 180/2 to 360/2 cph. When the high-precision information multiplexed in the upper and lower mask parts is demodulated, frequency component of 180/2 to 360/2 cph is obtained. The frequency component of not higher than 180/2 cph is obtained by calculation of the pixels in the same fields in the main image part. In combination, the frequency band up to 360/2 cph can be obtained.

The horizontal frequency component of the output of the inter-field conversion filter 213 is band-limited to about 1.4 to 2.8 MHz by the action of a BPF forming part of the inter-field conversion filter 213, which will be later described in detail.

The BPF 217 extracts the horizontal frequency component of about 1.4 to 2.8 MHz. The output of the subtractor 15 is a horizontal frequency components of not higher than about 1.4 MHz and of not lower than about 2.8 MHz. The output of the subtractor 15 is applied to the adder 221.

The output of the edge detection filter 41 is input to the BPF 218, which extracts the horizontal frequency component of about 1.4 to 2.8 MHz, like the BPF 217. The output of the BPF 218 is passed through the absolute value circuit 43, similar to that of FIG. 1.

The judgement circuit 13 produces a mixing control signal on the basis of the output of the absolute value circuit 43 and the output of the motion detection circuit 11. The mixing control signal is applied to the mixer 14, which receives the output of the BPF 217 (a signal obtained by intra-field conversion and band limited to 1.4 to 2.8 MHz) and the output of the inter-field conversion Filter 213 (a signal obtained by inter-field conversion and band-limited to 1.4 to 2.8 MHz) and mixes the two inputs with a mixing ratio determined by the mixing control signal.

The adder 221 adds the output of the high-precision information conversion filter 211 and the output off the subtractor 15. The output of the high-precision information conversion filter 211 is a signal having a vertical Frequency of 180/2 to 360/2 cph and a horizontal low-frequency component of not higher than about 1.4 MHz. The addition of the output of the high-precision information conversion filter 211 to the output of the intra-field conversion filter 8, which is obtained by intra-field conversion, results in the video image having a vertical frequency band up to 360/2 cph. The output of the subtractor 15 comprises horizontal frequency components of not higher than about 1.4 MHz and of not lower than about 2.8 MHz. The vertical frequency of these components are both up to 180/2 cph. The adder 221 adds the output of the subtractor 15 to the output of the high-precision information conversion filter 211 to realize the vertical frequency band of up to 360/2 cph for the horizontal frequency of up to about 1.4 MHz. The vertical frequency band of the component having a horizontal frequency component of not lower than about 2.8 MHz is unchanged at 180/2 cph.

Thus, the output of the adder 221 comprises the horizontal high-frequency component of not lower than about 2.8 MHz obtained by intra-field conversion and the horizontal low-frequency component of not higher than 1.4 MHz obtained by intra-field conversion and enhanced by the high-precision information.

The adder 16 adds the output of the adder 221 and the output of the mixer 14, which is comprises a horizontal middle-frequency component of about 1.4 to 2.8 MHz, obtained by selection or mixing (with a controlled mixing ratio) of the signal the obtained by intra-field conversion and the signal obtained by inter-field conversion.

The output of the adder 16 is output through the output terminal 2, as the result of the scanning-line conversion of this embodiment.

Figure 15:
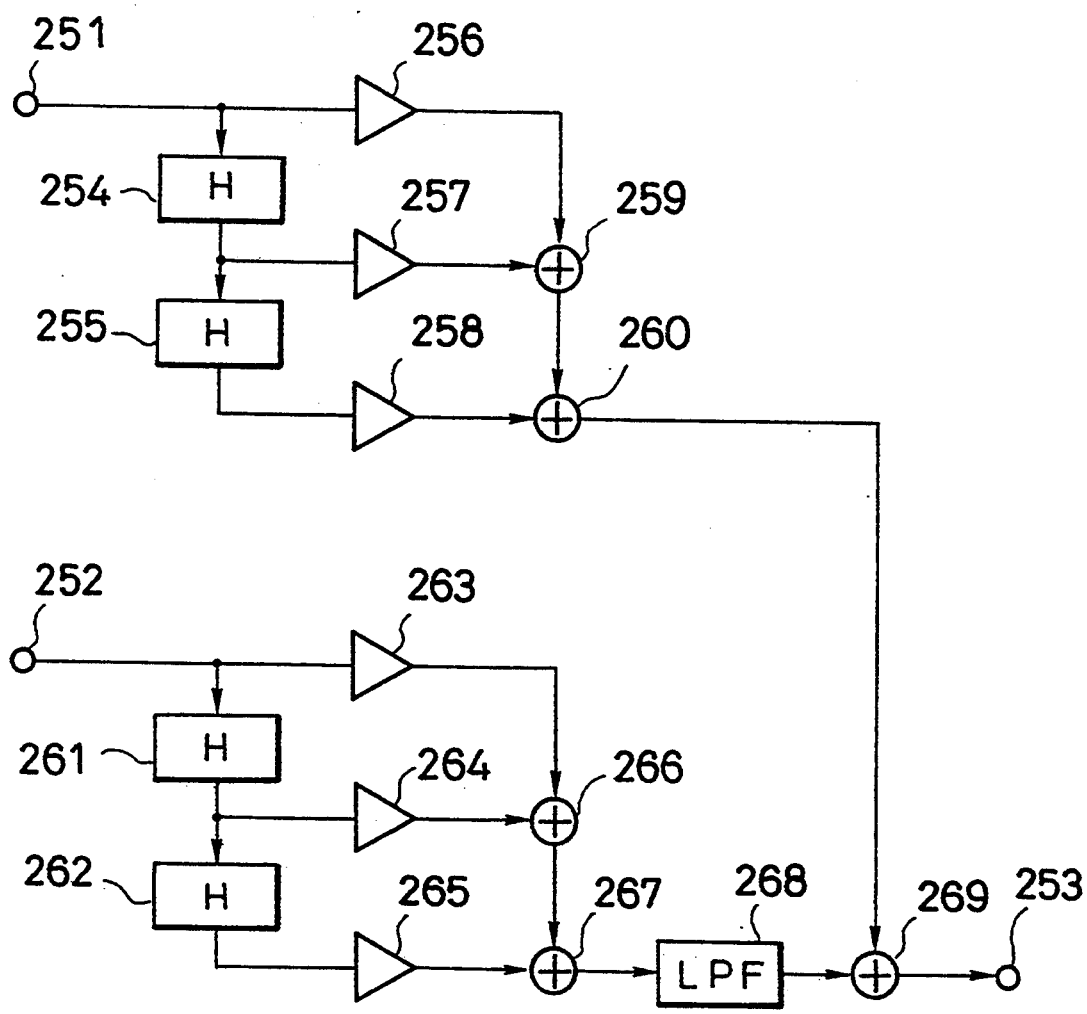
FIG. 15 is a block diagram showing an example of the high-precision information conversion filter used in the embodiment of FIG. 13.

FIG. 15 shows details of an example of the high-precision information conversion filter 211 of FIG. 13. It comprises input terminals 251 and 252, an output terminal 253, line memories 254, 255, 261 and 262 for delaying the signal by one scanning line of the display device used for the display, multipliers 256 to 258 and 263 to 265, adders 259, 260, 267, 269, and an LPF 268. Applied to the input terminal 251 is the video signal multiplexed in the upper and lower- mask parts, at the output of the LPF 206. Applied to the other input terminal 252 is the video signal in the main image part from the time-base conversion memory 3.

The video signal applied to the input terminal 251 is delayed by the line memories 254 and 255 by one scanning line, and the signal at the input terminal 251 and the delayed signals are multiplied with filter coefficients at the multipliers 256 to 258. The outputs of the multipliers 256 to 58 are sequentially added at the adders 259 and 260.

The video signal input to the input terminal 252 is delayed at the line memories 261 and 262 by one scanning line, and the signal at the input terminal 252 and the delayed signals are multiplied with filter coefficients at the multipliers 263 to 265, and the outputs of the multipliers 263 to 265 are sequentially added at the adders 266 and 267.

The output of the adder 267 is input to the LPF 268, which extracts the low-frequency component of not higher than about 1.4 MHz. The output of the adder 260 and the output of the LPF 267 are added at the adder 269, whose output is output through the output terminal 253 as a horizontal low-frequency component of the conversion output obtained using the high-precision information multiplexed in the upper and lower mask parts.

With the configuration of FIG. 15, for the scanning line conversion, the filter coefficients must be altered or determined for each line. The number of the line memories, the number of multipliers, and the number of the adders can be altered by the number of taps of the filter. It is also possible to use two or more sets of the configurations shown in FIG. 15, being connected in parallel with each other, and causing them to operate in turn and multiplex their outputs. With such an arrangement, the operating speed of each set can be lowered, while the operating speed of the entire arrangement is unchanged.

An example of high-precision information conversion filter is described in the above-mentioned publication "A Decoder for a Letter-Box-Type Wide-Aspect EDTV System", which is herein incorporated by reference.

The intra-field conversion filter 8 may be identical to that of Embodiment 1. However, the input to the intra-field conversion filter 8 is the video signal in the main part.

Figure 16:
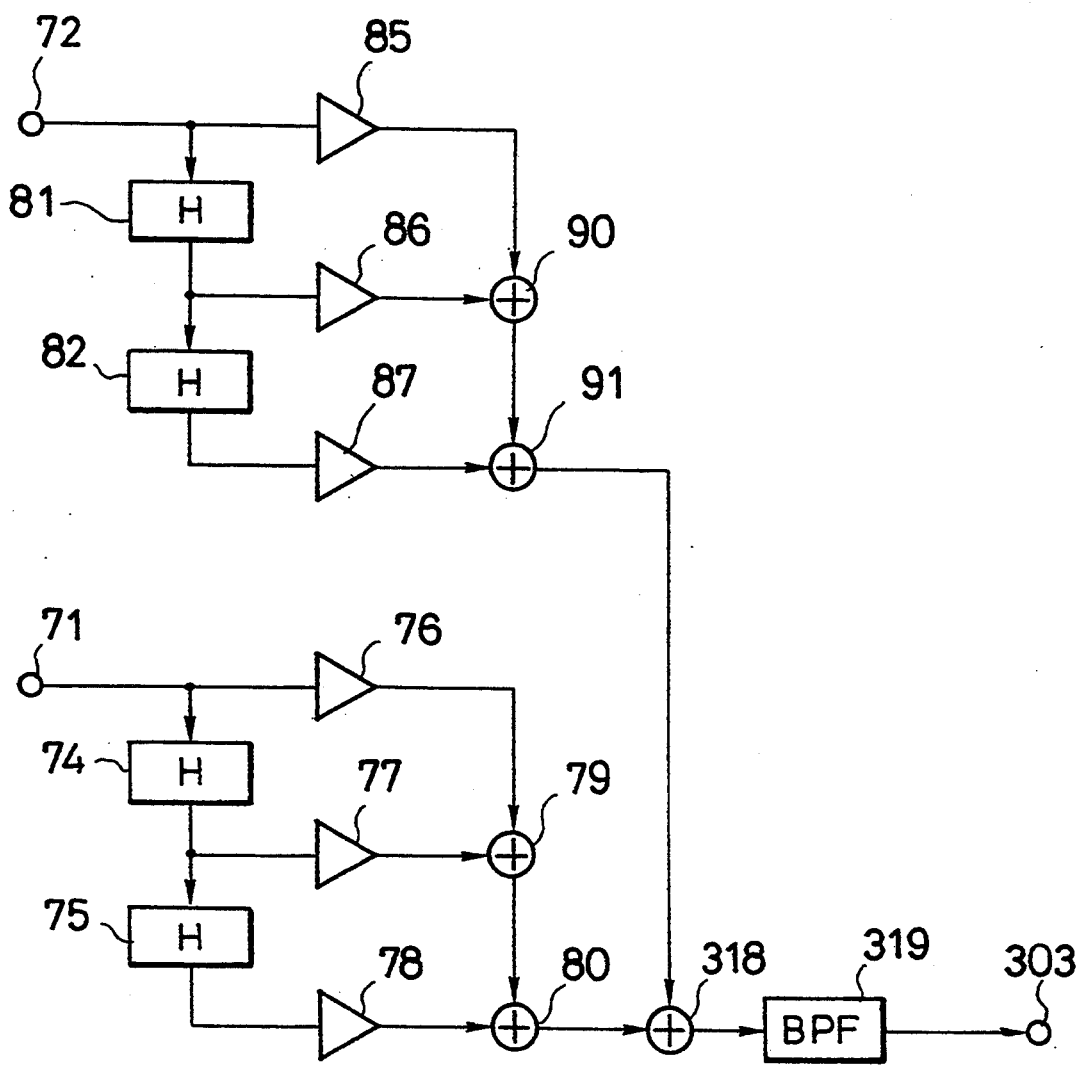
FIG. 16 is a block diagram showing an example of inter-field conversion filter used in the embodiment of FIG. 13.

FIG. 16 shows an example of inter-field conversion filter 213. It is similar to that of FIG. 4 used in Embodiment 1. However, the input applied to the input terminal 72 is a video signal of the main image part from the time-base conversion memory 3. The input applied to the input terminal 71 is a video signal of the main image part from the field memory 6 (that has been delayed by one field).

The output of the adders 91 and 80 are added at the adder 318, whose output is applied to the band-pass filter 119 having a pass-band of about 1.4 MHz to 2.8 MHz.

The edge detection filter 41 may be identical to that of Embodiment 1. However, connected to the output off the edge detection filter 41 is a band-pass filter 218 instead of the LPF 42. The signal applied to the edge detection filter 41 is the video signal of the main image part from the the time-base conversion memory 3.

The motion detection circuit 11 of FIG. 13 may be identical to the motion detection circuit 11 shown in FIG. 6. However, the signals input to the motion detection circuit of FIG. 13 are band-limited to the range of not higher than about 2.8 MHz by the LPF 4. In contrast, the signal applied to the motion detection circuit 11 shown in FIG. 1 is band-limited to the range of not higher than about 2.0 MHz.

Embodiment 8

Figure 17:
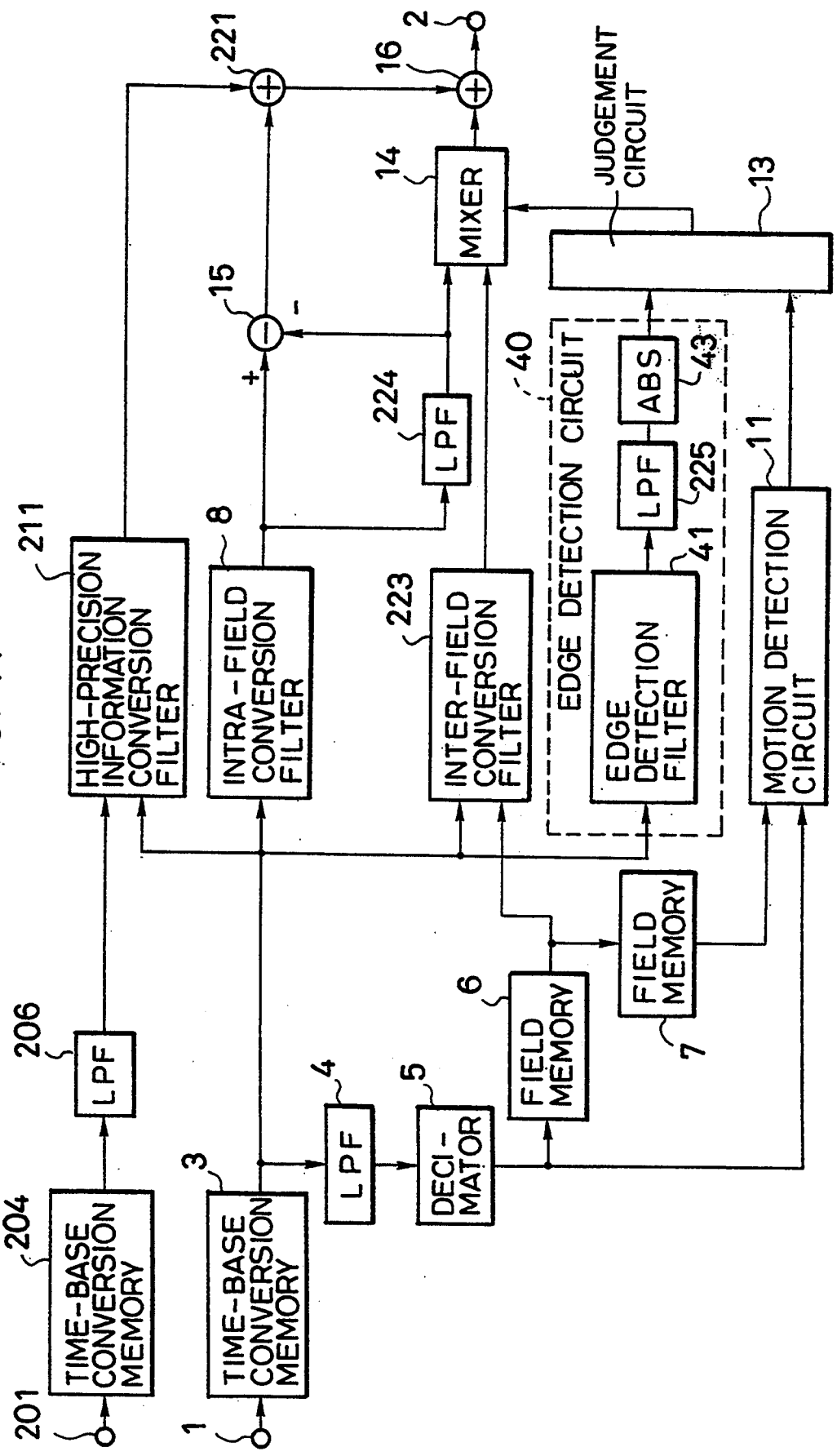
FIG. 17 is a block diagram showing another embodiment of motion-adaptive scanning-line conversion circuit according to the invention.

FIG. 17 shows another embodiment of motion-adaptive scanning-line conversion circuit according to the invention. In FIG. 17, circuits identical or similar to those in FIG. 13 are denoted by identical reference numerals. It is similar to the embodiment of FIG. 13. However, instead of the BPFs 217 and 218, LPFs 224 and 225 having the band-width of 0 to about 2.8 MHz are provided. Instead of the inter-field conversion filter 213, an inter-field conversion filter 223 is provided. The inter-field conversion filter 223 differs from the inter-field conversion filter 213 in that it has a built-in LPF, rather than a BPF, as will be shown in FIG. 20.

The difference of the embodiment of FIG. 17 from the embodiment of FIG. 13 is that the scanning-line conversion is performed without demodulating the high-precision information multiplexed in the upper and lower mask parts, and the horizontal low-frequency component of the video signal is all subjected to the motion-adaptive processing. When an edge in a stationary part of the picture is detected, the output of the inter-field conversion is selected for horizontal low-frequency component of not higher than about 2.8 MHz, while the output of the inter-field conversion is not selected for other horizontal frequency components, even if the pixel is in a stationary part of the picture.

Figure 18:
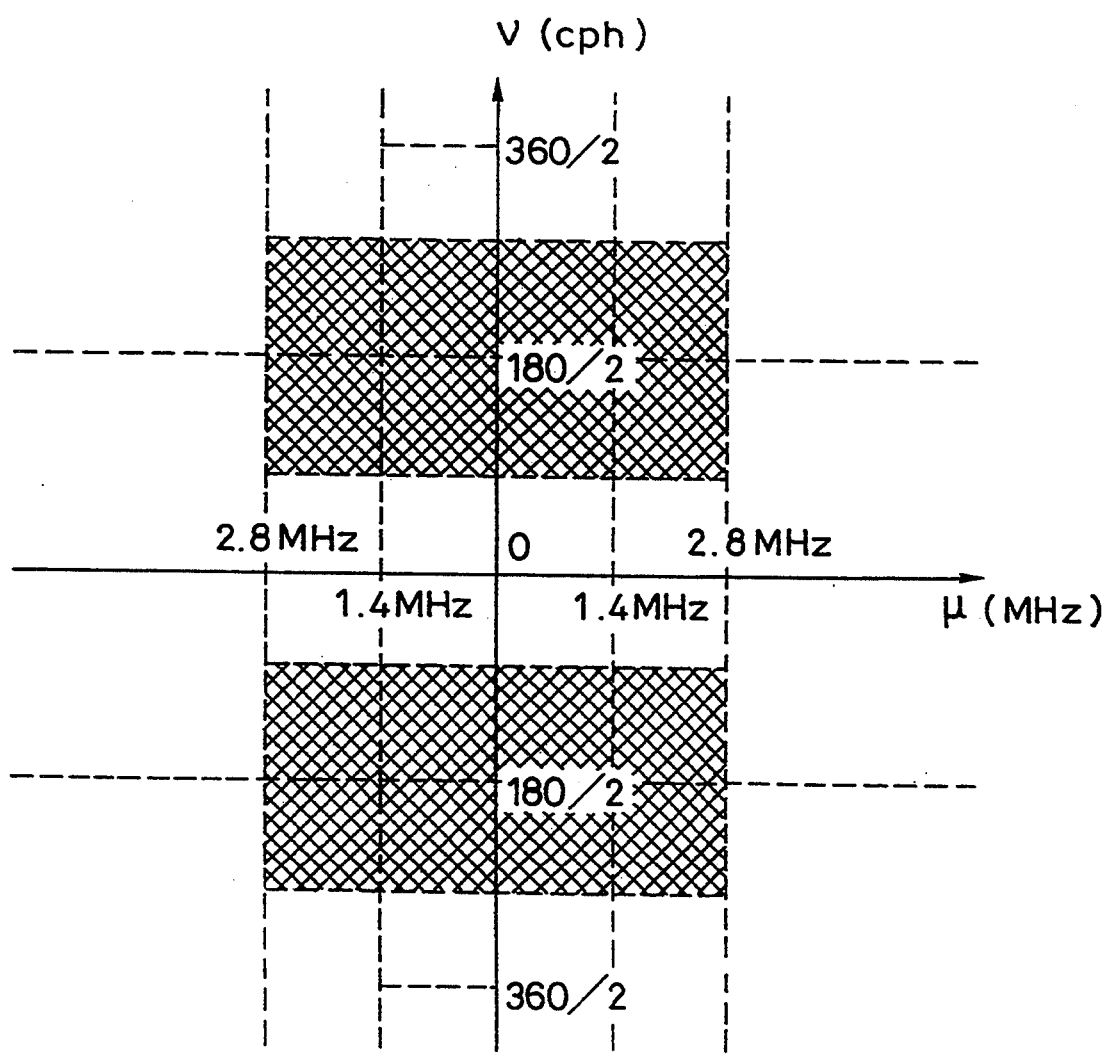
FIG. 18 is a diagram showing, in two-dimensional representation, the spectrum of the image realized by the motion-adaptive scanning-line conversion circuit of the embodiment of FIG. 17.

FIG. 18 shows, in two-dimensional representation, the spectrum of the image realized by the motion-adaptive scanning-line conversion circuit of this embodiment.

The edge detection circuit 40 detects a component having a vertical frequency of $(180/2 \pm 90/2)$ cph, and a horizontal frequency of not higher than about 2.8 MHz. The motion detecting circuit 11 detects the stationary part off the picture from the inter-frame difference. In FIG. 18, the region-where the output of the inter-field conversion is selected is cross-hatched.

In operation, the inter-field conversion filter 223 receives the outputs of the time-base conversion memory 3 and the field memory 6, and performs the inter-field conversion on the outputs of the time-base conversion memory 3 and the field memory 6. The inter-field conversion filter 223 of this embodiment outputs the horizontal low-frequency component of not higher than about 2.8 MHz.

The LPF 225 receives the output of the edge detection filter 10 and extracts the horizontal low-frequency component of not higher than about 2.8 MHz. Its output is passed through the absolute value circuit 43.

The judgement circuit 13 detects edges in stationary part of the picture on the basis of the output of the absolute value circuit 43 and the output of the motion detection circuit 11, and produces a mixing control signal. The mixer 13 mixes the output of the LPF 224 and the output of the inter-field conversion filter 223 with a mixing ratio determined by the mixing control signal from the judgement circuit 14.

The subtractor 15 subtracts the output of the LPF 224 from the output of the intra-field conversion filter 8 to produce a horizontal high-frequency component of not lower than about 2.8 MHz and having been intra-field converted.

The adder 221 adds the output of the high-precision information conversion filter 211 and the output off the subtractor 15. Since, however, the high-precision information in the upper and lower mask parts is not used, the output of the high-precision information conversion filter 211 is zero. For this reason, the horizontal low-frequency component of not higher than about 2.8 MHz of the video signal is all mixed in the mixer 14 with the output of the inter-field conversion filter 223. The adder 16 adds the output of the adder 221 and the output of the mixer 14, and their sum is output through the output terminal 2.

Figure 19:
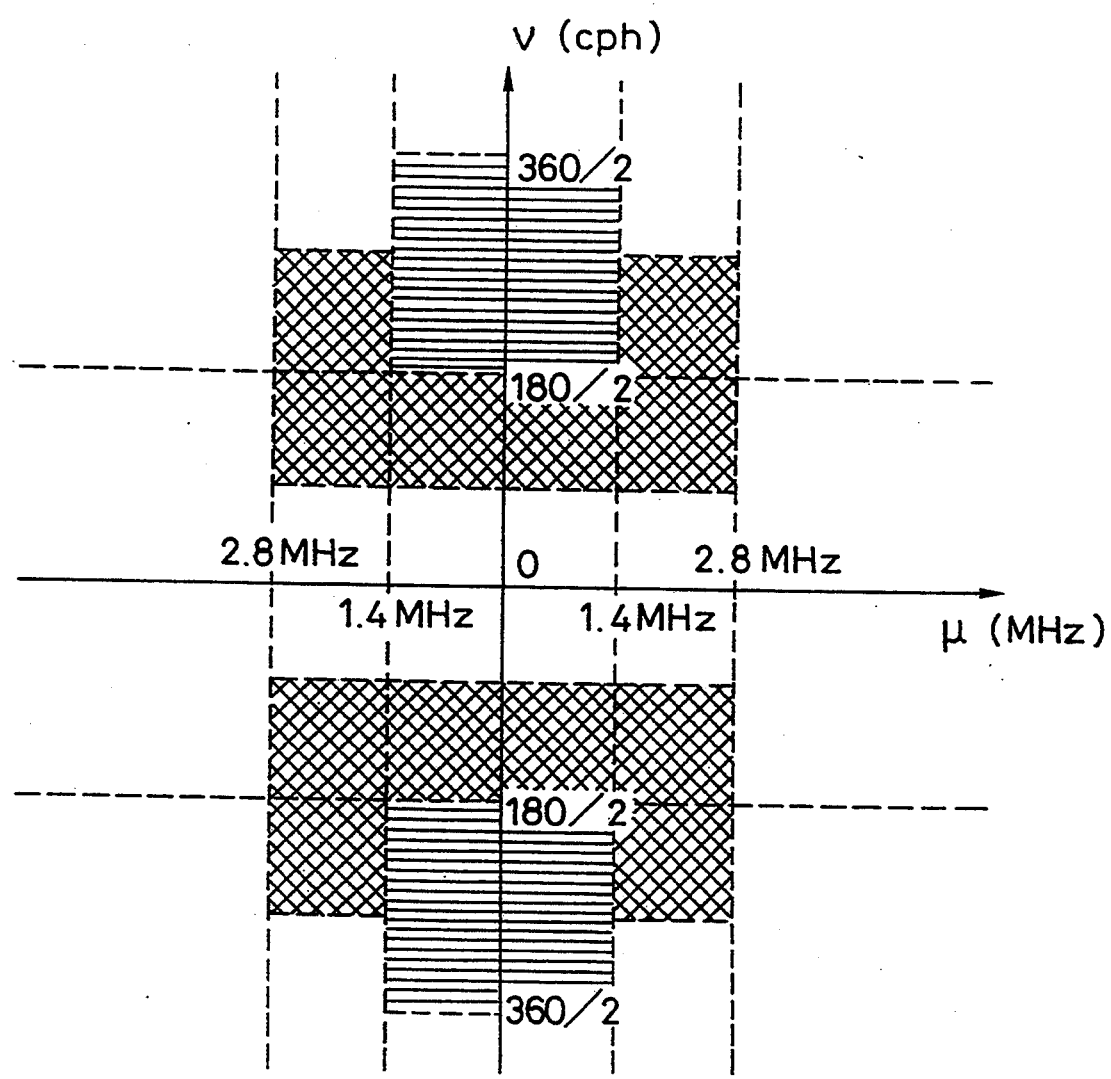
FIG. 19 is a diagram showing, in two-dimensional representation, the spectrum of the image realized by a modification of the embodiment of FIG. 17.

In the above described embodiment, the high-precision information multiplexed in the upper and lower mask parts is not demodulated. However, it is also possible to demodulate the high-precision information, and yet a similar result is obtained. FIG. 19 shows, in two-dimensional representation, the spectrum of the image realized by such a modification (in which the high-precision information is demodulated).

In FIG. 19, the region for which video signal is enhanced by the high-precision information (consisting of the vertical high-frequency component of the moving part of the picture) that has been demodulated is hatched by horizontal lines, while the region for which the output of the inter-field conversion is selected is cross-hatched.

As illustrated, for the horizontal low-frequency component of not higher than about 1.4 MHz, the video signal obtained by inter-field conversion and the scanning-line conversion by demodulation of the high-precision information are added.

Figure 20:
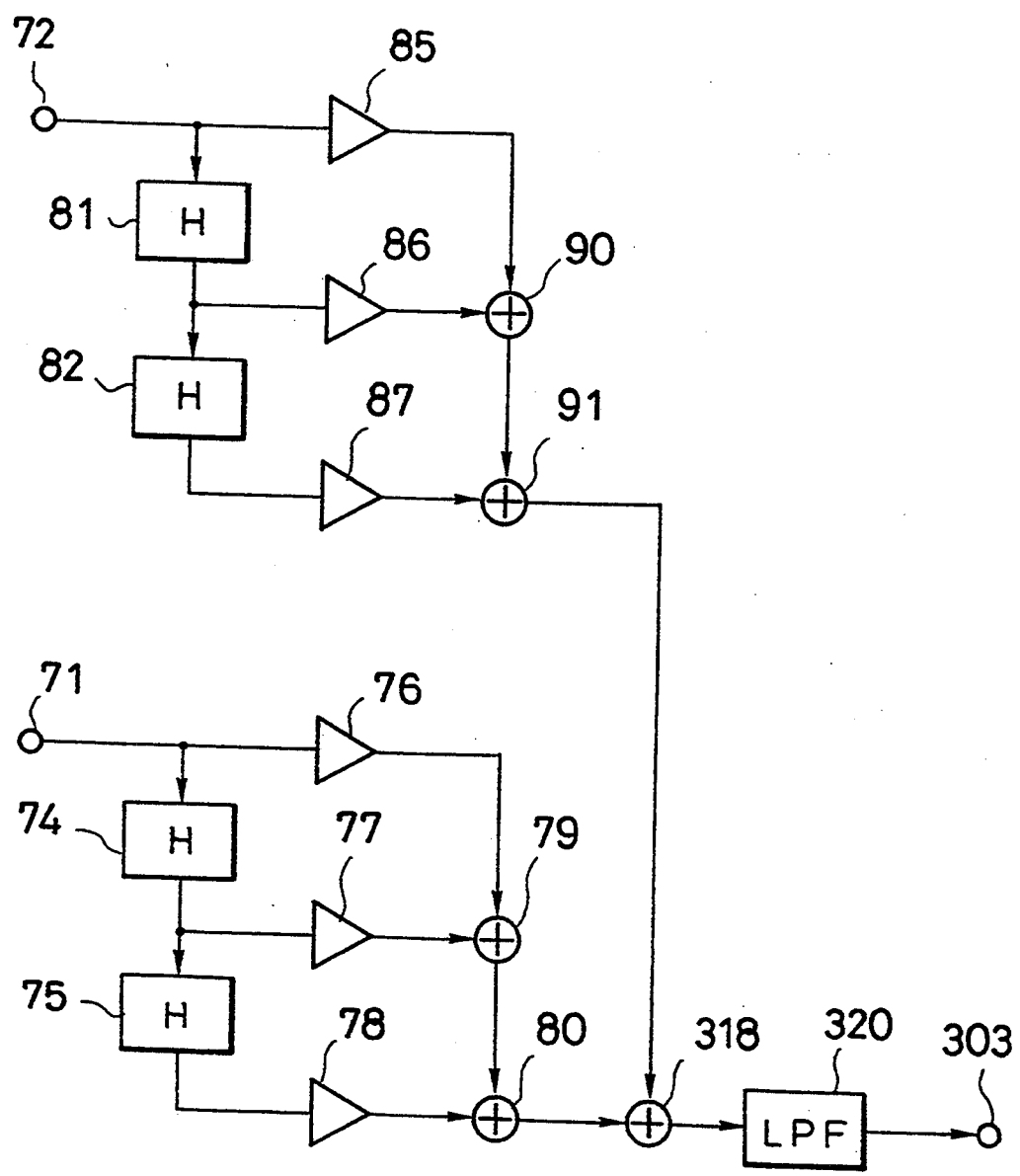
FIG. 20 is a block diagram showing the inter-field conversion filter used in the embodiment of FIG. 17.

FIG. 20 shows the inter-field conversion filter 223. It is similar to the inter-field conversion filter 213 in FIG. 16, and circuits and members identical or similar to those in FIG. 16 are denoted by identical reference numerals. An LPF 320 is provided in place of the BPF 319 of FIG. 16, to extracts the horizontal low-frequency component; of not higher than about 2.8 MHz. The output of the LPF 320 is output via the output terminal 303.

Embodiment 9

Figure 21:
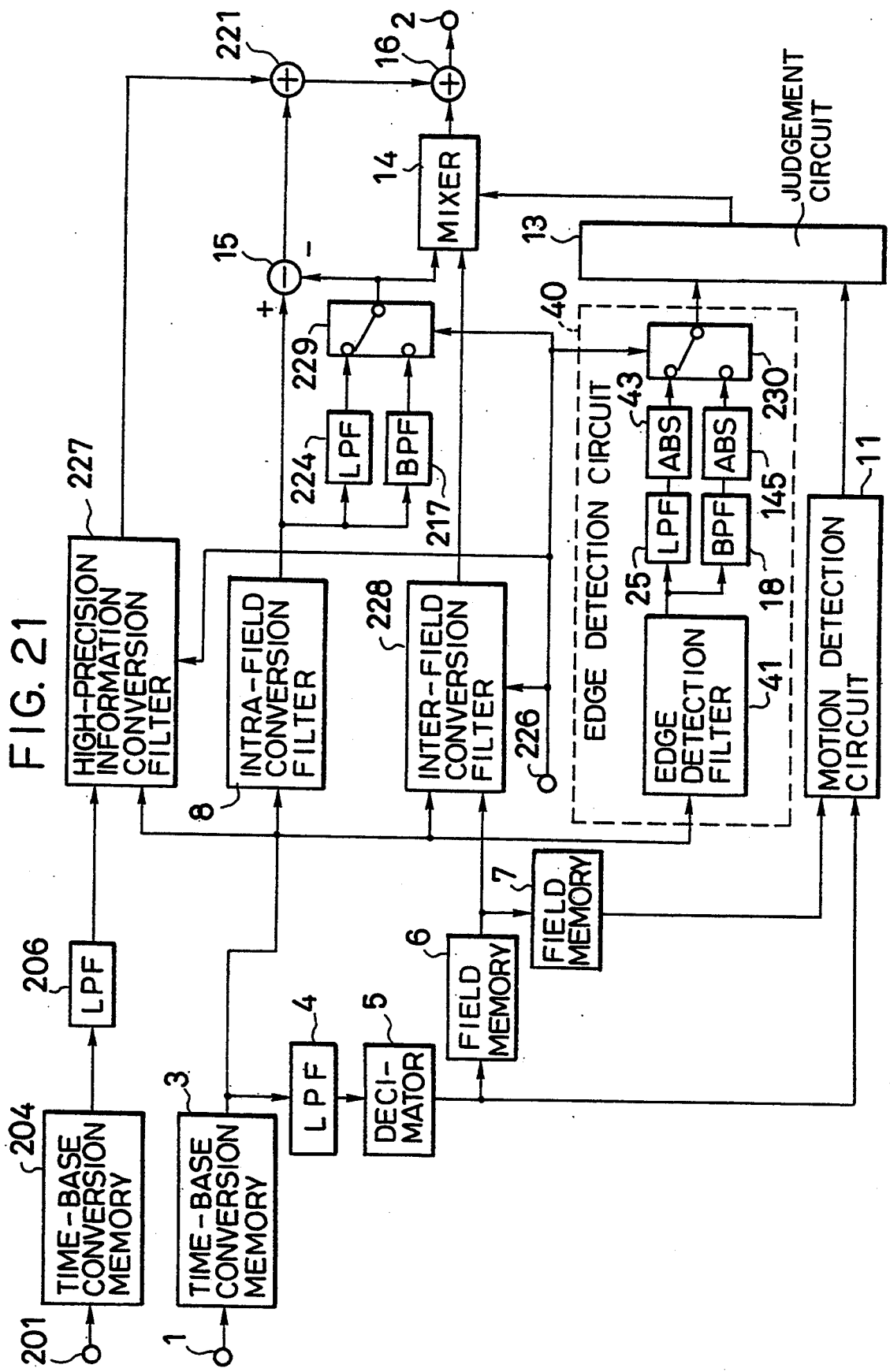
FIG. 21 is a block diagram showing another embodiment of the invention.

FIG. 21 shows another embodiment of the invention. It is similar to Embodiment 7 of FIG. 13, and the circuits and members identical or similar to those in FIG. 13 and FIG. 17 are denoted by identical reference numerals. However, it is further provided with a control input terminal 226 for receiving identification signal for identifying the high-precision information, a high-precision information conversion filter 227, and an inter-field conversion filter 228 for performing the inter-field conversion. Moreover, in addition to the BPFs 217 and 218 similar to those in FIG. 13, LPFs 224 and 225 similar to those in FIG. 17 are provided. Two absolute value circuits with reference numerals 43 and 143 are provided. They are similar to the absolute value circuit 43 of FIG. 13 or FIG. 17. A selecting circuit 229 selects either of the outputs of the LPF 224 and BPF 217. The selection is made in accordance with the identification signal via the input terminal 226. A selecting circuit 230 selects either of the outputs of the absolute value circuits 43 and 143. The selection is made in accordance with the identification signal via the input terminal 226.

The selecting switch 229 selects either of the outputs of the LPF 224 and the BPF 217 depending on the identification signal. If the high-precision information contains the high vertical frequency component of a moving part of the picture, it selects the output of the BPF 217. If the high-precision information contains the high vertical frequency component of a stationary part of the picture, it selects the output of the LPF 224.

The selecting circuit 230 selects either the outputs of the absolute value circuits 43 and 143 in accordance with the identification signal. If the high-precision information contains the vertical high-frequency component of a moving part of the picture, it selects the output of the BPF 218. If the high-precision information contains the vertical high-frequency component of a stationary part of the picture, it selects the output of the LPF 225.

This embodiment can operate in either of two different modes depending on the contents of the high-precision information sent to the television receiver. The high-precision information may contain a selected one of a vertical high frequency component in a stationary part of the picture (e.g., an enhancing signal having a vertical frequency of 360/2 to 480/2 cph and a horizontal frequency of not higher than about 1.4 MHz) and a vertical high frequency component in a moving part of the picture (an enhancing signal having a vertical frequency of 180/2 to 360/2 cph and a horizontal frequency of not higher than about 1.4 MHz), and the selection is made motion adaptively and for each field, for example.

Figure 22:
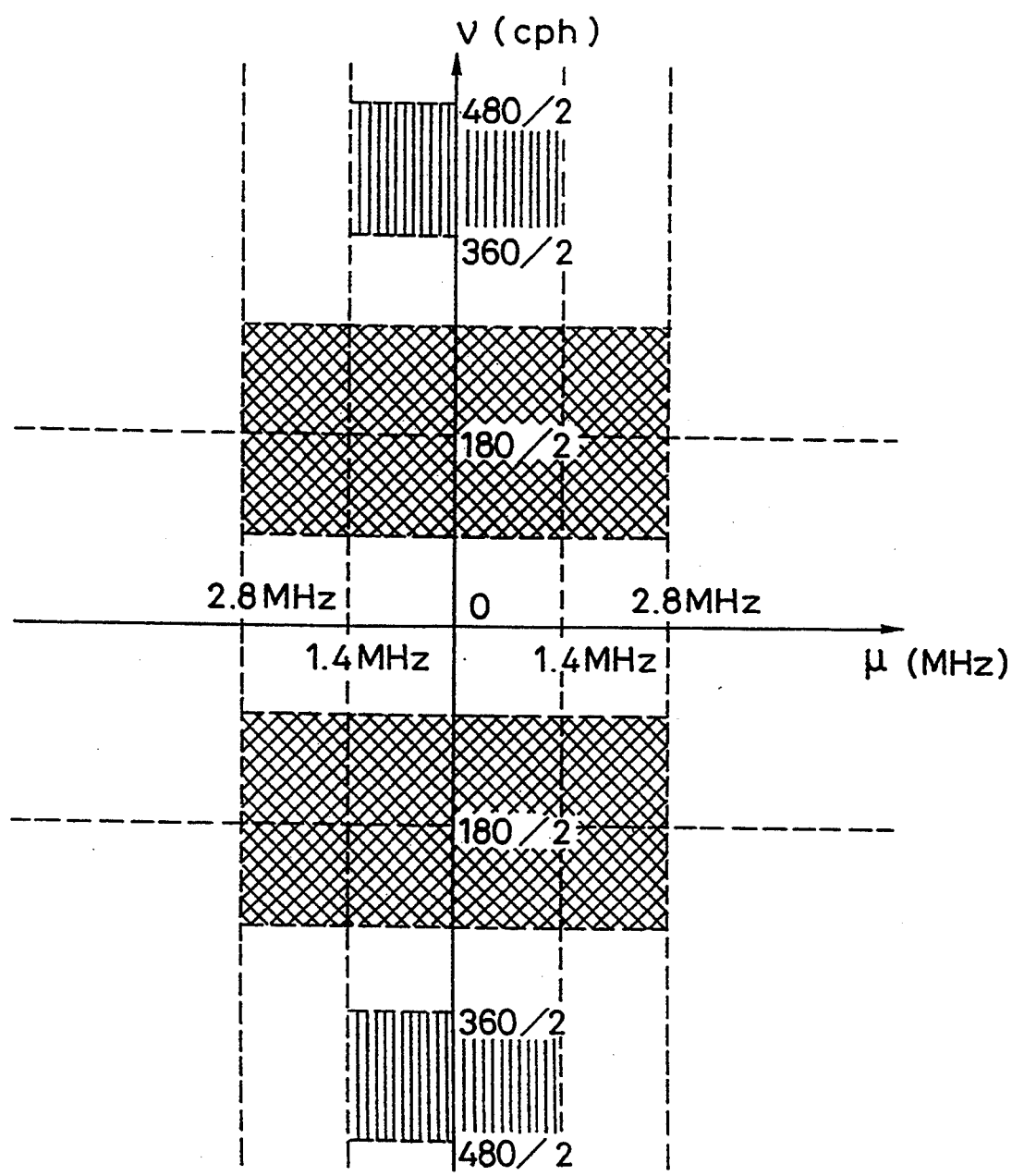
FIG. 22 is a diagram showing the spectrum of the image realized by the embodiment of FIG. 21 when the high-precision information contains the vertical high-frequency component of a stationary part of the picture.

The spectrum of the image realized by the motion-adaptive scanning-line conversion circuit of this embodiment when the high-precision information contains the vertical high-frequency component of a moving part of the picture is identical to that shown in FIG. 14. FIG. 22 shows the spectrum of the image realized when the high-precision information contains the vertical high-frequency component of a stationary part of the picture.

When the high-precision information contains the vertical high-frequency component of a stationary part of the picture, the edge detection filter 10, in combination with the LPF 225, detects a component having a vertical frequency of (180/2±90/2) cph and a horizontal frequency of not higher than about 2.8 MHz, the motion detection circuit 11 detects that the pixel is in a stationary part of the picture, and the judgement circuit detects a vertical edge in a stationary part of the picture, and the mixer 14 selects the output of the inter-field conversion filter 228. In FIG. 22, the region for which the vertical high-frequency component in a stationary part of the picture is demodulated is indicated by cross-hatching. The region for which the high-precision information is added is hatched by vertical lines.

The operation of the circuit of FIG. 21 is similar to that of FIG. 13 or FIG. 17. The following description relates to the operation which is different from that of FIG. 13 or FIG. 17.

The identification signal input to the input terminal 226 indicates whether the high-precision signal contains the vertical high-frequency component in a stationary part of the picture or the vertical high-frequency component in a moving part of the picture. The identification signal is applied to the high-precision information conversion filter 227, the inter-field conversion filter 228, and the selecting circuits 229 and 230.

The high-precision information conversion filter 227 demodulates the high-precision information in accordance with the identification signal. If the high-precision information contains the vertical high-frequency component of a moving part of the picture, it performs the scanning-line conversion of the high-precision information of the horizontal low-frequency component of not higher than about 1.4 MHz to obtain signals of a vertical frequency component of 180/2 to 360/2 cph. If the high-precision information contains the vertical high-frequency component of a stationary part of the picture, it performs the scanning-line conversion of the high-precision information of the vertical high-frequency component in the stationary part of the picture to obtain signals of a vertical frequency component of 360/2 to 480/2 cph. The output of the high-precision information conversion filter 227 is applied to the adder 221.

The inter-field conversion filter 228 performs inter-field conversion. When the high-precision information contains the vertical high-frequency component of a moving part of the picture, it outputs the horizontal frequency component of about 1.4 to 2.8 MHz of the video signal obtained by inter-field conversion. When the high-precision information contains the vertical high-frequency component of a stationary picture, it outputs the horizontal low-frequency component of not higher than about 2.8 MHz of the video signal obtained by inter-field conversion.

The LPF 224 receives the output of the intra-field conversion filter 8, and band-limits the input to extract the horizontal low-frequency component of not higher than about 2.8 MHz. In other words, the LPF 224 operates in the same manner as the LPF 224 in FIG. 17. Similarly, the BPF 217 operates in the same manner as the BPF 217 in FIG. 13. The selecting switch 229 selects either of the outputs of the LPF 224 and the BPF 217 depending on the identification signal.

The LPF 225 operates in the same manner as the LPF 225 in FIG. 17. Similarly, the BPF 218 operates in the same manner as the BPF 218 in FIG. 13. The selecting circuit 230 selects either the outputs of the absolute value circuits 43 and 143 in accordance with the identification signal.

The judgement circuit 13 is responsive to the output of the selecting circuit 230 to find a vertical edge in a stationary part of the picture, and outputs a mixing control signal.

The mixer 14 mixes the outputs of the selecting circuit 229 and the inter-field conversion filter 228 with a mixing ratio determined by the mixing control signal.

It is possible to omit the BPF 217 and the selecting circuit 229 and connect the output of the BPF 217 directly to the mixer 14. Even if the high-precision information multiplexed in the upper and lower mask parts consists of vertical high-frequency components in a moving part of the picture, the output of the high-precision information conversion filter 227 is added at the adder 221. In this case, the spectrum of the image is as seen in FIG. 19.

Figure 23:
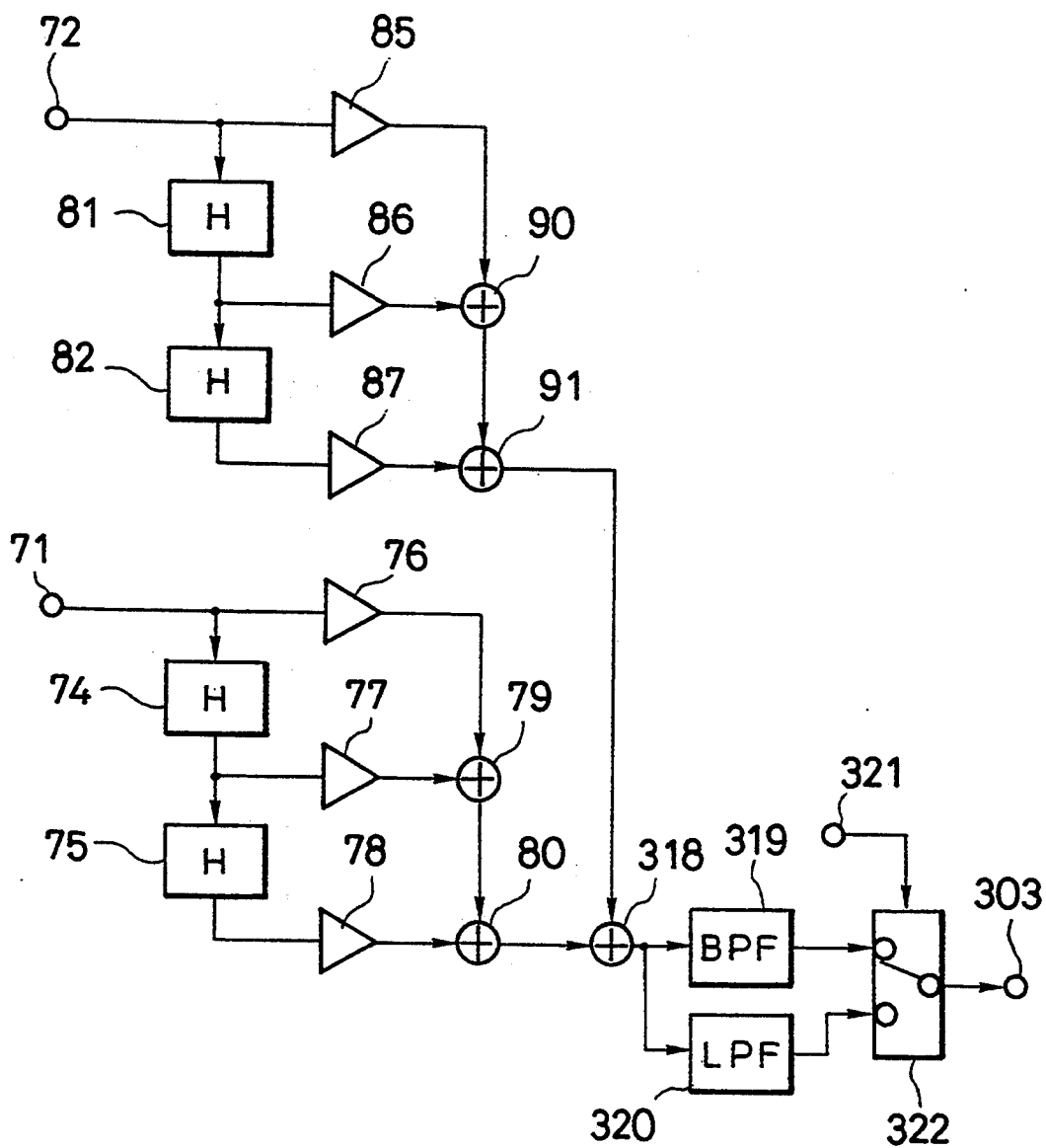
FIG. 23 is a block diagram showing an example of inter-field conversion filter used in the embodiment of FIG. 21.

An example of inter-field conversion filter 228 of FIG. 21 is shown in FIG. 23. In FIG. 23, circuits identical to those in FIG. 16 are denoted by identical reference numerals. In the figure, an input terminal 321 is for receiving an identification signal indicating whether the signal multiplexed in the upper and lower mask parts is a vertical high-frequency component in a stationary part of the picture or a vertical high-frequency component in a moving part of the picture.

The output of the adder 318 is input to a BPF 319 and an LPF 320. The outputs of the BPF 319 and LPF 320 are input to the selecting circuit 322. The selecting circuit 322 selects either of the two inputs in accordance with the identification signal. That is, it selects the output of the LPF 320 when the identification signal indicates the high-precision information consists of the vertical high-frequency component of the stationary part of the picture. It selects the output of the BPF 319 when the high-precision information consists of the vertical high-frequency component of the moving part of the picture. The output of the selection circuit 322 is output via the output terminal 303.

Embodiment 10

Figure 24:
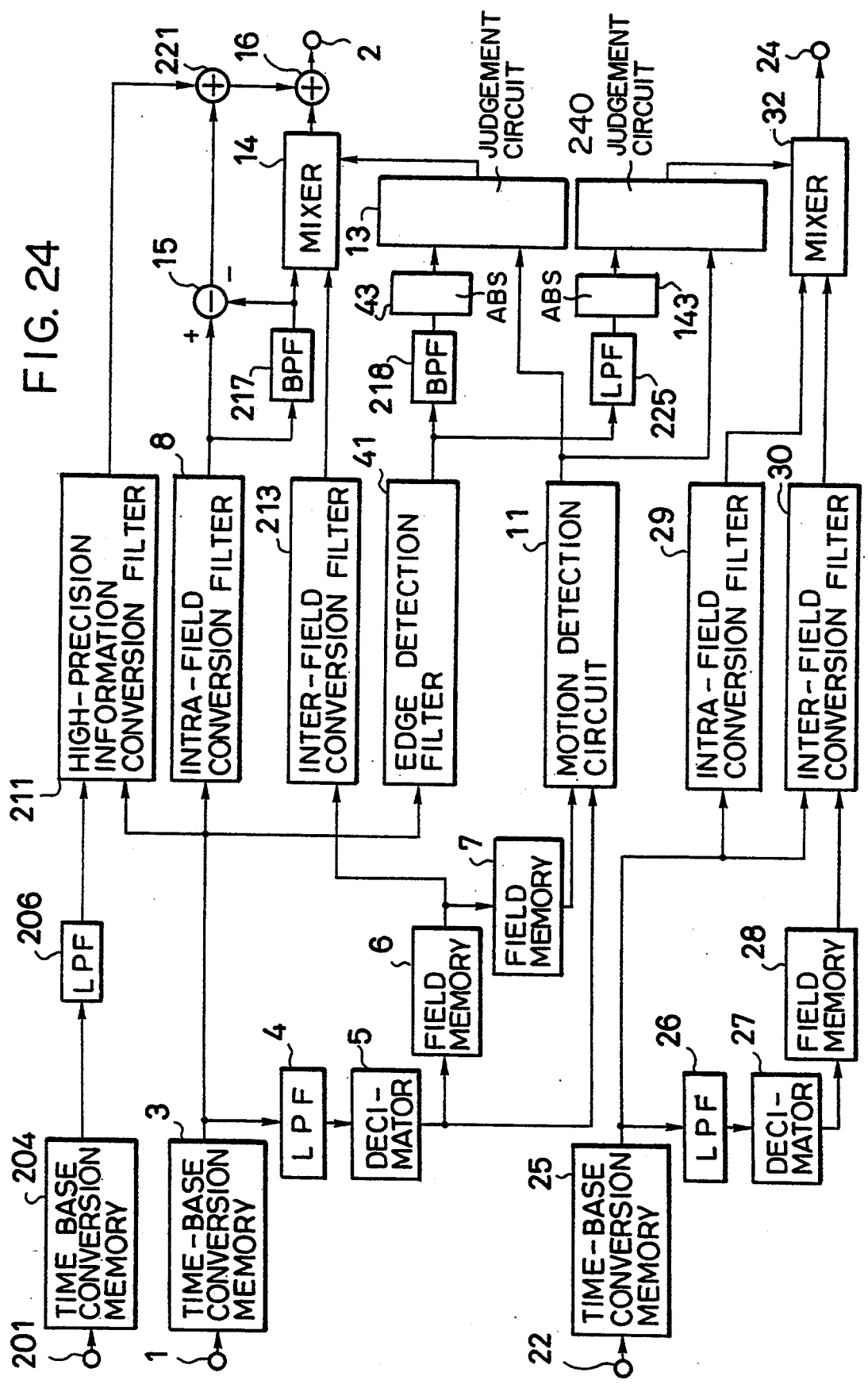
FIG. 24 is a block diagram showing another embodiment of the invention.

FIG. 24 shows another embodiment of the invention. In FIG. 24, circuits identical or corresponding to those in FIG. 13 and FIG. 7 are denoted by identical reference numerals. Like the embodiment of FIG. 7, the luminance signal and the chrominance signal are respectively input to the input terminals i and 22. The edge detection and motion detection are made on the basis of the luminance signal, and the results of the detections are used for control over the mixing of the luminance signal and the mixing of the chrominance signal. However, unlike the embodiment of FIG. 7, the edge detection circuit 40 comprises, in addition to the edge detection filter 41, a BPF 218, an absolute value circuit 143, an LPF 225 and another absolute value circuit 43, and produces two outputs, at the outputs of the absolute value circuits 143 and 43. Two judgement circuits 13 and 240 are provided. The judgement circuit 13 makes judgement on the basis of the output of the 143 and the motion detection circuit 11, while the judgement circuit 240 makes judgement on the basis of the output of the 43 and the output of the motion detection circuit 11. The result of the judgement made by the judgement circuit 13 is used for control over mixing at the mixing circuit 13. The result of the judgement made by the judgement circuit 240 is used for control over mixing at the mixing circuit 32.

Figure 25:
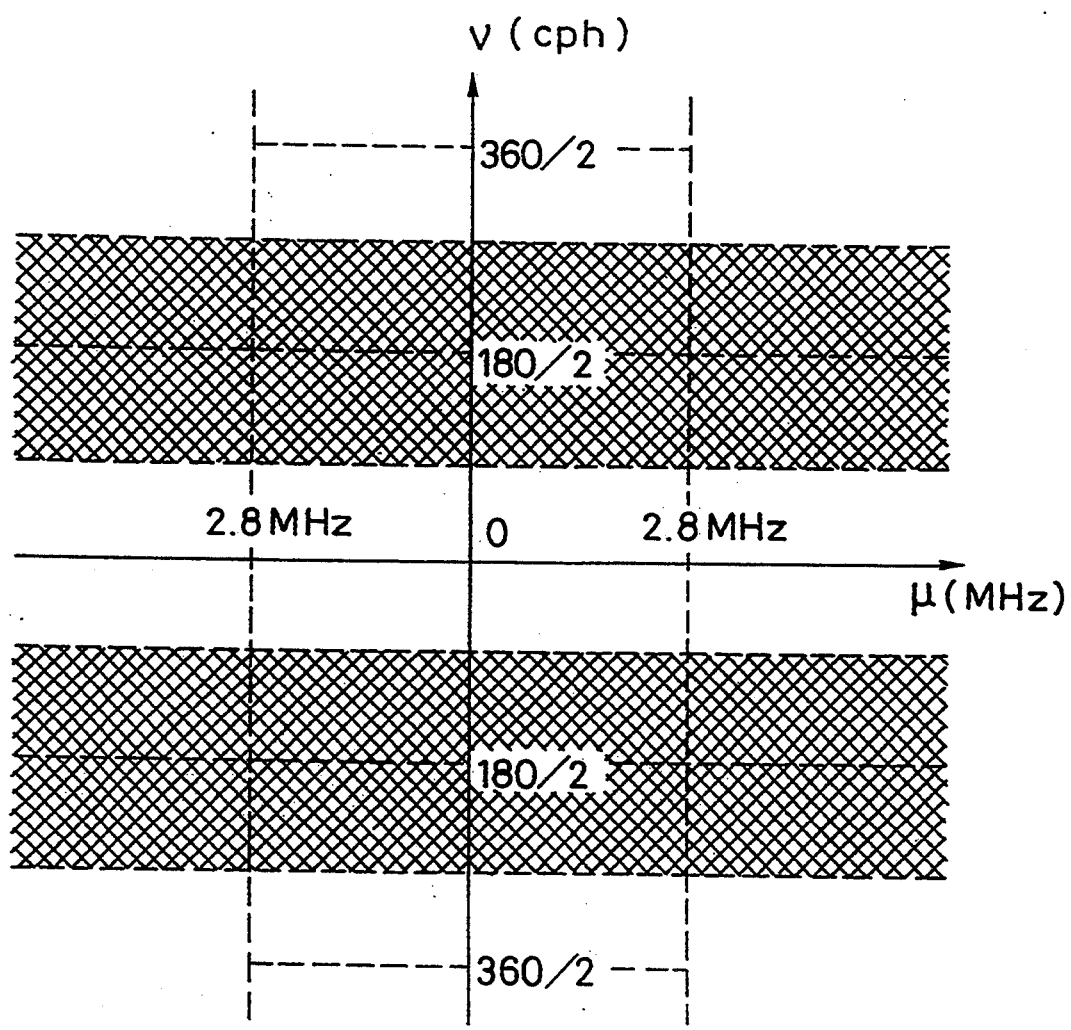
FIG. 25 is a diagram showing, in two-dimensional representation, the spectrum of the chrominance signal realized by the embodiment of FIG. 24.

FIG. 25 shows, in two-dimensional representation, the spectrum of the chrominance signal realized by the circuit of this embodiment.

In the circuit of this embodiment, the edge detection and the motion detection are made on the basis of the luminance signal, and the results of the detections are used for the processing of the chrominance signal as well. An edge is recognized when the vertical frequency component of the signal is $(180/2 \pm 90/2)$ cph and the horizontal frequency component is not higher than about 2.8 MHz. The switching between the intra-field conversion and the inter-field conversion is made over the entire horizontal frequency area of the chrominance signal. When an edge in a stationary part of the picture is found by the judgement circuit 240, the output of the inter-field conversion filter 30 is selected. In FIG. 13, the region in which the output of the inter-field conversion filter 30 is selected cross-hatched.

Applied to the input terminal 22 is the chrominance signal in the main image part of the television signal. Applied to the input terminal 1 is the luminance signal in the main image part. The luminance signal applied to the input terminal 1 is processed in the same way as in Embodiment 7 of FIG. 13. The chrominance signal applied to the input terminal 22 are written in the time-base conversion memory 25, and is read out in accordance with a clock frequency phase-locked with the horizontal scanning frequency of the display device used for the display. In this way, the time-base conversion is made. At the same time, the samples of the signal are rearranged. Thus the time-base conversion and rearrangement similar to those performed at the time-base conversion memory 3 are performed.

The output from the time-base conversion memory 25 is applied to the LPF 26, the intra-field conversion filter 29, and the inter-field conversion filter 30. The LPF 26 band-limits the horizontal frequency of the signal to not higher than about 2.8 MHz, so as to avoid aliasing at the output of the decimator 27. The intra-field conversion filter 29 performs intra-field conversion.

The output of the LPF 26 is decimated by the decimator 27. Thus, the sampling frequency is lowered, and the amount of data of one field is reduced.

The output of the decimator 27 is applied to the field memory 28 which delays the signal by one field. The output of the field memory 28 is applied to the inter-field conversion filter 30, which performs inter-field conversion on the output of the time-base conversion memory 25 and the output of the field memory 28, which are separated by one field.

The output of the intra-field conversion filter 29 and the output of the inter-field conversion filter 30 are output to the mixer 32, which mixes the two inputs with a mixing ratio determined in accordance with the signal from the judgement circuit 240.

In the embodiment described, the LPF 225 may be omitted, and the output of the edge detection filter 41 may be applied directly to the 43.

The intra-field conversion filter 29 may have a configuration similar to that of the intra-field conversion filter 8 of Embodiment 7 of FIG. 13.

Figure 26:
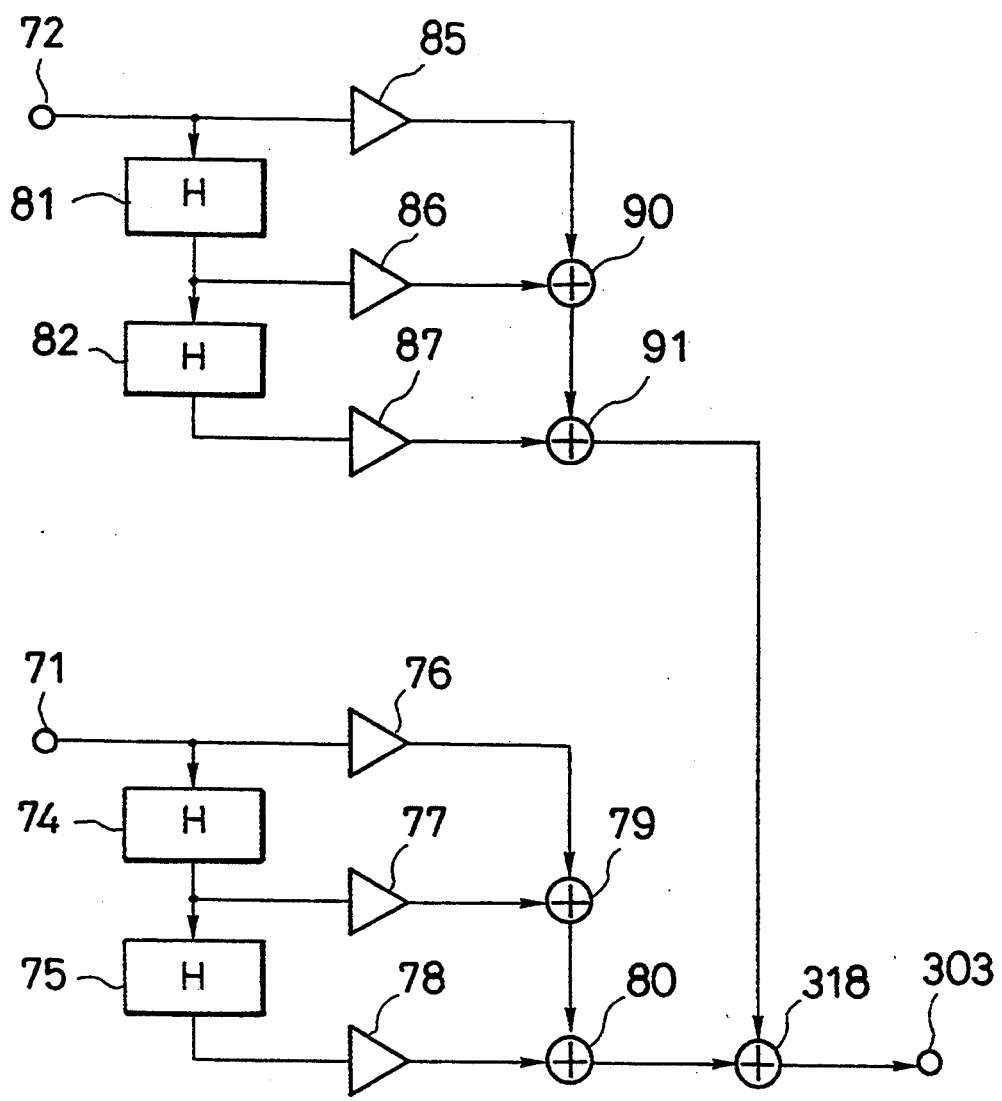
FIG. 26 is a block diagram showing an example of inter-field conversion filter used in the embodiment of FIG. 24.

An example of inter-field conversion filter 30 is shown in FIG. 26. Circuits identical or similar to those in FIG. 16 are denoted by identical reference numerals. It will be observed that the configuration of the inter-field conversion filter of FIG. 26 is similar to the inter-field conversion filter of FIG. 16, but the BPF 319 is not provided and the output of the adder 318 is directly applied to the output terminal 303. Applied to the input terminal 72 is the output-of the time-base conversion memory 25, i.e., the chrominance signal in the main image part. Applied to the input terminal 71 is the output of the field memory 28.

The inter-field conversion is made on the basis of the chrominance signals applied to the input terminals 71 and 72, in the same way as in the inter-field conversion filter of FIG. 16. The chrominance signal obtained as a result of the inter-field conversion is output via the output terminal 303. No BPF (such as BPF 319) nor LPF is provided at the output of the adder 318, and all the horizontal frequency components at the output of the adder 318 are output.

The filter coefficients (coefficients of the multipliers 76 to 78 and 85 to 87) are altered or determined for each scanning line. The number of the line memories, the number of multipliers, and the number of the adders can be altered by the number of taps of the filter. It is also possible to use two or more sets of the configurations shown in FIG. 3 and causing them to operate in turn and multiplex their outputs. With such an arrangement, the operating speed of each set can be lowered, while the operating speed of the entire arrangement is unchanged.

Embodiment 11

Figure 27:
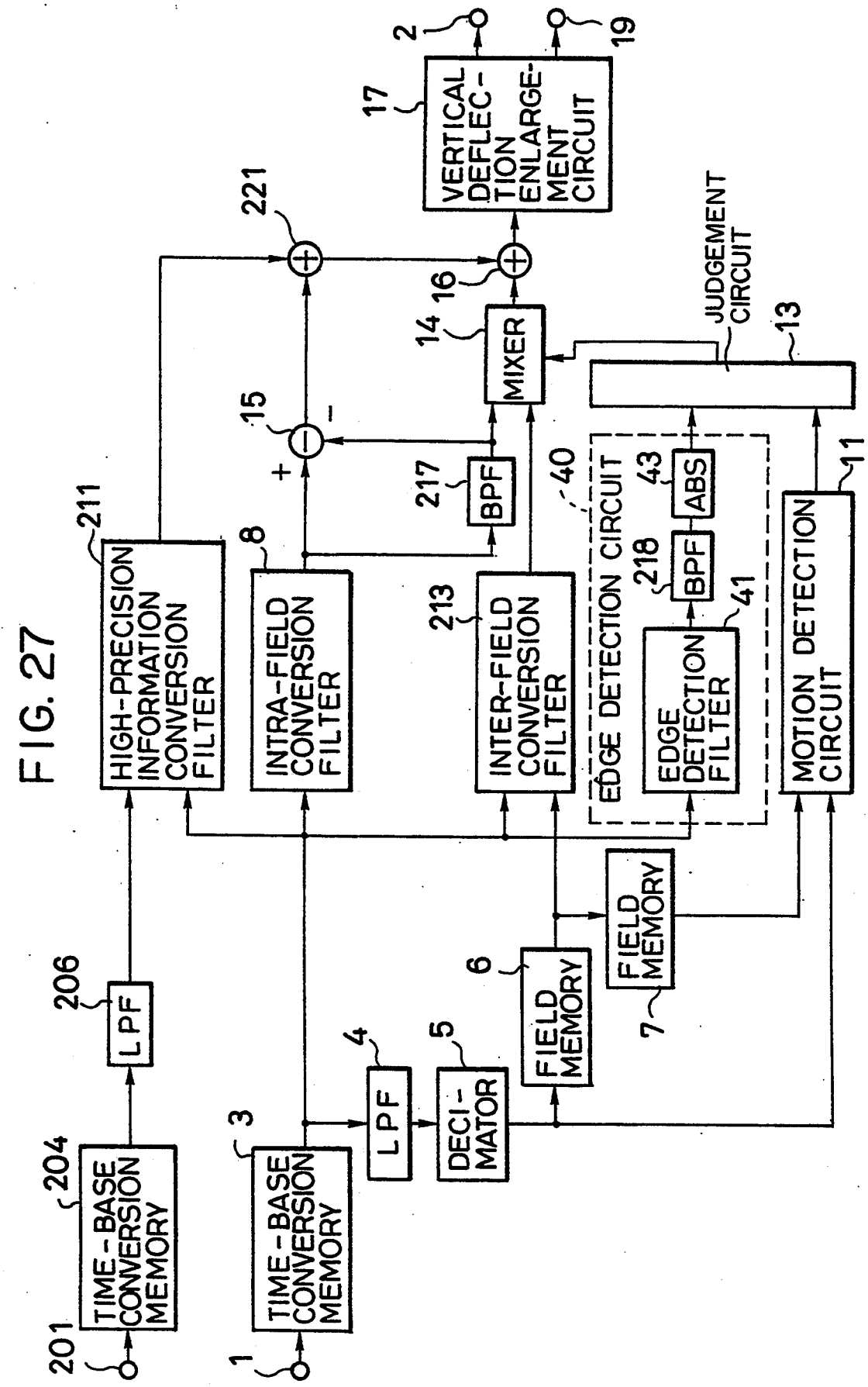
FIG. 27 is a block diagram showing another embodiment of the invention.

FIG. 27 shows another embodiment of the invention. Circuits identical or corresponding to those in FIG. 13 and FIG. 9 are denoted by identical reference numerals. The configuration is similar to that of FIG. 13, but it is additionally provided with a vertical deflection circuit 17, similar to that described with reference to FIG. 9.

The configuration and operation of the vertical deflection circuit 17 is similar to those described with reference to the embodiment of FIG. 9. That is, the deflection enlargement circuit 17 produces, at the output terminal 2, a video signal that is displayed on the display tube, and, at an output terminal 19, a control signal for causing enlargement of the vertical deflection at the display tube.

When the number of the scanning lines in the output of the adder 16 is smaller than the number of the scanning lines normally used for the display (the number of the scanning lines with which the display device is basically designed to operate), the vertical deflection needs to be enlarged such that the picture height (height of the valid or effective portion of the picture displayed) corresponds to the height of the screen of the display device.

For instance, if the input signal is a television signal having 360 effective scanning lines, and is scanning-line converted into a video signal having 720 scanning lines, and the display has a 1035 effective scanning lines, the vertical deflection is enlarged so that the picture formed by the video signal of 720 scanning lines covers the entire height of the screen. The extra scanning lines (1035 minus 720) will be outside the height of the screen of the display.

Embodiment 12

Figure 28:
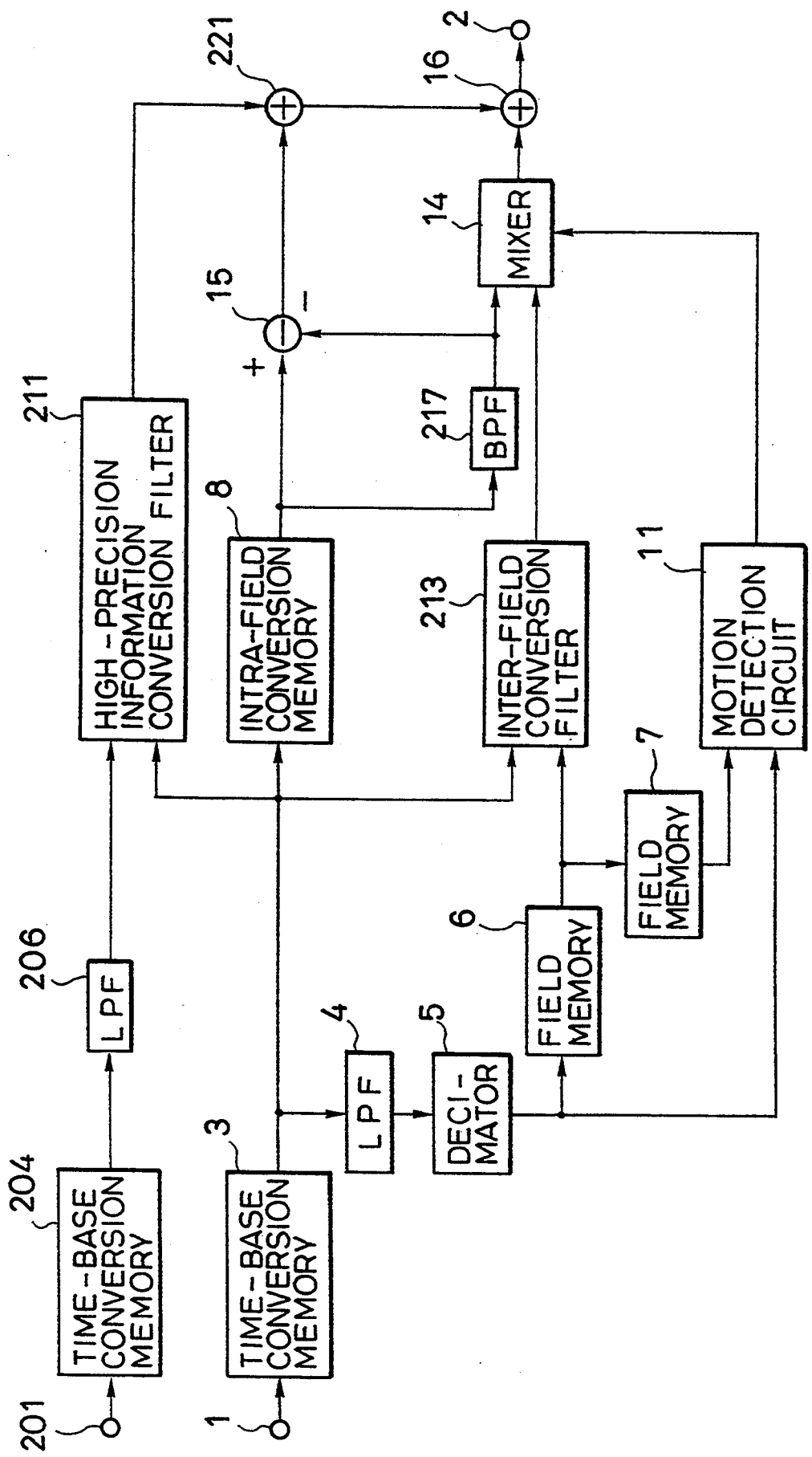
FIG. 28 is a block diagram showing another embodiment of the invention.

FIG. 28 shows another embodiment of the invention. Circuits identical or corresponding to those in FIG. 13 are denoted by identical reference numerals. It is similar to the embodiment of FIG. 13. The difference of the embodiment of FIG. 28 from the embodiment of FIG. 13 is that the edge detection circuit 40 in FIG. 13 and the Judgement circuit 13 are omitted, and the mixer 14 is controlled solely by the output of the motion detection circuit 11. That is, the mixer 14 mixes the output of the BPF 217 and the output of the inter-field conversion filter 9 in accordance with the mixing control signal output from the motion detection circuit 11. When pixel in question is in a stationary part of the picture, the output of the inter-field conversion filter 9 is selected. When the pixel is in a moving part of the picture, the output of the BPF 217 is selected. However, such selection is only for the horizontal frequency components of about 1.4 to 2.8 MHz. Other frequency components of the output of the intra-field conversion filter 8 is always passed through the subtractor 15 and the adders 221 and 16 to the output terminal 2, as in the Embodiment 7 of FIG. 13.

For the frequency components of not higher than about 1.4 MHz, the high-precision information processed at the high-precision information conversion filter 211 is added by means of the adder 221.

Figure 29:
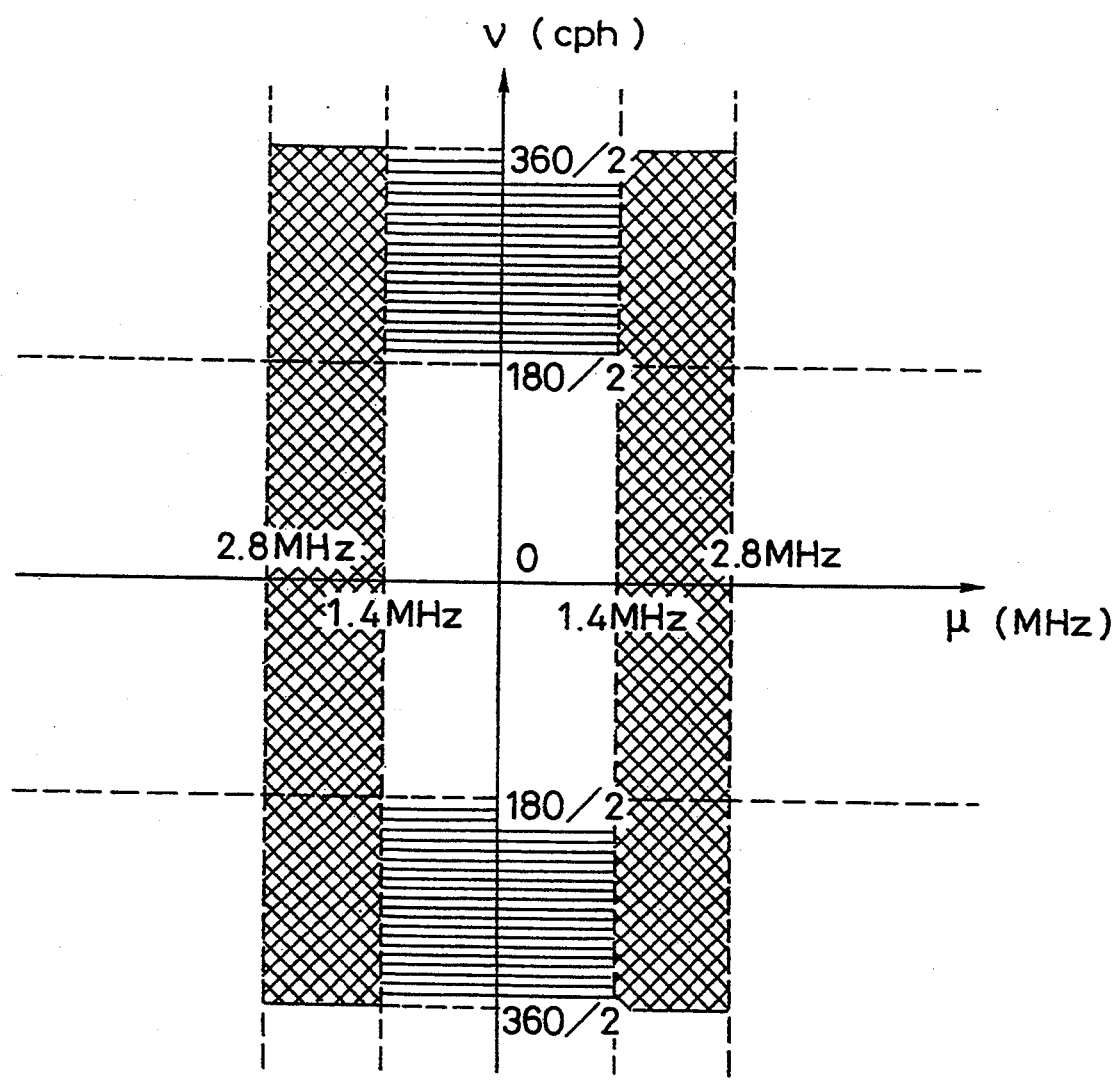
FIG. 29 is a diagram showing, in two-dimensional representation, the spectrum of the image realized by the embodiment of FIG. 28.

FIG. 29 shows, in two-dimensional representation, the spectrum of the image realized by Embodiment 12 of FIG. 28.

As illustrated, for the horizontal frequency component of about 1.4 to 2.8 MHz, the output of the inter-field conversion filter 213 is selected for the stationary part of the picture to thereby reduce the degradation of the vertical resolution. The region for which the output of the inter-field conversion filter 213 is selected is crossed-hatched, while the region for which the output of the high-precision information conversion filter is added is hatched by horizontal lines.

Embodiment 13

Figure 30:
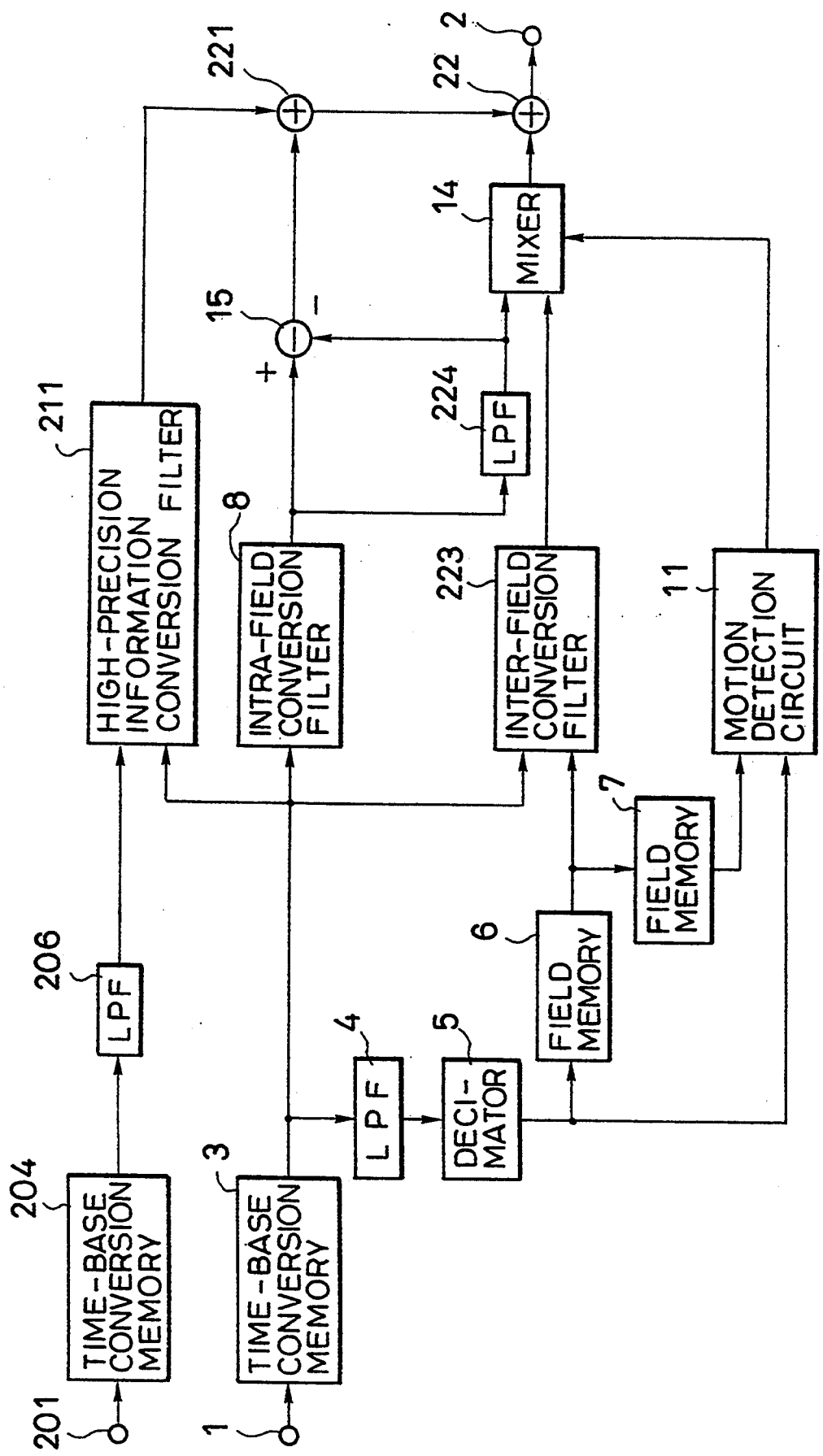
FIG. 30 is a block diagram showing another embodiment of the invention.

FIG. 30 shows another embodiment of the invention. In FIG. 30, circuits identical or corresponding to those in FIG. 13, FIG. 17 and FIG. 28 are denoted by identical reference numerals. The configuration is similar to the circuit of FIG. 28. However, instead of the BPFs 217 and 218, LPFs 224 and 225 having the band-width of 0 to about 2.8 MHz are provided. Instead of the inter-field conversion filter 213, an inter-field conversion filter 223 is provided. The inter-field conversion filter 223 is similar to that shown in FIG. 20 and differs from the inter-field conversion filter 2]3 in that it has a built-in LPF, rather than a BPF.

The difference of the embodiment of FIG. 30 from the embodiment of FIG. 28 is that the scanning-line conversion is performed without demodulating the high-precision information multiplexed in the upper and lower mask parts, and the horizontal low-frequency component of the video signal is all subjected to the motion-adaptive processing. When an edge in a stationary part of the picture is detected, the output of the inter-field conversion is selected for horizontal low-frequency component of not higher than about 2.8 MHz, while the output of the inter-field conversion circuit is not selected for other horizontal frequency components, even if the pixel in the stationary part of the picture.

Figure 31:
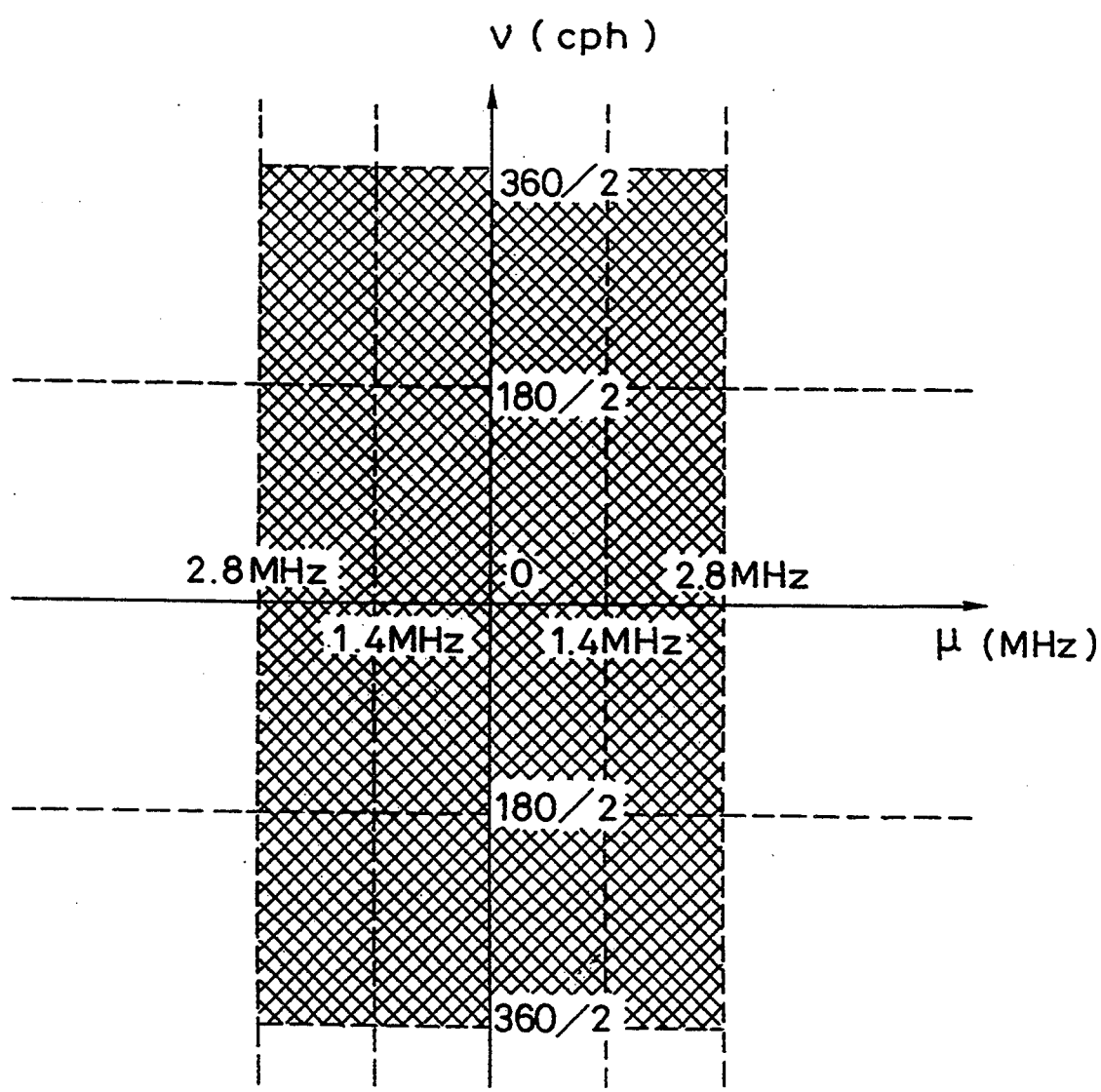
FIG. 31 is a diagram showing, in two-dimensional representation, the spectrum of the image realized by the motion-adaptive scanning-line conversion circuit of the embodiment of FIG. 30.

FIG. 31 shows, in two-dimensional representation, the spectrum of the image realized by the motion-adaptive scanning-line conversion circuit of this embodiment. In FIG. 31, the region for which the output of the inter-field conversion is selected is cross-hatched.

The motion detecting circuit 11 detects the stationary part of the picture from the inter-frame difference. The inter-field conversion filter 223 receives the outputs of the time-base conversion memory 3 and the field memory 6, and performs the inter-field conversion on the outputs of the time-base conversion memory 3 and the field memory 6. The inter-field conversion filter 223 of this embodiment outputs the horizontal low-frequency component of not higher than about 2.8 MHz.

Like the embodiment of FIG. 28, the edge detection circuit 40 and the judgement circuit 13 of FIG. 17 are omitted, and the mixer 14 mixes the output of the LPF 224 and the output of the inter-field conversion filter 223 in accordance with the output of the motion detection circuit 11.

The subtracter 15 subtracts the output of the LPF 224 from the output of the intra-field conversion filter 8 to produce a horizontal high-frequency component of not lower than about 2.8 MHz and having been intra-field converted.

The adder 221 adds the output of the high-precision information conversion filter 211 and the output of the subtracter 15. Since, however, the high-precision information in the upper and lower mask parts is not used, the output of the high-precision information conversion filter 211 is zero. As a result, the horizontal low-frequency component of not higher than about 2.8 MHz of the video signal is all mixed in the mixer 14 with the output of the inter-field conversion filter 23. The adder 16 adds the output of the adder 221 and the output of the mixer 14, and their sum is output through the output terminal 2.

Figure 32:
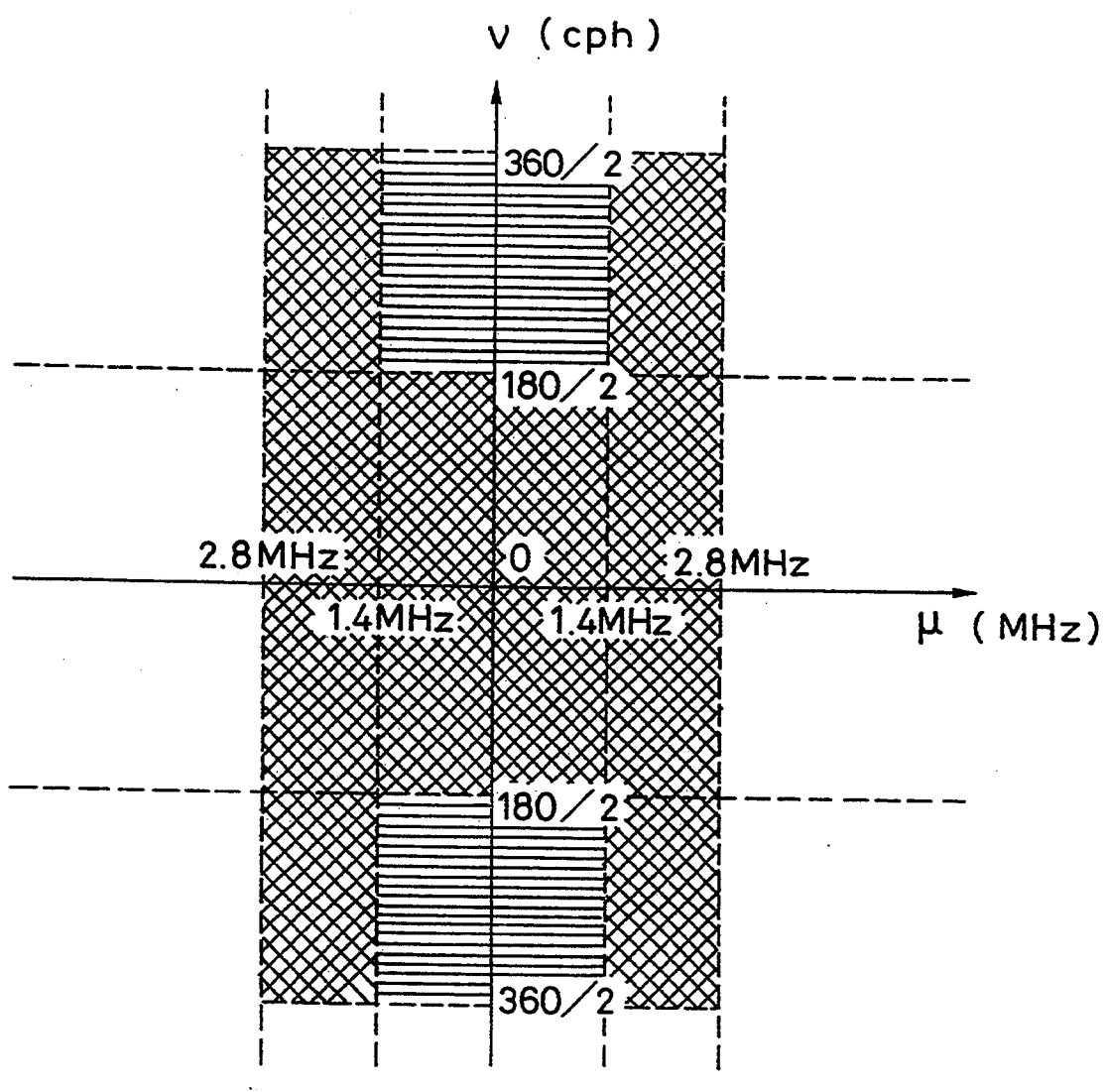
FIG. 32 is a diagram showing, in two-dimensional representation, the spectrum of the image realized by a modification to the embodiment of FIG. 30.

In the above described embodiment, the high-precision information multiplexed in the upper and lower mask parts is not demodulated. However, it is also possible to demodulate the high-precision information, and yet a similar result is obtained. FIG. 32 shows, in two-dimensional representation, the spectrum of the image realized by such a modification (in which the high-precision information is demodulated).

As illustrated, for the horizontal low-frequency component of not higher than about 1.4 MHz, the video signal obtained by inter-field conversion and the scanning-line conversion by demodulation of the high-precision information are added.

In FIG. 32, the region for which the vertical high-frequency component of the moving picture is demodulated is hatched by horizontal lines, while the region for which the output of the inter-field conversion is selected is cross-hatched.

Embodiment 14

Figure 33:
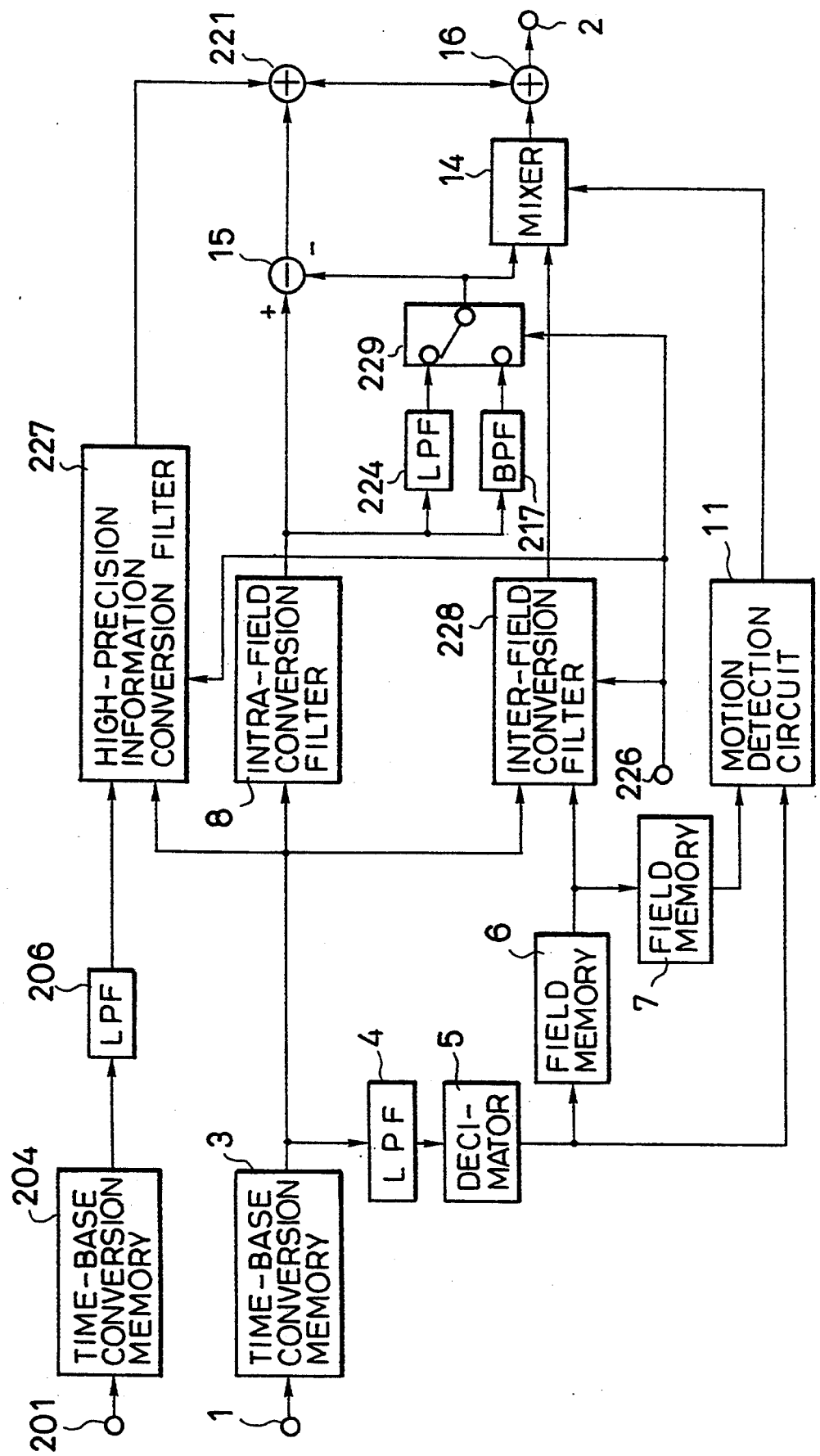
FIG. 33 is a block diagram showing another embodiment of the invention.

FIG. 33 shows another embodiment of the invention. In FIG. 33, circuits identical or corresponding to those in FIG. 13, FIG. 21 and FIG. 28 are denoted by identical reference numerals. The configuration is similar to the circuit of FIG. 28. However, it is further provided, like the embodiment of FIG. 21, with a control input terminal 226 for receiving identification signal for identifying the high-precision information, a high-precision information conversion filter 227, and an inter-field conversion filter 228 for performing the inter-field conversion. Moreover, in addition to the BPF 217 similar to that in FIG. 28, LPF 224 similar to that in FIG. 21 are provided.

A selecting circuit 229 selects either of the outputs of the BPF 217 and the LPF 224. The selection is made in accordance with the identification signal via the input terminal 226. That is, if the high-precision information contains the high vertical frequency component of a moving part of the picture, it selects the output of the BPF 217. If the high-precision information contains the high vertical frequency component of a stationary part of the picture, it selects the output of the LPF 224.

This embodiment can operate in either of two different modes depending on the contents of the high-precision information sent to the television receiver. The high-precision information may contain a selected one of a vertical high frequency component in a stationary part of the picture (e.g., an enhancing signal having a vertical frequency of 360/2 to 480/2 cph and a horizontal frequency of not higher than about 1.4 MHz) and a vertical high frequency component in a moving part of the picture (an enhancing signal having a vertical frequency of 180/2 to 360/2 cph and a horizontal frequency of not higher than about 1.4 MHz), and the selection is made motion adaptively and for each field, for example.

Figure 34:
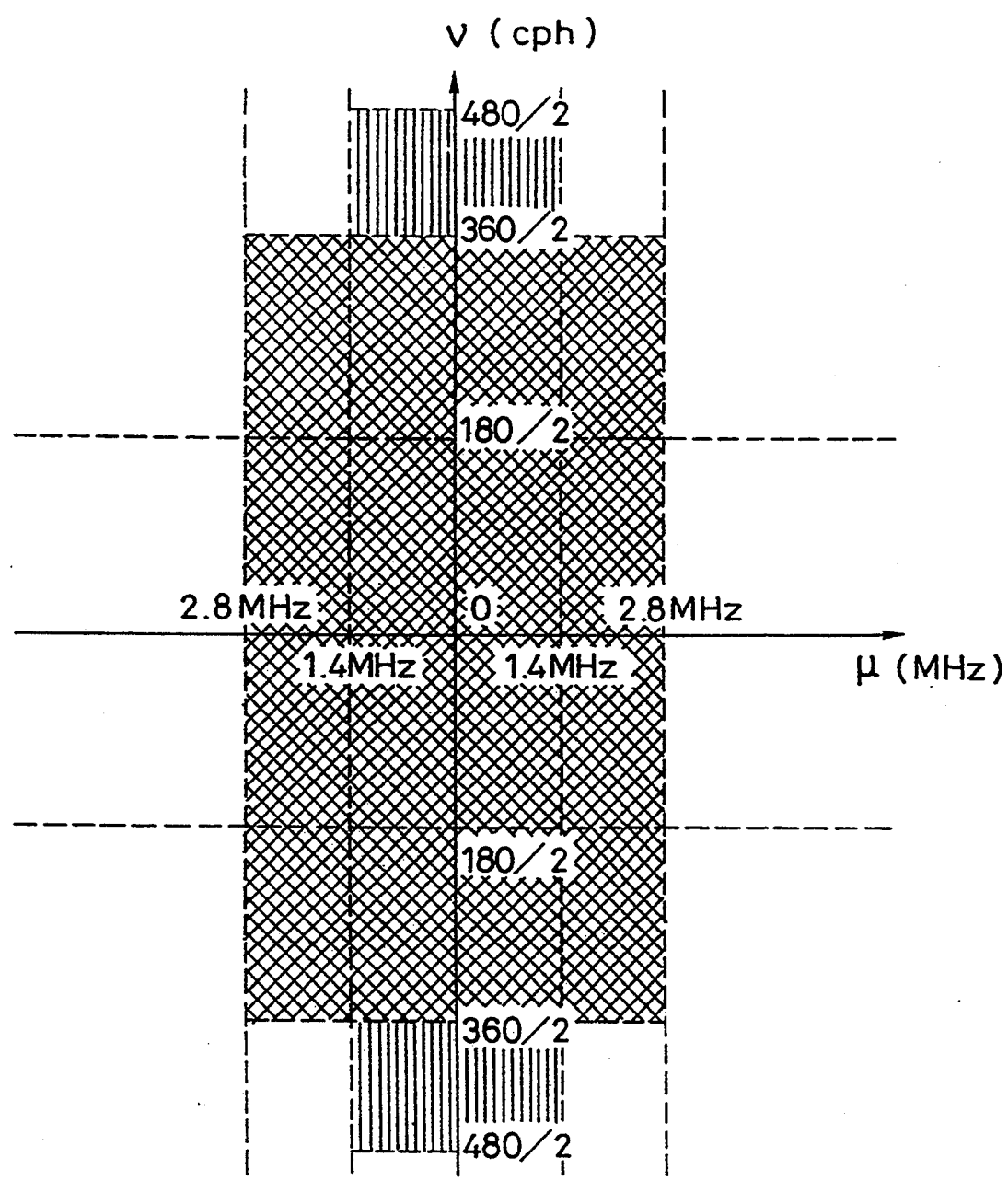
FIG. 34 is a diagram showing the spectrum of the image realized by the embodiment of FIG. 33 when the high-precision information contains the vertical high-frequency component of a stationary part of the picture.
Figure 35A:
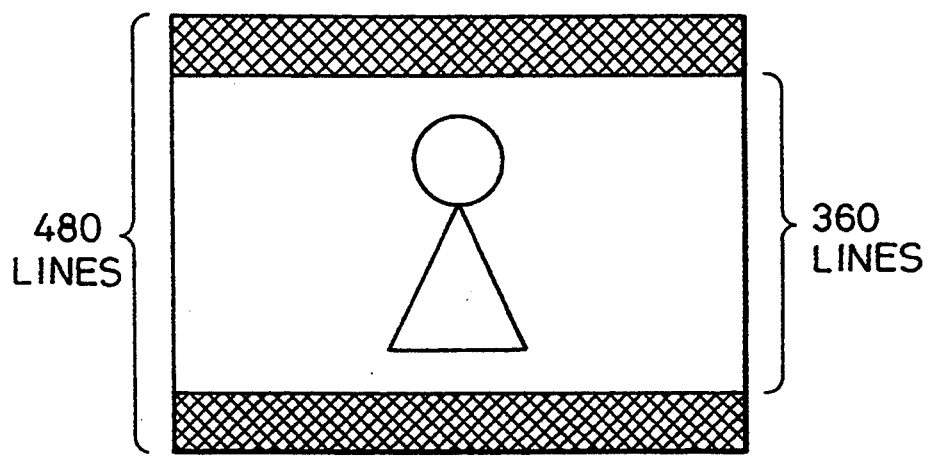
FIG. 35A and FIG. 35B are schematic diagrams showing an example of conventional scanning-line conversion.
Figure 35B:
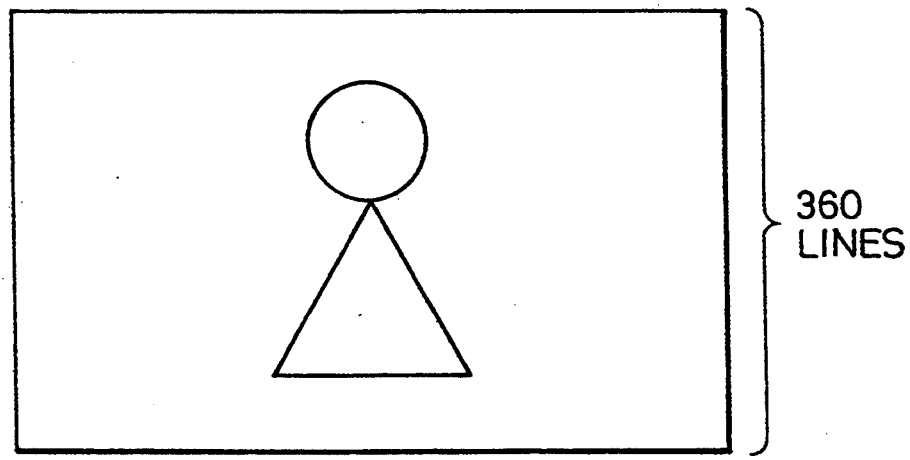
Figure 36:
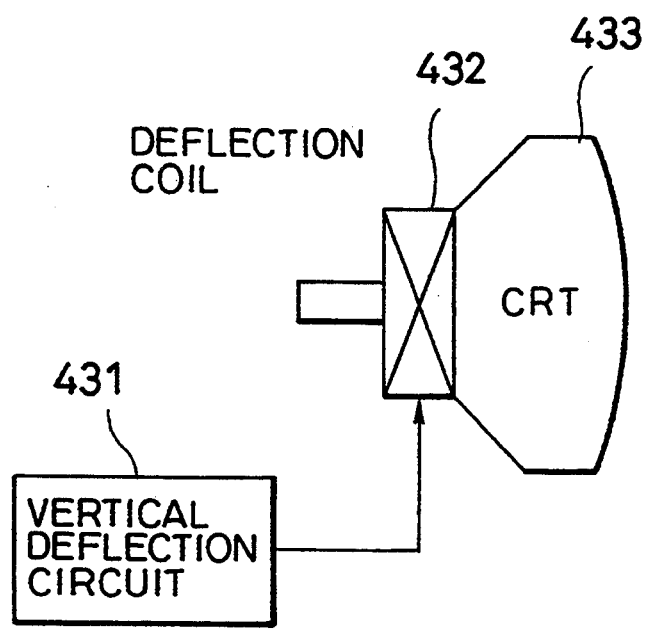
FIG. 36 is a diagram showing a vertical deflection circuit and a CRT.
Figure 37A:
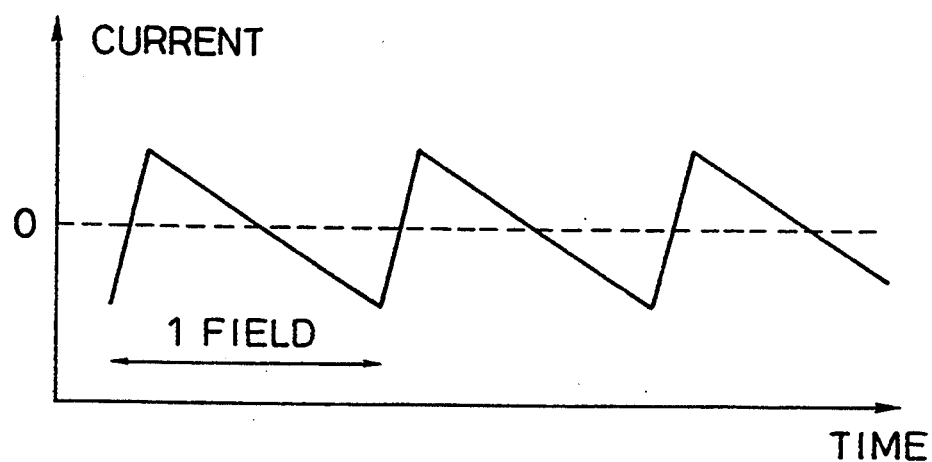
FIG. 37A and FIG. 37B are waveforms diagrams showing the current supplied to the vertical deflection circuit.
Figure 37B:
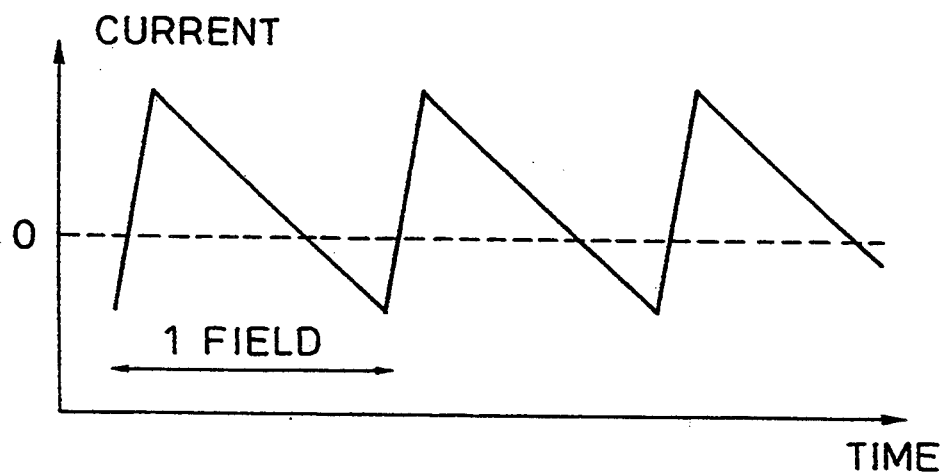
Figure 38A:
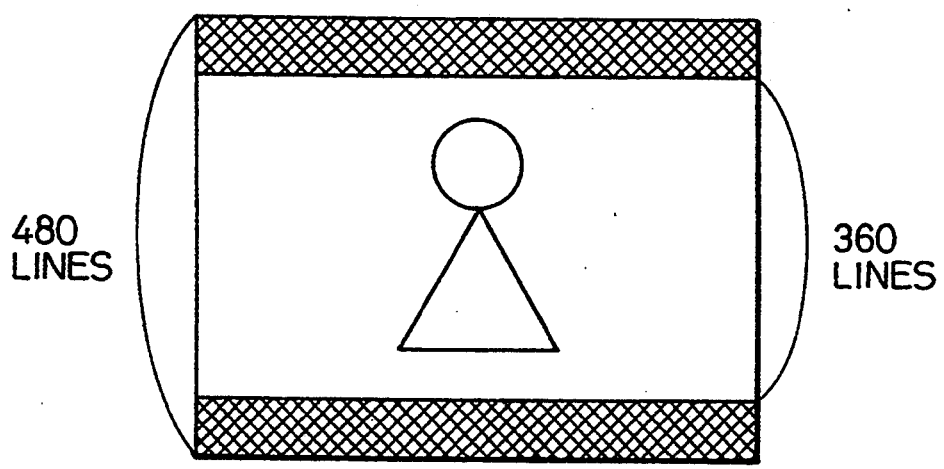
FIG. 38A and FIG. 38B are schematic diagrams showing another example of conventional scanning-line conversion.
Figure 38B:
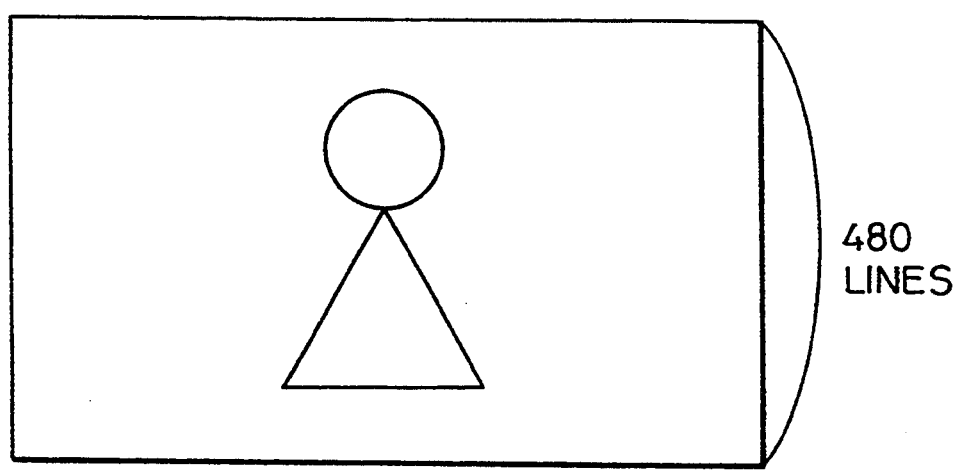
Figure 39:
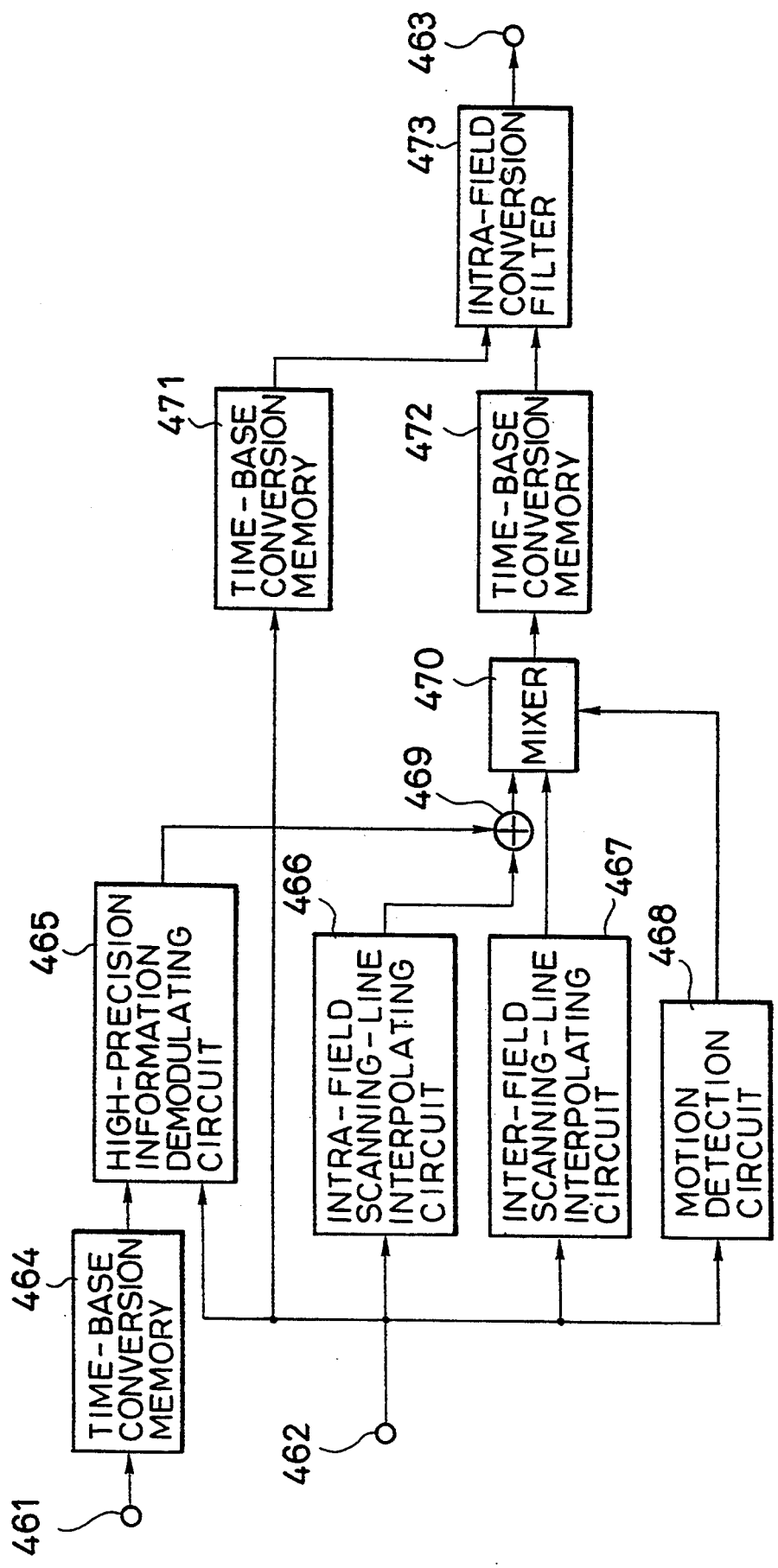
FIG. 39 is a block diagram showing an example of conventional scanning-line conversion circuit.
Figure 40:
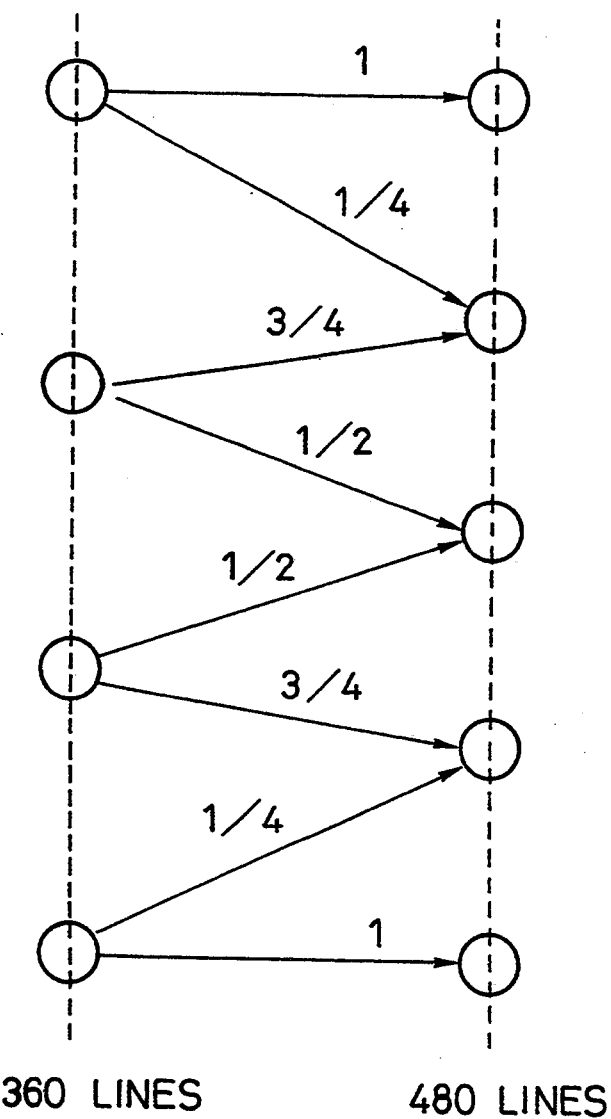
FIG. 40 is a diagram for explaining the manner of scanning line conversion.

The spectrum of the image realized by the motion-adaptive scanning-line conversion circuit of this embodiment when the high-precision information contains the vertical high-frequency component of a moving part of the picture is identical to that shown in FIG. 29. FIG. 34 shows the spectrum of the image realized when the high-precision information contains the vertical high-frequency component of a stationary part of the picture.

When the motion detection circuit 11 detects that the pixel is in a stationary part of the picture, the mixer 14 selects the output of the inter-field conversion filter 228. In FIG. 34, the region for which the vertical high-frequency component in a stationary part of the picture is demodulated is indicated by cross-hatching. The region for which the high-precision information is added is hatched by vertical lines.

The operation of the circuit of FIG. 33 is similar to that of FIG. 28 or FIG. 30. The following description relates to the operation which is different from that of FIG. 28 or FIG. 30.

The identification signal input to the input terminal 226 indicates whether the high-precision signal contains the vertical high-frequency component in a stationary part of the picture or the vertical high-frequency component in a moving part of the picture. The identification signal is applied to the high-precision information conversion filter 227, the inter-field conversion filter 228, and the selecting circuit 229.

The high-precision information conversion filter 227 demodulates the high-precision information In accordance with the identification signal. If the high-precision information contains the vertical high-frequency component of a moving part of the picture, it performs the scanning-line conversion of the high-precision information of the horizontal low-frequency component of not higher than about 1.4 MHz to obtain signals of a vertical frequency component of 180/2 to 360/2 cph.

If the high-precision information contains the vertical high-frequency component of a stationary part of the picture, it performs the scanning-line conversion of the high-precision information of the horizontal low-frequency component of not higher than about 1.4 MHz to obtain signals of a vertical frequency component of 360/2 to 480/2 cph.

The output of the high-precision information conversion filter 227 is applied to the adder 221.

The inter-field conversion filter 228 performs inter-field conversion. When the high-precision information contains the vertical high-frequency component of a moving part of the picture, it outputs the horizontal frequency component of about 1.4 to 2.8 MHz of the video signal obtained by inter-field conversion. When the high-precision information contains the vertical high-frequency component of a stationary part of the picture, it outputs the horizontal low-frequency component of not higher than about 2.8 MHz of the video signal obtained by inter-field conversion.

The LPF 224 receives the output of the intra-field conversion filter 8, and band-limits the input to extract the horizontal low-frequency component of not higher than about 2.8 MHz. In other words, the LPF 224 operates in the same manner as the LPF 224 in FIG. 17. Similarly, the BPF 217 operates in the same manner as the BPF 217 in FIG. 13. The selecting switch 229 selects either of the outputs of the LPF 224 and the BPF 217 depending on the identification signal.

The mixer 13 mixes the outputs of the selecting circuit 229 and the inter-field conversion filter 228 with a mixing ratio determined by the signal from the motion detection circuit 11.

It is possible to omit the BPF 217 and the selecting circuit 229 and connect the output of the BPF 217 directly to the mixer 14. In this case, the spectrum of the image is as seen in FIG. 32.

The inter-field conversion filter 228 may be identical to that shown in FIG. 23.

Modifications

Features disclosed in connection with the various embodiments may be used in combination. Features described as modifications to Embodiment 1 can also be incorporated in other embodiments. Similarly, features described as modifications to Embodiment 7 can also be incorporated in Embodiment 8 to Embodiment 14.

For instance, the separate processing of the luminance and chrominance signals as described in Embodiment 2 and Embodiment 10 as a modification to Embodiment 1 and Embodiment 7 may also be applied to Embodiment 4 to Embodiment 6 and Embodiment 8 to Embodiment 14.

The time-division multiplexing of the luminance and chrominance signals as described in Embodiment 3 as a modification to Embodiment 1 may also applied to Embodiment 2 and 4 to 14.

The use of the deflection enlargement circuit described in Embodiment 4 and Embodiment 11 as a modification to Embodiment 1 and Embodiment 7, respectively can also be applied to Embodiment 2, 3, 5, 6, and 8 to 14.

The selection between the inter-field conversion filter and the intra-field conversion filter depending on the scanning type of the video signal as described in Embodiment 6 as a modification to Embodiment 1 may also be applied to Embodiment 2 to Embodiment 5 and Embodiment 7 to Embodiment 14.

In Embodiment 5 of FIG. 10, Embodiment 12 of FIG. 28, Embodiment 13 of FIG. 30, and Embodiment 14 of FIG. 33, it is possible to subject the output of the motion detection circuit 11 to a coring processing by the use of the output of the edge detection circuit in the Embodiment 1 or Embodiment 12, and input the result to the mixer. In coring processing, signals below a certain threshold level is suppressed. Coring processing is performed to avoid erroneous detection of motion. In "coring processing using the output of the edge detection filter" the threshold value is determined or varied in accordance with the output of the edge detection filter. By performing the coring processing on the output of the motion detection filter, in accordance with the amount of detection of the vertical edge, degradation of picture quality due to erroneous detection of the edge, which arises as a result of the noises and minute variation of the image, can be prevented.

The various features described with reference to Embodiment 1 to Embodiment 6 described above can be applied to an arrangement in which the entirety of a first number (e.g., 480) of effective scanning lines of an image is converted into a second number of scanning lines of an image, with the second number being greater than the first number, such as a situation in which an NTSC signal whose scanning number is 525 (with the effective scanning lines being 480) that is received is processed in an HDTV receiver, for display on a CRT which is basically designed to operate with 1125 scanning lines (with effective scanning lines being 1035).

Advantages

As has been described according to the invention, the output of the inter-field conversion is selected when the stationary part of the picture is detected or a vertical edge in the stationary part of the picture is detected, and the output of the intra-field conversion is otherwise selected. As a result, the difference in picture quality between the areas for which the output of the inter-field conversion is selected and the areas for which the output of the intra-field conversion is selected is less prominent. Moreover, interference in the stationary part of the picture is less objectionable. Furthermore, the video signal is decimated and the inter-field conversion and motion detection is made on the basis of the decimated video signal, and the areas for which the output of the inter-field conversion is selected is restricted, so that the capacity of the field memory for delaying the signals by one field can be reduced.

What is claimed is:

1. A motion-adaptive scanning-line conversion circuit for converting at least part (M) of a first video signal having a first number (N) of scanning lines into a second video signal having a second number (L) of scanning lines, each video signal being in the form of a sequence of samples, the motion-adaptive scanning-line conversion circuit comprising:
   a data reducing circuit for lowering the sampling frequency of said first video signal to reduce the amount of data of said first video signal;
   a first field delay circuit for delaying, by one field, the video signal output from the data reducing circuit;
   a second field delay circuit for delaying, by one field, the video signal output from the first field delay circuit;

a motion detecting circuit for locally detecting motion of an image on the basis of the correlation between the adjacent frames as obtained by the first and second field delay circuits;

an inter-field scanning-line conversion circuit for performing inter-field scanning-line conversion using the signal obtained by one of the first and second field delay circuits;

an intra-field scanning-line conversion circuit for performing intra-field scanning-line conversion; and a mixer mixing the output of the inter-field scanning-line conversion circuit and the output of the intra-field scanning-line conversion circuit in accordance with a mixing ratio determined on the basis of the result of the motion detection.

2. A motion-adaptive scanning-line conversion circuit according to claim 1, further comprising:

an edge detection circuit for locally detecting an edge in the image on the basis of the correlation within a field; and a judgement circuit for detecting the motion of the image and the edge in the image on the basis of the output of the motion detecting circuit and the output of the edge detecting circuit;

wherein said mixer mixes the output of the inter-field scanning-line conversion circuit and the output of the intra-field scanning-line conversion circuit with a mixing ratio determined in accordance with the output of the judgement circuit.

3. A motion-adaptive scanning-line conversion circuit according to claim 2, wherein said judgement circuit causes the mixer to select the output of the inter-field scanning-line conversion circuit only when the image is found to be a stationary image and contains a vertical edge, on the basis of the outputs of the motion detection circuit and the edge detection circuit.

4. A motion-adaptive scanning-line conversion circuit according to claim 2, wherein said motion detection circuit locally detects the motion of the image on the basis of the inter-frame correlation of the luminance signal; and said edge detection circuit locally detects the edge in the image on the basis of the correlation within a field of the luminance signal.

5. A motion-adaptive scanning-line conversion circuit according to claim 2, wherein said motion detection circuit locally detects the motion of the image on the basis of the inter-frame correlation of the luminance signal and the chrominance signal; and said edge detection circuit locally detects the edge of the image on the basis of the correlation within a field of the luminance signal and the chrominance signal.

6. A motion-adaptive scanning-line conversion circuit according to 2, wherein said inter-field scanning-line conversion circuit performs the inter-field scanning-line conversion on a certain horizontal frequency component of the luminance signal and the chrominance signal using the delayed signal obtained by delaying one of the field delay circuits;

said intra-field scanning-line conversion circuit performs the intra-field scanning-line conversion on the luminance signal and the chrominance signal;

said mixer mixes the luminance signal outputs of the inter-field scanning-line conversion circuit and the intra-field scanning-line conversion circuit to produce an output, in accordance with the output of the judgement circuit, and the chrominance signal outputs of the inter-field scanning-line conversion circuit and the intra-field scanning-line conversion circuit to produce an output, in accordance with the output of the judgement circuit.

7. A motion-adaptive scanning-line conversion circuit according to claim 6, wherein said certain horizontal frequency component is the horizontal low-frequency component.

8. A motion-adaptive scanning-line conversion circuit according to claim 1, wherein $M<N$ and $L>N$.

9. A motion-adaptive scanning-line conversion circuit according to claim 1, wherein $M<N$ and $L=N$.

10. A motion-adaptive scanning-line conversion circuit according to claim 1, wherein $M=N$ and $L>N$.

11. A motion-adaptive scanning-line conversion circuit according to claim 1, wherein said data reducing circuit comprises a first circuit for extracting the low-frequency component of the first video signal and subsampling the signal output by said first circuit.

12. A motion-adaptive scanning-line conversion circuit according to claim 1, wherein each of said first and second field delay circuits comprises a field memory.

13. A motion-adaptive scanning-line conversion circuit according to claim 1, further comprising a scanning system discriminating circuit for discriminating whether said first video signal is of a non-interlaced scanning or of an interlaced scanning, and controlling the mixer to select the output of the intra-field scanning-line conversion circuit when said first video signal is found to be of the non-interlaced scanning.

14. A motion-adaptive scanning-line conversion circuit according to claim 1, further comprising a vertical deflection enlargement circuit for controlling the vertical deflection such that the video output is displayed over the entire screen.

15. A motion-adaptive scanning-line conversion circuit according to claim 1, wherein the first video signal is of a letter-box type containing a main part and an upper and lower mask parts containing information.

16. A motion-adaptive scanning-line conversion circuit according to claim 15, wherein $M<N$ and $L>N$.

17. A motion-adaptive scanning-line conversion circuit according to claim 15, wherein $M<N$ and $L=N$.

18. A motion-adaptive scanning-line conversion circuit according to claim 15, further comprising a demodulating circuit for performing demodulation and scanning-line conversion on information multiplexed in the upper and lower mask parts.

19. A motion-adaptive scanning-line conversion circuit according to claim 18, wherein said information multiplexed in the upper and lower mask parts contains at least the vertical high-frequency component of a moving picture.

20. A motion-adaptive scanning-line conversion circuit according to claim 18, wherein said information multiplexed in the upper and lower mask parts contains at least the vertical high-frequency component of a stationary picture.

21. A motion-adaptive scanning-line conversion circuit according to claim 18, wherein said information multiplexed in the upper and lower mask parts contains the vertical high-frequency component of a moving picture and the vertical high-frequency component of a stationary picture which are time-division multiplexed.

22. A motion-adaptive scanning-line conversion circuit according to claim 18, wherein said demodulating circuit converts the scanning lines of the demodulated information by inter-field processing into said second number of scanning lines, and adds the result to a second number of the scanning lines of the main image part.

23. A motion-adaptive scanning-line conversion circuit for converting at least part of a first video signal having a first number of scanning lines into a second video signal having a second number of scanning lines, said circuit comprising:
data reducing means for generating a reduced video signal by lowering a sampling frequency of said first video signal, thus, reducing the amount of data of said first video signal;
first delay means for delaying said reduced video signal by one field;
second delay means for delaying output from said first delay means by one field;
motion detecting means for detecting motion of an image represented by said first video signal based on said reduced video signal and output from said second delay means;
inter-field scanning-line conversion means for performing inter-field scanning-line conversion using output from at least one of said first and second delay means;
intra-field scanning-line conversion means for performing intra-field scanning-line conversion of said first video signal; and
mixing means for mixing output from said inter-field scanning-line conversion means and said intra-field scanning-line conversion means in accordance with a mixing ratio determined based on output from said motion detecting means.

24. The circuit of claim 23, further comprising:
edge detecting means for detecting an edge of a stationary portion of said image represented by said first video signal; and
determining means for determining said mixing ratio based on output from said edge detecting means and said motion detecting means.

25. The circuit of claim 23, further comprising:
vertical detecting means for detecting a degree of change of said first video signal along a vertical direction of said image represented by said first video signal; and
determining means for determining said mixing ratio based on output from said vertical detecting means and said motion detecting means.

26. The circuit of claim 24, further comprising vertical deflection means for controlling vertical deflection at a display tube so that said image represented by said first video signal covers the entire height of said display tube.

27. The circuit of claim 24, further comprising discriminating means for discriminating whether said first video signal is of a non-interlaced scanning or of an interlaced scanning, and for controlling said mixing means to select output of said intra-field scanning-line conversion circuit when said first video signal is discriminated to be of said non-interlaced scanning.

28. The circuit of claim 23, further comprising a demodulating circuit, said first video signal being of a letter-box type which contains a main part, an upper part, and a lower part, said upper and lower part including information regarding vertical high-frequency components of at least one of a stationary image and a moving image represented by said first video signal, said demodulating circuit decoding said information in said upper and lower mask parts.

29. The circuit of claim 28, further comprising:
filter means for filtering output of said intra-field scanning-line conversion means;
a subtractor subtracting output of said filter means from output of said intra-field scanning means;
a first adder adding output from said subtractor and said demodulating means; and
a second adder for adding output from said first adder and said mixing means.

30. The circuit of claim 29, wherein said mixing means mixes output from said filter means and said inter-field scanning-line conversion means, and said filter means includes a low-pass filter.

31. The circuit of claim 29, wherein said mixing means mixes output from said filter means and said inter-field scanning-line conversion means, and said filter means includes a band pass filter.

32. The circuit of claim 28, further comprising:
edge detecting means for detecting an edge of a stationary portion of said image represented by said first video signal;
determining means for determining said mixing ratio based on output from said edge detecting means and said motion detecting means.

33. The circuit of claim 32, further comprising:
first filter means for filtering output of said intra-field scanning-line conversion means;
a subtractor subtracting output of said filter means from output of said intra-field scanning means;
a first adder adding output from said subtractor and said demodulating means; and
a second adder for adding output from said first adder and said mixing means.

34. The circuit of claim 33, wherein said edge detection means includes an edge detection filter detecting an edge of a stationary portion of said image represented by said first video signal, a second filter means for filtering output from said edge detection filter and absolute value means for taking the absolute value of output from said second filter means.

35. The circuit of claim 34, wherein said first and said second filter means include a band pass filter.

36. The circuit of claim 34, wherein said first and second filter means include a low pass filter.

37. The circuit of claim 34, further comprising:
a control input receiving a control signal indicating whether said information contains the vertical high frequency component of said moving part or said stationary part of said image represented by said first video signal;
a first switch outputting a signal received at one of a first and second input based on said control signal;
a second switch outputting a signal received at one of a third and fourth input based on said control signal; and wherein
said demodulating circuit decodes based on said control signal;
said inter-field scanning-line conversion means performs inter-field scanning-line conversion based on said control signal;
said first filter means includes a first band pass filter and a first low pass filter;
said second filter means includes a second band pass filter and a second low pass filter;

said first, second, third and fourth inputs are connected to said first low pass filter, said first band pass filter, said second low pass filter and said fourth band pass filter, respectively.

38. The circuit of claim 33, further comprising:
a control input receiving a control signal indicating whether said information contains the vertical high frequency component of said moving part or said stationary part of said image represented by said first video signal;
a first switch outputting a signal received at one of a first and second input based on said control signal;
said demodulating circuit decodes based on said control signal;
said inter-field scanning-line conversion means performs inter-field scanning-line conversion based on said control signal;
said first filter means includes a band pass filter and a low pass filter; and
said first and second inputs are connected to said low pass filter and said band pass filter, respectively.

39. The circuit of claim 28, further comprising vertical deflection means for controlling vertical deflection at a display tube so that said image represented by said first video signal covers the entire height of said display tube.

40. A motion-adaptive scanning-line conversion circuit for converting at least part of a first video signal and second video signal, each having a first number of scanning lines, into a third video signal and a fourth video signal, respectively, said third and fourth video signal each having a second number of scanning lines, said circuit comprising:
a first data reducing circuit generating a first reduced video signal by lowering a sampling frequency of said first video signal, thus, reducing the amount of data of said first video signal;
a second data reducing circuit generating a second reduced video signal by lowering a sampling frequency of said second video signal, thus, reducing the amount of data of said second video signal;
a first delay circuit delaying said first reduced video signal by one field;
a second delay circuit delaying output from said first delay circuit by one field;
a third delay circuit delaying said second reduced video signal by one field;
a motion detecting circuit detecting motion of an image represented by said first video signal based on said first reduced video image and output from said second delay circuit;
a first inter-field scanning-line conversion circuit performing inter-field scanning-line conversion using output from at least one of said first and second delay circuit;
a first intra-field scanning-line conversion circuit performing intra-field scanning-line conversion of said first video signal; and
a second inter-field scanning-line conversion circuit performing inter-field scanning-line conversion using output from said third delay circuit;
a second intra-field scanning-line conversion circuit performing intra-field scanning-line conversion of said second video signal;
a demodulating circuit, said first video signal being of a letter-box type which contains a main part, an upper part, and a lower part, said upper and lower part including information regarding at least one of vertical high-frequency components of a moving image and a stationary image represented by said first video signal, said demodulating circuit decoding said information in said upper and lower parts;
a first mixer mixing output from said first inter-field scanning-line conversion circuit and said first intra-field scanning-line conversion circuit in accordance with a mixing ratio determined based on output from said motion detecting circuit;
a second mixer mixing output from said second inter-field scanning-line conversion circuit and said second intra-field scanning-line conversion circuit in accordance with a mixing ratio determined based on output from said motion detecting circuit; and
an adder adding output from said first mixer and said demodulating circuit.

41. A motion-adaptive scanning-line conversion circuit for converting at least part of a first video signal and second video signal, each having a first number of scanning lines, into a third video signal and a fourth video signal, respectively, said third and fourth video signal each having a second number of scanning lines, said circuit comprising:
a first data reducing circuit generating a first reduced video signal by lowering a sampling frequency of said first video signal, thus, reducing the amount of data of said first video signal;
a second data reducing circuit generating a second reduced video signal by lowering a sampling frequency of said second video signal, thus, reducing the amount of data of said second video signal;
a multiplexing circuit multiplexing said first and second reduced video signals;
a first delay circuit delaying output from said multiplexing circuit by one field;
a second delay circuit delaying output from said first delay circuit by one field;
a motion detecting circuit detecting motion of an image represented by said first and second video signal based on output from said multiplexing circuit and said second delay circuit;
a demultiplexing circuit demultiplexing output from said first delay circuit into first and second decoded video signals;
a first inter-field scanning-line conversion circuit performing inter-field scanning-line conversion using said first decoded video signal;
a first intra-field scanning-line conversion circuit performing intra-field scanning-line conversion of said first video signal; and
a second inter-field scanning-line conversion circuit performing inter-field scanning-line conversion using said second decoded video signal;
a second intra-field scanning-line conversion circuit performing intra-field scanning-line conversion of said second video signal; and
a first mixer mixing output from said first inter-field scanning-line conversion circuit and said first intra-field scanning-line conversion circuit in accordance with a mixing ratio determined based on output from said motion detecting circuit; and
a second mixer mixing output from said second inter-field scanning-line conversion circuit and said second intra-field scanning-line conversion circuit in accordance with a mixing ratio determined based on output from said motion detecting circuit.

42. A motion-adaptive scanning-line conversion circuit for converting at least part of a first video signal and second video signal, each having a first number of scanning lines, into a third video signal and a fourth video signal, respectively, said third and fourth video signal each having a second number of scanning lines, said circuit comprising:
- a first data reducing circuit generating a first reduced video signal by lowering a sampling frequency of said first video signal, thus, reducing the amount of data of said first video signal;
- a second data reducing circuit generating a second reduced video signal by lowering a sampling frequency of said second video signal, thus, reducing the amount of data of said second video signal;
- a first delay circuit delaying said first reduced video signal by one field;
- a second delay circuit delaying output from said first delay circuit by one field;
- a third delay circuit delaying said second reduced video signal by one field;
- a motion detecting circuit detecting motion of an image represented by said first video signal based on said first reduced video image and output from said second delay circuit;
- a first inter-field scanning-line conversion circuit performing inter-field scanning-line conversion using output from at least one of said first and second delay circuit;
- a first intra-field scanning-line conversion circuit performing intra-field scanning-line conversion of said first video signal; and
- a second inter-field scanning-line conversion circuit performing inter-field scanning-line conversion using output from said third delay circuit;
- a second intra-field scanning-line conversion circuit performing intra-field scanning-line conversion of said second video signal; and
- a first mixer mixing output from said first inter-field scanning-line conversion circuit and said first intra-field scanning-line conversion circuit in accordance with a mixing ratio determined based on output from said motion detecting circuit; and
- a second mixer mixing output from said second inter-field scanning-line conversion circuit and said second intra-field scanning-line conversion circuit in accordance with a mixing ratio determined based on output from said motion detecting circuit.

43. The circuit of claim 40, wherein said first video signal is a luminance signal and said second video signal is a chrominance signal.

44. The circuit of claim 41, wherein said first video signal is a luminance signal and said second video signal is a chrominance signal.

45. The circuit of claim 42, wherein said first video signal is a luminance signal and said second video signal is a chrominance signal.

46. A method for converting at least part of a first video signal having a first number of scanning lines into a second video signal having a second number of scanning lines, said method comprising the steps of:
(a) generating a reduced video signal by lowering a sampling frequency of said first video signal, thus, reducing the amount of data of said first video signal;
(b) delaying said reduced video signal by one field;
(c) delaying output from said step (b) by one field;
(d) detecting motion of an image represented by said first video signal based on said reduced video image and output from said step (c);
(e) performing inter-field scanning-line conversion using output from at least one of said step (b) and (c);
(f) performing intra-field scanning-line conversion of said first video signal; and
(g) mixing output from said step (e) and said step (f) in accordance with a mixing ratio determined based on output from said step (d).

47. The method of claim 46, further comprising the steps of:
(h) detecting an edge of a stationary portion of said image represented by said first video signal; and
(i) determining said mixing ratio based on output from said step (h) and said step (d).

48. The method of claim 46, further comprising the steps of:
(h) detecting a degree of change of said first video signal along a vertical direction of said image represented by said first video signal; and
(i) determining said mixing ratio based on output from said step (h) and said step (d).

49. The method of claim 47, further comprising the step of controlling vertical deflection at a display tube so that said image represented by said first video signal covers the entire height of said display tube.

50. The method of claim 47, further comprising the steps of:
(h) discriminating whether said first video signal is of a non-interlaced scanning or of an interlaced scanning; and
(i) controlling said step (g) to select output of said step (f) when said first video signal is discriminated to be of said non-interlaced scanning.

51. The method of claim 46, further comprising the step of (h) demodulating said first video signal, which is of a letter-box type containing a main part, an upper part and a lower part, said upper and lower part including information regarding at least one of vertical high-frequency components of a moving image and a stationary image represented by said first video signal, said demodulating step decoding said information in said upper and lower mask parts.

52. The method of claim 51, further comprising the steps of:
(i) filtering output of said step (f);
(j) subtracting output of said step (i) from output of said step (f);
(k) adding output from said step (j) and said step (h); and
(l) adding output from said step (k) and said step (g).

53. A motion-adaptive scanning-line conversion circuit for converting at least part of a first video signal having a first number of scanning lines into a second video signal having a second number of scanning lines, said circuit comprising:
- a first delay circuit delaying said first video signal by one field;
- a second delay circuit delaying output from said first delay circuit by one field;
- a motion detecting circuit detecting motion of an image represented by said first video signal based on said first video signal and output from said second delay circuit;
- an inter-field scanning-line conversion filter performing inter-field scanning-line conversion using output from at least one of said first and second delay circuit;

an intra-field scanning-line conversion filter performing intra-field scanning-line conversion of said first video signal;

an edge detecting circuit detecting an edge of a stationary portion of said image represented by said first video signal based on said first video signal; and a judgement circuit determining a mixing ratio based on output from said edge detecting circuit and said motion detecting circuit; and a mixer mixing output from said inter-field scanning-line conversion filter and said intra-field scanning-line conversion filter in accordance with said mixing ratio.

54. The circuit of claim 53, wherein said edge detecting circuit detects a degree of change of said first video signal along a vertical direction of said image represented by said first video signal.

55. The circuit of claim 53, wherein said judgement circuit causes the mixer to select the output of the inter-field scanning-line conversion filter only when the image represented by said first video signal is found to be a stationary image and contains a vertical edge.

56. The circuit of claim 53, wherein said motion detection circuit locally detects the motion of the image represented by said first video signal on the basis of an inter-frame correlation of the luminance signal; and said edge detection circuit locally detects the edge in the image represented by said first video signal on the basis of a correlation within a field of the luminance signal.

57. The circuit of claim 53, wherein said motion detection circuit locally detects the motion of the image represented by said first video signal on the basis of an inter-frame correlation of the luminance signal and the chrominance signal; and said edge detection circuit locally detects the edge of the image represented by said first video signal on the basis of a correlation within a field of the luminance signal and the chrominance signal.

58. The circuit of claim 53, wherein said inter-field scanning-line conversion filter performs the inter-field scanning-line conversion on a certain horizontal frequency component of the luminance signal and the chrominance signal using the delayed signal obtained from one of the first and second delay circuits;

said intra-field scanning-line conversion filter performs the intra-field scanning-line conversion on the luminance signal and the chrominance signal; and said mixer mixes the luminance signal outputs of the inter-field scanning-line conversion filter and the intra-field scanning-line conversion filter to produce an output, in accordance with said mixing ratio, and mixes the chrominance signal outputs of the inter-field scanning-line conversion filter and the intra-field scanning-line conversion filter to produce an output in accordance with said mixing ratio.

59. A motion-adaptive scanning-line conversion circuit for converting at least part of a first video signal having a first number of scanning lines into a second video signal having a second number of scanning lines, said circuit comprising:

a first delay circuit delaying said first video signal by one field;

a second delay circuit delaying output from said first delay circuit by one field;

a motion detecting circuit detecting motion of an image represented by said first video signal based on said first video signal and output from said second delay circuit;

an inter-field scanning-line conversion filter performing inter-field scanning-line conversion using output from at least one of said first and second delay circuit;

an intra-field scanning-line conversion filter performing intra-field scanning-line conversion of said first video signal;

a mixer mixing output from said inter-field scanning-line conversion filter and said intra-field scanning-line conversion filter in accordance with said mixing ratio; and a demodulating circuit, said first video signal being of a letter-box type which contains a main part, an upper part, and a lower part, said upper and lower part including information regarding vertical high-frequency components of at least one of a stationary image and a moving image represented by said first video signal, said demodulating circuit decoding said information in said upper and lower mask parts.

60. The circuit of claim 59, further comprising:

an edge detecting circuit detecting an edge of a stationary portion of said image represented by said first video signal;

judgment circuit determining said mixing ratio based on output from said edge detecting circuit and said motion detecting circuit.

61. The circuit of claim 59, wherein said information multiplexed in the upper and lower mask parts contains at least the vertical high-frequency component of a moving picture.

62. The circuit of claim 59, wherein said information multiplexed in the upper and lower mask parts contains at least the vertical high-frequency component of a stationary picture.

63. The circuit of claim 59, wherein said information multiplexed in the upper and lower mask parts contains the vertical high-frequency component of a moving picture and the vertical high-frequency component of a stationary picture which are time-division multiplexed.

64. The circuit of claim 59, wherein said demodulating circuit converts the scanning lines of the demodulated information by inter-field processing into said second number of scanning lines, and adds the result to a second number of scanning lines of the main image part.

* * * * *

UNITED STATES PATENT AND TRADEMARK OFFICE
CERTIFICATE OF CORRECTION

PATENT NO. : 5,381,183
DATED : January 10, 1995
INVENTOR(S) : ISHIZUKA et al.

It is certified that error appears in the above-indentified patent and that said Letters Patent is hereby corrected as shown below:

On the title page item [75],

Line 3, change "Ohnishi" to --Onishi--;
    Line 4, change "Tuzi" to --Tsuji--.

Signed and Sealed this

Eighteenth Day of July, 1995

Attest:

BRUCE LEHMAN

Attesting Officer     Commissioner of Patents and Trademarks